US008032538B2

(12) United States Patent
Iwatsu

(10) Patent No.: US 8,032,538 B2
(45) Date of Patent: Oct. 4, 2011

(54) INFORMATION PROCESSING DEVICE, CONTENT TITLE DISPLAY METHOD, AND CONTENT TITLE DISPLAY PROGRAM

(75) Inventor: Takeshi Iwatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 1353 days.

(21) Appl. No.: 11/587,057

(22) PCT Filed: May 19, 2005

(86) PCT No.: PCT/JP2005/009589
§ 371 (c)(1),
(2), (4) Date: Nov. 20, 2006

(87) PCT Pub. No.: WO2005/111994
PCT Pub. Date: Nov. 24, 2005

(65) Prior Publication Data
US 2009/0307252 A1    Dec. 10, 2009

(30) Foreign Application Priority Data

May 19, 2004    (JP) .................................. 2004-149501

(51) Int. Cl.
G06F 7/22    (2006.01)
(52) U.S. Cl. ..................................................... 707/752
(58) Field of Classification Search .................. 707/711, 707/752, 753, 754
See application file for complete search history.

(56) References Cited

U.S. PATENT DOCUMENTS

| 6,745,199 | B2 * | 6/2004 | Morita et al. | 1/1 |
| 2001/0013983 | A1 * | 8/2001 | Izawa et al. | 360/2 |
| 2003/0048418 | A1 * | 3/2003 | Hose et al. | 352/123 |
| 2003/0219225 | A1 * | 11/2003 | Horii et al. | 386/69 |
| 2004/0170386 | A1 * | 9/2004 | Mikawa | 386/69 |

FOREIGN PATENT DOCUMENTS

| JP | 8 267963 | 10/1996 |
| JP | 8-267963 | 10/1996 |
| JP | 2002-116933 | 4/2002 |
| JP | 2002 116933 | 4/2002 |
| JP | 2002-182672 | 6/2002 |
| JP | 2002 182672 | 6/2002 |
| JP | 2002-319271 | 10/2002 |
| JP | 2002 319271 | 10/2002 |
| JP | 2003-22615 | 1/2003 |
| JP | 2003 22615 | 1/2003 |
| JP | 2003 22656 | 1/2003 |
| JP | 2003-22656 | 1/2003 |
| JP | 2003 50816 | 2/2003 |
| JP | 2003-50816 | 2/2003 |
| JP | 2003-51179 | 2/2003 |
| JP | 2003 51179 | 2/2003 |

(Continued)

Primary Examiner — Charles Kim
Assistant Examiner — Fatima Mina
(74) Attorney, Agent, or Firm — Oblon, Spivak, McClelland, Maier & Neustadt, L.L.P.

(57) ABSTRACT

A client terminal displays the titles of downloaded music data such that these titles are classified by albums based on the album identification information associated with each music data and arranged in an order indicated by the recording order information which is associated with each music data.

9 Claims, 38 Drawing Sheets

FOREIGN PATENT DOCUMENTS

| | | |
|---|---|---|
| JP | 2004 47047 | 2/2004 |
| JP | 2004-47047 | 2/2004 |
| JP | 2004 117618 | 4/2004 |
| JP | 2004-117618 | 4/2004 |
| JP | 2004 145701 | 5/2004 |
| JP | 2004-145701 | 5/2004 |
| JP | 2004-215281 | 7/2004 |
| JP | 2004 215281 | 7/2004 |
| JP | 2004-241095 | 8/2004 |
| JP | 2004 241095 | 8/2004 |
| JP | 2005 44391 | 2/2005 |
| JP | 2005-44391 | 2/2005 |
| JP | 2005-92387 | 4/2005 |
| JP | 2005 92387 | 4/2005 |
| JP | 2005-182855 | 7/2005 |
| JP | 2005 182855 | 7/2005 |

* cited by examiner

| | FILE NO. | 1 | 2 | 3 | 4 | 5 |
|---|---|---|---|---|---|---|
| TRACK INFO | CONTENT ID | 00000001 | 00000002 | 00000003 | 00000004 | 00000005 |
| | TITLE | TITLE 1 | TITLE 2 | TITLE 3 | TITLE 4 | TITLE 5 |
| | ARTIST | ARTIST 1 | ARTIST 1 | ARTIST 1 | ARTIST 1 | ARTIST 1 |
| | ... | ... | ... | ... | ... | ... |
| ALBUM INFO | ALBUM ID | 00000001 | 00000001 | 00000001 | 00000001 | 00000001 |
| | TITLE | TITLE | TITLE | TITLE | TITLE | TITLE |
| | ARTIST | ARTIST | ARTIST | ARTIST | ARTIST | ARTIST |
| | TRACK ORDER | 1 | 2 | 3 | 4 | 5 |
| | ... | ... | ... | ... | ... | ... |
| MUSIC DATA | CODEC | ATRAC3 | ATRAC3 | ATRAC3 | ATRAC3 | ATRAC3 |
| | BITRATE | 132KBPS | 132KBPS | 132KBPS | 132KBPS | 132KBPS |
| | CHANNEL | 2 | 2 | 2 | 2 | 2 |
| | ... | ... | ... | ... | ... | ... |
| | DATA BODY | DATA1 | DATA2 | DATA3 | DATA4 | DATA5 |

TB1

DATA∗(∗=1, 2, 3, 4, 5) : PATHS OF MUSIC DATA (STORAGE LOCATION INFORMATION)

FIG. 20

```
#define ANY_UPDID_MAX 2
typedef struct tagANY_PLAYLIST_MODNOTIFY{
/**DELETIONID(0:NO DELETION) */   LONG IDelId;
/**UPDATEID(0:NO UPDATE) */   LONG IUpdId[ANY_UPDID_MAX];
} ANY_PLAYLIST_MODNOTIFY,*PANY_PLAYLIST_MODNOTIFY;
```

(A)

(B)

INFORMATION PROCESSING DEVICE, CONTENT TITLE DISPLAY METHOD, AND CONTENT TITLE DISPLAY PROGRAM

TECHNICAL FIELD

The present invention relates to an information processing apparatus, content title display method and content title display program, and is preferably applied to a case in which an information processing device downloads music data through a network such as the Internet from a music data delivery server storing a plurality of music data and then displays a title of the downloaded music data on a display, for example.

BACKGROUND ART

Typically, this kind of information processing device can download, in response to user's download operation, a piece of music data (equivalent to one song) from the music data delivery server. That allows a user to obtain his/her desired music data by operating the information processing device.

On the other hand, various stores provide a music CD (Compact Disc) for sale. The music CD that contains a plurality of music data is sold as an album.

The music CD which is sold as an album stores a plurality of music data in an order intended by an artist and participants (This music CD will be also referred to as an album CD). By playing back the album CD exactly in that order, a user can appreciate the plurality of music data (i.e. a plurality of pieces of music) as one piece of work.

By the way, when a user wants to obtain the same music data, which are collectively sold as an album, from the music data delivery server through the information processing device, he/she has to specify, as an operation for download, each piece of music data.

Therefore, while he/she can obtain the plurality of music data at once as a piece of work by purchasing the album CD at stores, it's not effective to download them.

The following is one way to solve this problem. In this method, a user needs to perform only one operation to collectively download a plurality of music data, which are the same as those stored in a music CD as an album, on his/her information processing device.

Patent Document 1: Japanese Patent Publication No. 2003-322525

DISCLOSURE OF THE INVENTION

By the way, generally, even if the plurality of music data, which are collectively defined as an album, are downloaded on the information processing device at once, each music data is just associated with information about its genre and artist. Therefore, when displaying the titles of the music data and the like in a list format on a display, those music data can be only classified by genres or artists.

Accordingly, when a user wants to classify the downloaded music data by albums and then arrange them in a recording order on the album, first of all he/she has to create folders for each album. And then he/she needs to check the recording order to put each music data into a corresponding folder. It means that the user cannot classify them in an effective way.

The present invention has been made in view of the above points and is intended to provide an information processing apparatus, content title display method and content title display program capable of classifying and displaying content data in an effective way.

To solve the above problem, an information processing apparatus includes: communication means for transmitting a download request signal to request an external device to download specific content data, and receiving content data corresponding to the download request signal; recording means for recording a content data main body and fringe information of the content data received by the communication means on a recording medium such that the content data main body and the fringe information are associated with one another, the content data having the content data main body and the fringe information containing at least content identification information, content title information, content data set identification information storage area, content data set title information storage area and recording order information storage area; and image generation means for generating and outputting an image where content data set title information stored in the content data set title information storage area corresponding to the content data recorded by the recording means are displayed side by side, and the content title information of the content data whose content data set title information is stored in the content data set title information storage area are displayed below the content data set title information in an order indicated by recording order information stored in the recording order information storage area, wherein the recording means generates, based on content data set identification information corresponding to the content data, content data set play list management information and records the content data set play list management information on the recording medium, the content data set play list management information containing content data set play list identification information, content data set identification information and content data set play list created date and time information, and the content data set play list identification information is issued to content data management information managed by the content data set play list management information; the recording means acquires the content data set play list management information containing the content data set identification information of the received content data, and then sorts the content data set play list management information based on the content data set play list created date and time information; the recording section extracts the oldest content data set play list management information out of the content data set play list management information; when the content data management information corresponding to the recording order information of the received content data exists within the content data management information to which the content data set play list identification information of the extracted content data set play list management information is issued, the recording means extracts the second oldest content data set play list management information; the recording means extracts the content data set play list management information in order of time, and, when the content data management information corresponding to the recording order information of the received content data does not exist within the content data management information to which the content data set play list identification information of the extracted content data set play list management information is issued, issues the content data set play list identification information of the content data set play list management information to the content data management information, and then records, along with the content data main body, the content data management information on the recording medium; and the recording means generates new content data set play list management information when the content data management information corresponding to the recording order information of the received content data exists within the content data management information to which the content data set play list identification information of all the content data set play list management information to be recorded is issued, and issues the content data set play list identification information, which was issued to the content data set play list management information, to the received content data management information, and then records, along with the content data main body, the content data management information on the recording medium.

Accordingly, the information processing apparatus can display the titles of content data classified by content data set and in the recording order.

The information processing apparatus according to an embodiment of the present invention can display the titles of content data classified by content data set and in the recording order. Thus, the information processing apparatus can classify and display the content data in an effective manner.

BRIEF DESCRIPTION OF THE DRAWINGS

FIG. 20 is a schematic diagram illustrating an attribute information management table.

BEST MODE FOR CARRYING OUT THE INVENTION

An embodiment of the present invention will be described in detail with reference to the accompanying drawings.

(1) Music Related Service Provision System (1-1) Configuration of the System

Figure 1:
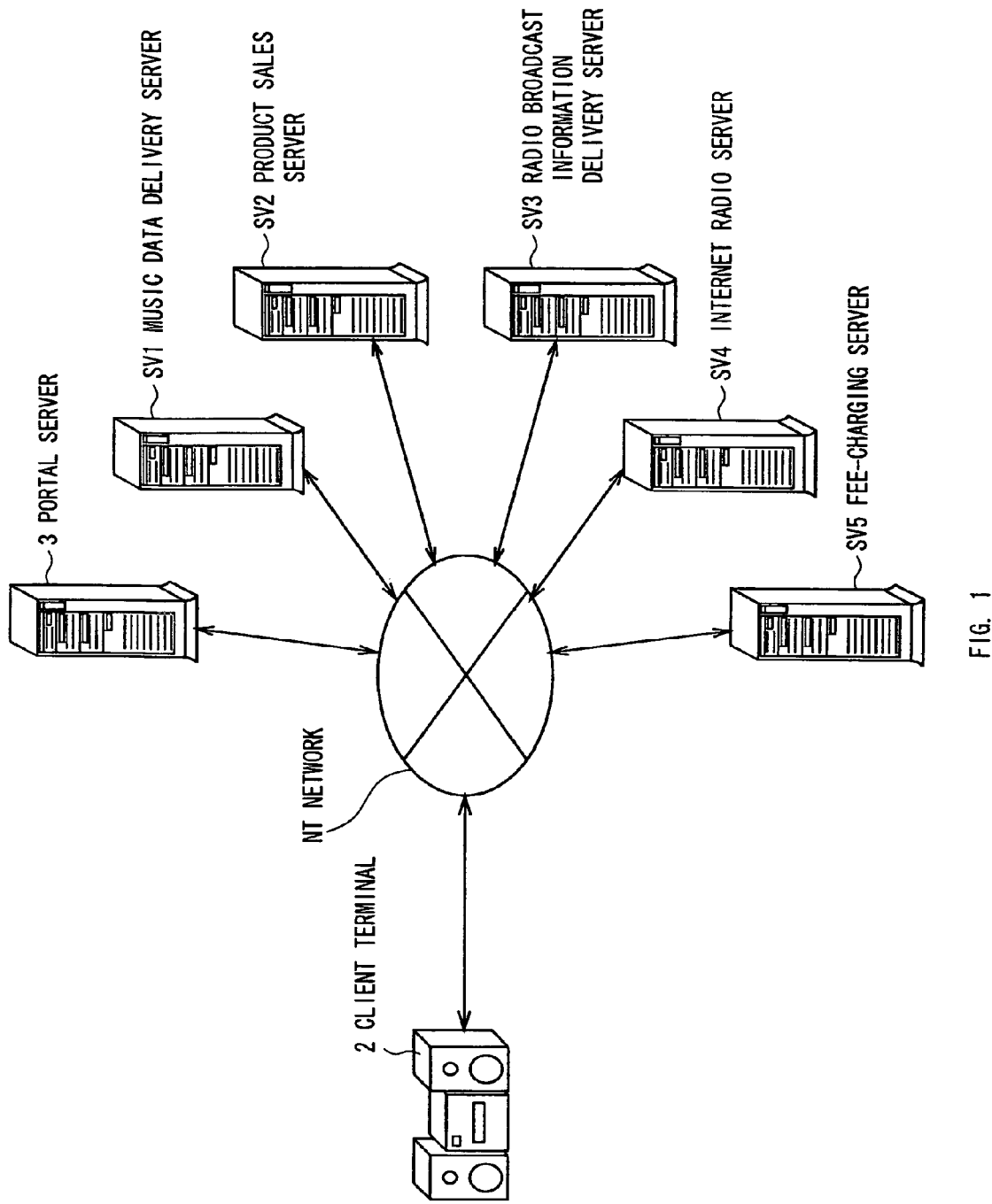
FIG. 1 is a schematic diagram showing the overall configuration of a music related service provision system in accordance with an embodiment of the present invention.

Referring to FIG. 1, the reference numeral 1 represents a music related service provision system as a whole. The music related service provision system 1 includes a client terminal 2 whose user has contracted with a company operating the music related service provision system 1; a portal server 3, which controls the client terminal 2; and a plurality of servers SV1 through SV5, which provides the client terminal 2 with various services related to music.

In this embodiment, the music data delivery server SV1 provides a music data distribution service of distributing music data to the client terminal 2. The music data has been converted into a format such as ATRAC3 (Adaptive Transform Acoustic Coding 3), AAC (Advanced Audio Coding), WMA (Windows (Registered Trademark) Media Audio), Real-AUDIO G2 Music Codec, MP3 (MPEG Audio Layer-3), and the like.

A product sales server SV2 provides a sales service of selling CDs (Compact Discs), DVDs (Digital Versatile Discs), and the like to users through the client terminal 2.

A radio broadcast information delivery server SV3 provides a radio broadcast information distribution service of distributing to the client terminal 2 radio broadcast information related to music and radio programs broadcast by radio stations.

An Internet radio server SV4 provides an Internet radio broadcast service. In the Internet radio broadcast services, the Internet radio server SV4 supplies radio broadcast data in streaming format to the client terminal 2 via a network NT. In this case, the network NT is equivalent to the Internet.

A fee-charging server SV5 performs a fee-charging process to charge users various fees in response to requests from the portal server 3 and the like.

(1-2) Configuration of Client Terminal 2
(1-2-1) Functional Circuit Block Configuration of Client Terminal 2

Figure 2:
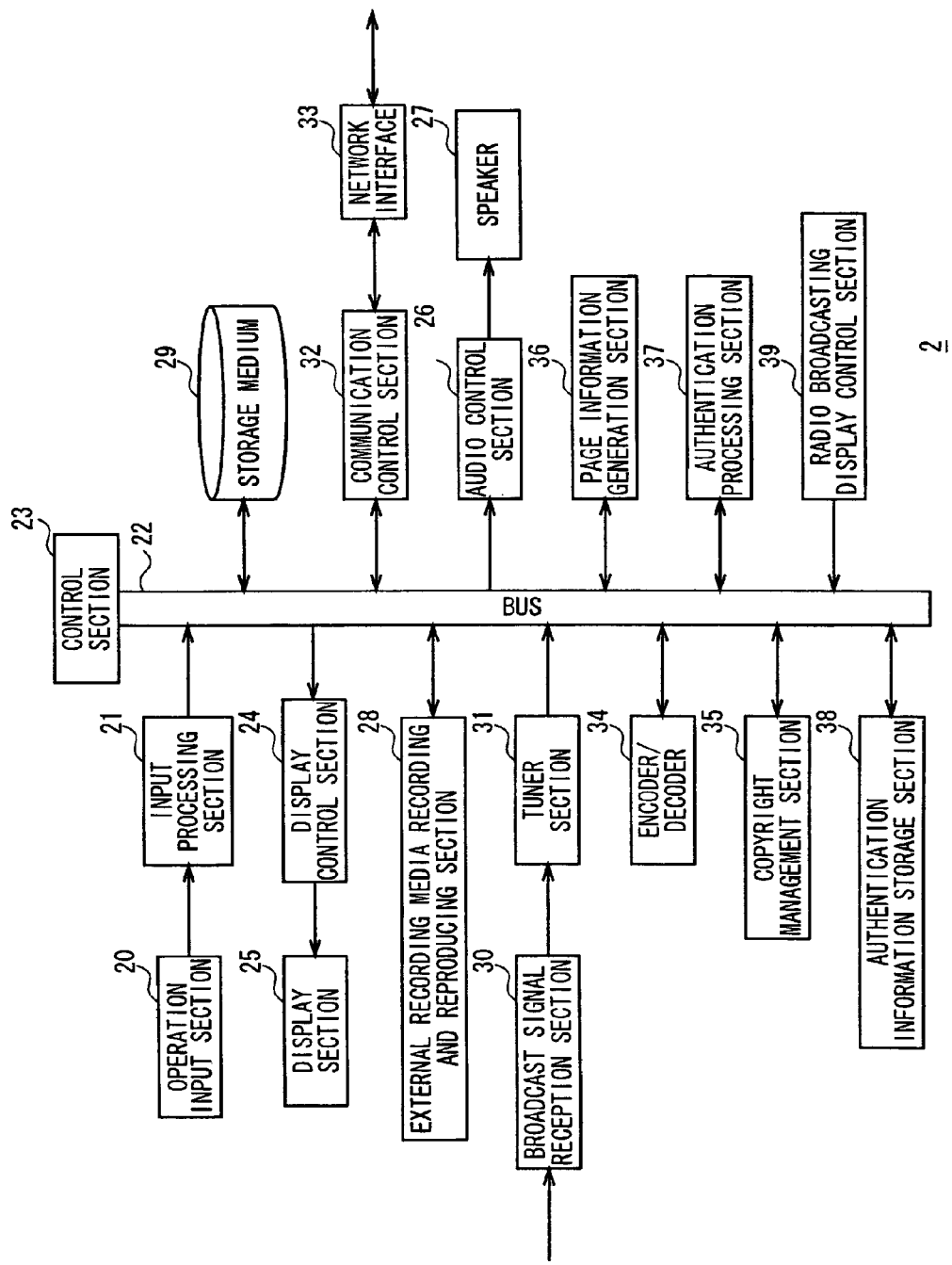
FIG. 2 is a block diagram showing the hardware configuration of a client terminal using functional circuit blocks.

The following describes the hardware configuration of the client terminal 2 using functional circuit blocks. As shown in FIG. 2, the client terminal 2 has an operation input section 20 including various kinds of buttons. The operation input section 20 is disposed on a housing of the client terminal 2 or remote control (not shown). If a user operates the operation input section 20, the operation input section 20 detects the operation, and then supplies an operation input signal corresponding to the operation to an input processing section 21.

The input processing section 21 transforms the operation input signal supplied from the operation input section 20 into a specific operation command, and then transmits the operation command to a control section 23 through a bus 22.

The control section 23 has been connected to each circuit via the bus 22. The control section 23 controls operation of each circuit based on the operation command and a control signal supplied from the circuits.

A display control section 24 receives video data through the bus 22, and then performs digital-to-analog conversion to the video data to generate an analog video signal. The display control section 24 subsequently supplies the analog video signal to a display section 25.

The display section 25, which is for example a display device such as a liquid crystal display, may be disposed on the housing directly or externally.

The display section 25 receives the analog video signal from the display control section 24, and then displays an image based on the analog video signal. The analog video signal includes a result of processing by the control section 23 or various video data.

An audio control section 26 receives audio data via the bus 22, and then performs digital-to-analog conversion to the audio data to generate an analog audio signal. The audio control section 26 then transmits the analog audio signal to a speaker 27 which then outputs audio based on the analog audio signal supplied from the audio control section 26.

External storage media such as CDs and "MEMORY STICK (Registered Trademark of Sony Corporation)" for example store content data. The "MEMORY STICK (Registered Trademark of Sony Corporation)" includes a flash memory covered with an exterior case. An external recording media recording and reproducing section 28 reads content data from external storage media, and then plays back them. Alternatively, the external recording media recording and reproducing section 28 records content data, which is to be recorded, on external storage media.

When the external recording media recording and reproducing section 28 acquires content data such as video data from an external storage medium, the external recording media recording and reproducing section 28 then transmits the video data to the display control section 24 through the bus 22.

The display control section 24 transforms the video data, which are read out from the external storage medium as content data by the external recording media recording and reproducing section 28, into an analog video signal, and then transmits the analog video signal to the display section 25.

When the external recording media recording and reproducing section 28 acquires content data such as audio data from an external storage medium, the external recording media recording and reproducing section 28 then transmits the audio data to the audio control section 26 via the bus 22.

The audio control section 26 transforms the audio data, which are read from the external storage medium as content data by the external recording media recording and reproducing section 28, into an analog audio signal, and then transmits the analog audio signal to the speaker 27.

The control section 23 supplies the content data read from external storage media by the external recording media recording and reproducing section 28 through the bus 22 to a storage medium 29 in the client terminal 2 to store the content data in the storage medium 29 (storing content data in the storage medium 29 as described above is referred to as ripping).

When the control section 23 acquires content data such as video data from the storage medium 29, the control section 23 then supplies the video data to the display control section 24 through the bus 22. The video data are for example equivalent to image data.

When the control section 23 acquires content data such as audio data from the storage medium 29, the control section 23 then supplies the audio data to the audio control section 26 via the bus 22.

The control section 23 also reads music data from the storage medium 29, and then supplies the music data to the external recording media recording and reproducing section 28 to records the music data on the external storage media.

A broadcast signal reception section 30 receives radio waves from each broadcast station, and then transmits the radio waves to a tuner section 31.

In a case in which a user operates the operation input section 20 to specify a certain radio station, the tuner section 31 under the control of the control section 23 extracts a radio broadcast signal of frequency corresponding to the station specified from the radio waves received by the broadcast signal reception section 30. The tuner section 31 then performs a prescribed reception process to generate audio data, and then supplies the audio data to the audio control section 26 via the bus 22.

The audio control section 26 receives the audio data from the tuner section 31, and then transforms the audio data into an analog audio signal. The audio control section 26 subsequently transmits the analog audio signal to the speaker 27 which then outputs audio of a radio program broadcast from a radio station. Thus, a user can listen to audio of a radio program.

The control section 23 supplies the audio data from the tuner section 31 to the storage medium 29 which then stores the audio data. In this manner, the control section 23 can record audio of a radio program.

The control section 23 also connects to the network NT through a communication control section 32 and a network interface 33. The control section 23 therefore can access the portal server 3 and other servers SV1 through SV4 on the network NT. The control section 23 interchanges various information and data with the portal server 3 and other servers SV1 through SV4.

An encoder/decoder section 34 decodes compressed-coded content data, and then transmits the compressed-coded content data to the display control section 24 or the audio control section 26. The compressed-coded content data is for example obtained from the network NT through the network interface 33 and the communication control section 32. Alternatively, the compressed-coded content data is for example obtained from the storage medium 29 or external storage media.

The encoder/decoder section 34 performs a compression encoding process to generate compressed-coded content data, and then supplies the compressed-coded content data to the storage medium 29. In this case, the content data from external storage media, which is neither compressed nor encoded, the audio data from the tuner section 31, and the like are compressed and encoded by the encoder/decoder section 34.

Accordingly, the content data compressed and encoded by the encoder/decoder section 34 is stored in the storage medium 29 under the control of the control section 23.

The copyright management section 35 generates copyright management information about the content data downloaded from the network NT through the network interface 33 and the communication control section 32. The copyright management section 35 also generates copyright management information about the content data read from external storage media by the external recording media recording and reproducing section 28.

The copyright management information generated by the copyright management section 35 is associated with corresponding content data, and then stored in the storage medium 29 under the control of the control section 23.

The copyright management section 35 properly updates copyright management information associated with content data, when a check-out process of content data between the storage medium 29 and a specific external storage medium is performed, or when a check-in process of content data between the storage medium 29 and a specific external storage medium is performed. In this manner, the copyright management section 35 protects copyright of the content data.

A page information generation section 36 interprets page information, which includes XML (eXtensible Markup Language) files or HTML (Hyper Text Markup Language) files obtained from the network NT via the network interface 33 and the communication control section 32, to generate the video data to be displayed on the display section 25. The page information generation section 36 then supplies the video data to the display control section 24.

An authentication processing section 37 connects to the portal server 3 and other servers SV1 through SV4 on the network NT through the network interface 33. The authentication processing section 37 performs an authentication process such as transmitting authentication information to the portal server 3 and other servers SV1 through SV4 through the communication control section 32 and the network interface 33.

An authentication information storage section 38 stores the authentication information the authentication processing section 37 uses to access the portal server 3 and other servers SV1 through SV4.

A radio broadcasting display control section 39 currently receiving a radio program which a user listens to transmits a request signal, which requests radio broadcast information about the radio program, to the radio broadcast information delivery server SV3, which corresponds to a radio station currently broadcasting the radio program, through the communication control section 32 and the network interface 33.

As a result, the radio broadcasting display control section 39 receives the radio broadcast information from the radio information delivery server SV3 on the network NT via the network interface 33 and the communication control section 32, and then supplies the radio broadcast information to the display control section 24. The display control section 24 displays on the display section 25 the radio broadcast information including a title of the radio program being received, a title of the music being received, an artist name of the music, and the like.

(1-2-2) Directory Management

Figure 3:
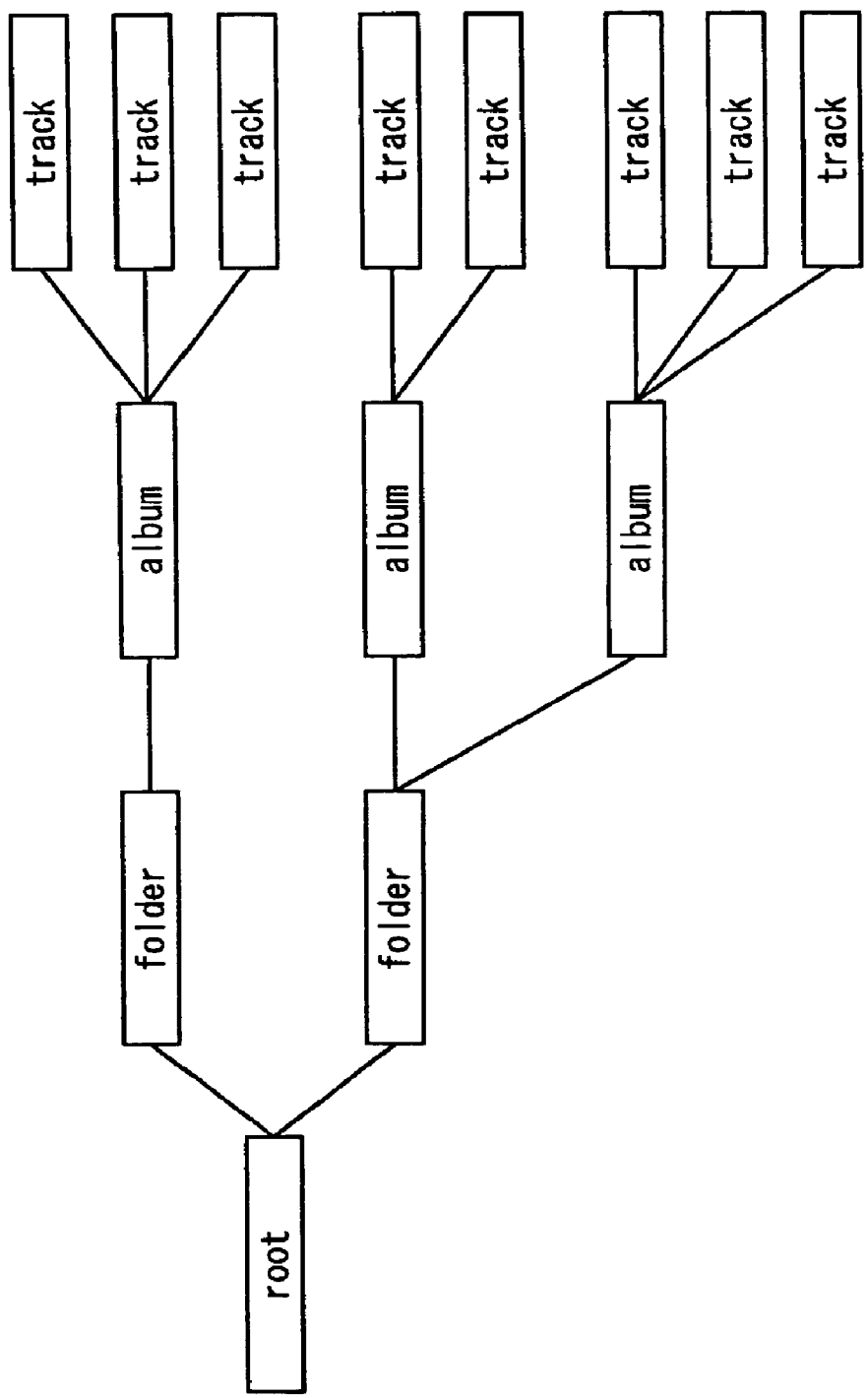
FIG. 3 is a schematic diagram showing a directory structure.

The control section 23 of the client terminal 2 manages content data stored in the storage medium 29 using a directory structure as shown in FIG. 3. One or more "folder" directories are created under a "root" directory. Specifically, the number of the "folder" directories created under the "root" directory is limited. The created "folder" directories for example correspond to genres of content data, or users who own the client terminal 2.

One or more "album" directories are created under a "folder" directory. Specifically, the number of the "album" directories created under a "folder" directory is limited. Each "album" directory for example corresponds to an album title. One or more "track" files are disposed under an "album" directory, so as to belong to the "album". Each "track" file corresponds to a piece of music, i.e., a content data.

The directory management of content data is performed based on data base files stored in the storage medium 29.

(1-3) Functional Circuit Block Configuration of Portal Server 3

Figure 4:
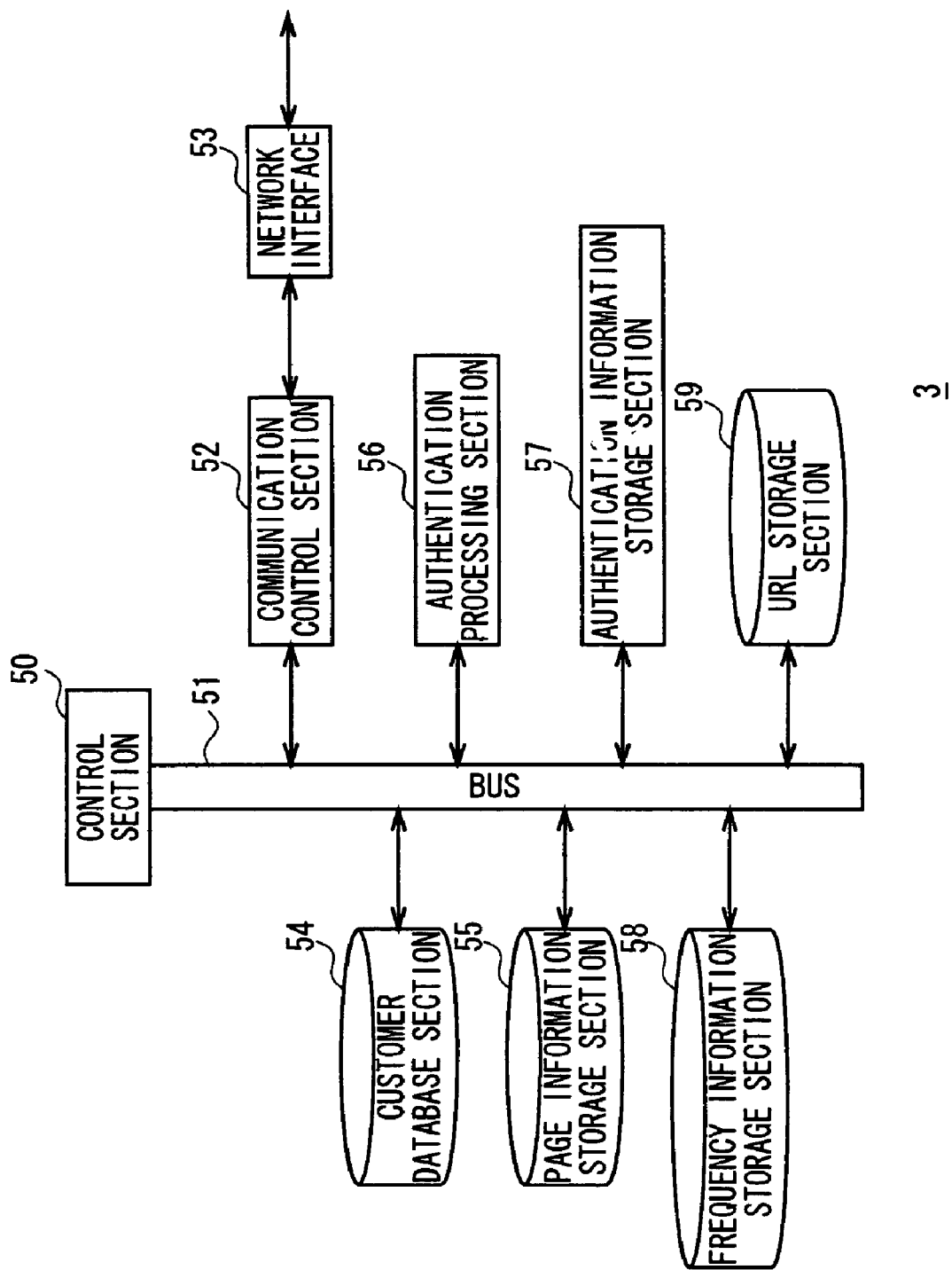
FIG. 4 is a block diagram showing the hardware configuration of a portal server using functional circuit blocks.

With reference to FIG. 4, the hardware configuration of the portal server 3 will be described using functional circuit blocks. The control section 50 of the portal server 3 controls operation of each circuit connected via a bus 51.

A communication control section 52 under the control of the control section 50 interchanges various kinds of information with the client terminal 2 and other servers SV1 through SV5 via a network interface 53.

A customer database section 54 stores a user ID (Identification) of a user who has contracted with a company operating the music related service provision system 1, along with its password information as customer information.

A page information storage section 55 stores page information and the like. The page information is being managed by the company operating the music related service provision system 1.

By the way, the page information is described in XML language or the like. The page information includes URL (Uniform Resource Locator) information to be used to access the music data delivery server SV1, the product sales server SV2, the radio broadcast information delivery server SV3, the Internet radio server SV4 and the like.

An authentication processing section 56 receives the user ID information and password information from the client terminal 2 through the network interface 53 and the communication control section 52, and then performs a user authentication process. In the processes of user authentication, the authentication processing section 56 checks whether or not the received user ID information and password information have been registered in the customer database section 54 as customer information.

After completing the user authentication processes, the authentication processing section 56 issues "portal authentication result information (equivalent to "authentication session ID information" described below)" showing a result of the user authentication process. The authentication processing section 56 then temporarily stores the portal authentication result information in an authentication information storage section 57.

If the result of the user authentication processes by the authentication processing section 56 indicates a fact that the user is legitimate, the control section 50 transmits contractor's page information and portal authentication result information to the client terminal 2 via the communication control section 52 and the network interface 53. The contractor's page information has been stored in a page information storage section 55.

If the result of the user authentication processes by the authentication processing section 56 indicates a fact that the user is not legitimate, the control section 50 may transmit authentication error information and authentication failure notification page information to the client terminal 2 via the communication control section 52 and the network interface 53. In this case, the authentication failure notification page information showing a failure of authentication has been stored in the page information storage section 55.

The client terminal 2 may obtain "portal authentication result information (equivalent to "authentication ticket" described below)" from the music data delivery server SV1, the product sales server SV2 or the radio broadcast information delivery server SV3, after the music data delivery server SV1, the product sales server SV2 or the radio broadcast information delivery server SV3 performs an authentication process of a user. In this case, the authentication processing section 56 receives the portal authentication result information from the user's client terminal 2 via the network interface 53 and the communication control section 52, and then compares the portal authentication result information with the one which corresponds to the user and is temporarily stored in the authentication information storage section 57.

The authentication processing section 56 performs an authentication process to the portal authentication result information that the client terminal 2 received from the music data delivery server SV1, the product sales server SV2 or the radio broadcast information delivery server SV3. In the authentication processes, the authentication processing section 56 performs a check process to check whether or not the received portal authentication result information is legitimate, and then transmits check result information showing a result of the check through the communication control section 52 and the network interface 53 to the music data delivery server SV1, the product sales server SV2 or the radio broadcast information delivery server SV3.

A frequency information storage section 58 associates the following items together to memorize: a regional code identifying a region, such as a postal code; frequency information showing a radio broadcast frequency receivable in the region; a name of a radio station (which is also referred to as "radio station name") which broadcasts radio programs; and a call sign, which is identification information unique to each radio station.

A URL storage section 59 associates call signs of radio stations with corresponding URL information to stores them. The call sign is unique to each radio station which broadcasts radio programs. The URL information is utilized to acquire radio broadcast information. The radio broadcast information includes information about a radio program currently broadcast from a radio station which corresponds to the call sign associated. The radio broadcast information, which is also referred to as "now-on-air information", for example includes a title of a radio program, and a title of music currently played in the radio program.

(1-4) Functional Circuit Block Configuration of Music Data Delivery Server SV1

Figure 5:
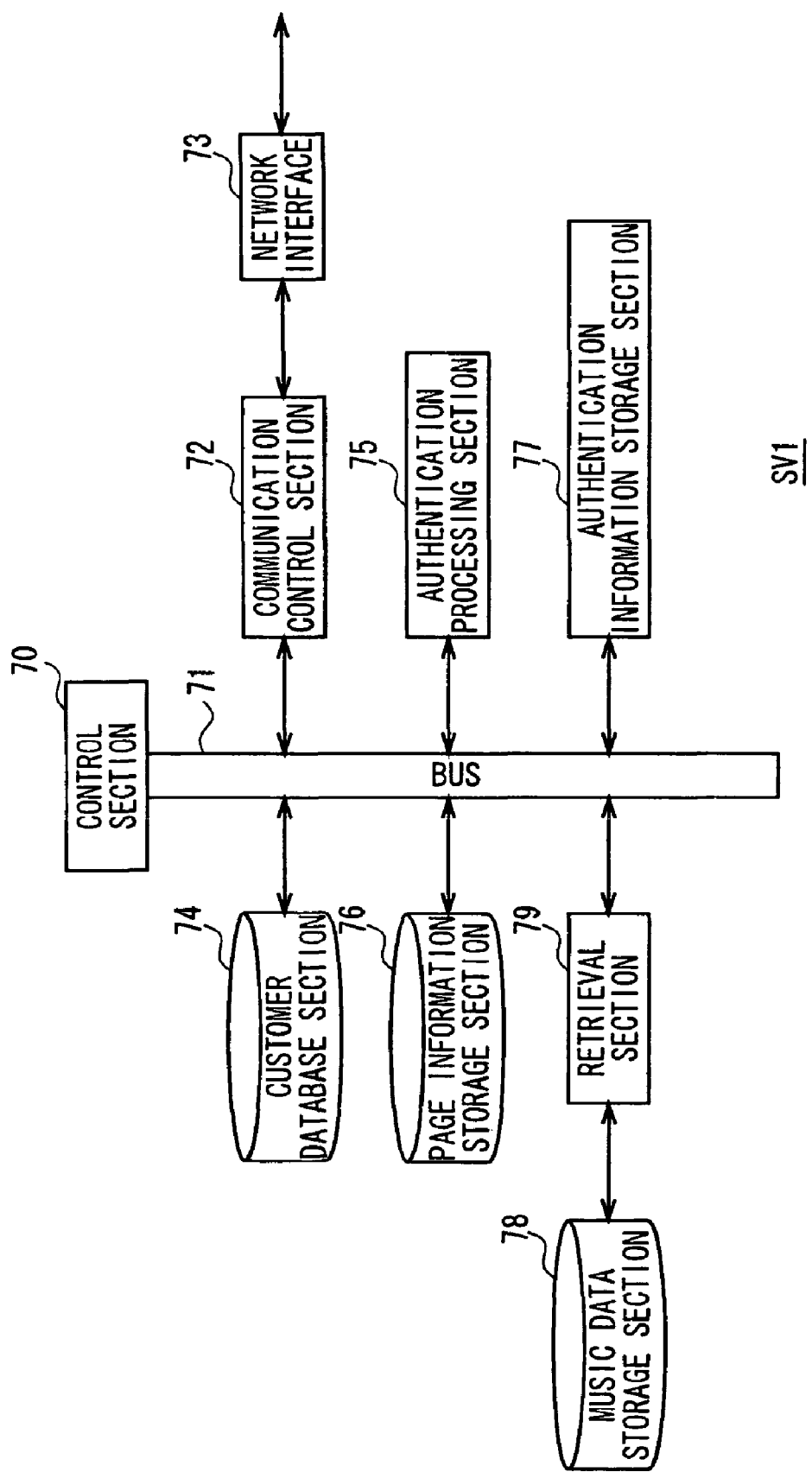
FIG. 5 is a block diagram showing the hardware configuration of a music data delivery server using functional circuit blocks.

With reference to FIG. 5, the configuration of the music data delivery server SV1 will be described using functional circuit blocks. The control section 70 of the music data delivery server SV1 controls operation of each circuit connected via a bus 71.

A communication control section 72 under the control of the control section 70 interchanges various kinds of information and various kinds of data such as content data with the client terminal 2, the portal server 3, and the like via a network interface 73.

A customer database section 74 stores user ID information of a user who has contracted with a company operating the music data delivery server SV1, along with its password information as customer information. By the way, an authentication processing section 75 may have capabilities to authenticate a user based on portal authentication result information (this portal authentication result information is issued by the portal server 3 to the client terminal 2 and transmitted from the client terminal 2 to the music data delivery server SV1). In this case, the customer database section 74 can be omitted.

A page information storage section 76 stores page information, which is utilized for distribution of music data and presenting downloadable music data (this page information is also referred to as "music-data-distribution page information"), and the like. The page information is managed by the music data delivery server SV1.

The music-data-distribution page information, described in the XML language or the like, has a structure through which a user of the client terminal 2 can select the music data he/she wants to download.

When the client terminal 2 transmits a page information acquisition request signal, which requests the music-data-distribution page information, the control section 70 receives the page information acquisition request signal via the network interface 73 and the communication control section 72. The control section 70 then transmits, in response to the page information acquisition request signal, the music-data-distribution page information stored in the page information storage section 76 to the client terminal 2 via the communication control section 72 and the network interface 73.

When the client terminal 2 transmits the user's user ID information and the password information, the authentication processing section 75 receives the user ID information and the password information via the network interface 73 and the communication control section 72. The authentication processing section 75 then performs a user authentication process. In the user authentication process, the authentication processing section 75 checks whether or not the user ID information and password information received has been registered in the customer database section 74 as customer information.

The authentication processing section 75 may perform another user authentication process, which is different from the one which uses the user ID information and the password information. In this case, the client terminal 2 supplies portal authentication result information (equivalent to an "authentication ticket" described below) issued by the portal server 3. The authentication processing section 75 receives the portal authentication result information via the network interface 73 and the communication control section 72, and then supplies the portal authentication result information to the portal server 3 via the communication control section 72 and the network interface 73.

In this manner, the portal authentication result information is supplied from the authentication processing section 75 to the portal server 3. The portal server 3 then performs an authentication process to the portal authentication result information (i.e. the check process described above), and then supplies the check results information. The authentication processing section 75 receives the check results information via the network interface 73 and the communication control section 72, and then checks whether or not the user is legitimate based on the check results information. In this case, a legitimate user is the one who has contracted with a company operating the music related service provision system 1.

After completing the user authentication process, the authentication processing section 75 issues server authentication result information (equivalent to a "service session ID information" described below). The server authentication result information shows a result of the user authentication process.

If the result of the user authentication process by the authentication processing section 75 indicates a fact that the user is legitimate, the control section 70 transmits the music-data-distribution page information and the server authentication result information to the client terminal 2 via the communication control section 72 and the network interface 73. The music-data-distribution page information for contractors has been stored in the page information storage section 76.

By contrast, when the result of the user authentication process by the authentication processing section 75 shows a fact that the user is not legitimate, the control section 70 transmits authentication error information and authentication failure notification page information to the client terminal 2 via the communication control section 72 and the network interface 73. In this case, the authentication failure notification page information showing a failure of authentication has been stored in the page information storage section 76.

By the way, an authentication information storage section 77 temporarily stores the server authentication result information issued by the authentication processing section 75. The authentication information storage section 77 also stores other authentication information which is necessary for the authentication processing section 75 to authenticate a user of the client terminal 2.

A music data storage section 78 has stored compressed-coded music data associated with corresponding retrieval keys. The music data has been compressed and encoded in ATRAC3 format, MP3 format, or the like. The retrieval key is equivalent to content ID information and the like.

By the way, after the music-data-distribution page information is transmitted to the client terminal 2, the client terminal 2 may transmit a download request signal. The download request signal requests download of music data which a user wants to download, and includes a retrieval key for searching the music data. A retrieval section 79 receives the download request signal via the network interface 73 and the communication control section 72, and then obtains the retrieval key from the download request signal.

The retrieval section 79 then searches a plurality of music data stored in the music data storage section 78 for the music data which meets a retrieval condition indicated by the retrieval key. That is to say, the retrieval section 79 searches for the music data which a user wants to download.

As a result, the control section 70 transmits the searched music data (which a user wants to download) to the client terminal 2 via the communication control section 72 and the network interface 73.

At this time, the control section 70 transmits fee-charging information to the fee-charging server SV5 via the communication control section 72 and the network interface 73. The fee-charging information is used to charge users a fee for the music data downloaded to the client terminal 2. The fee-charging server SV5 performs a fee-charging process to charge the user a fee for the downloaded music data.

(1-5) Functional Circuit Block Configuration of Product Sales Server SV2

Figure 6:
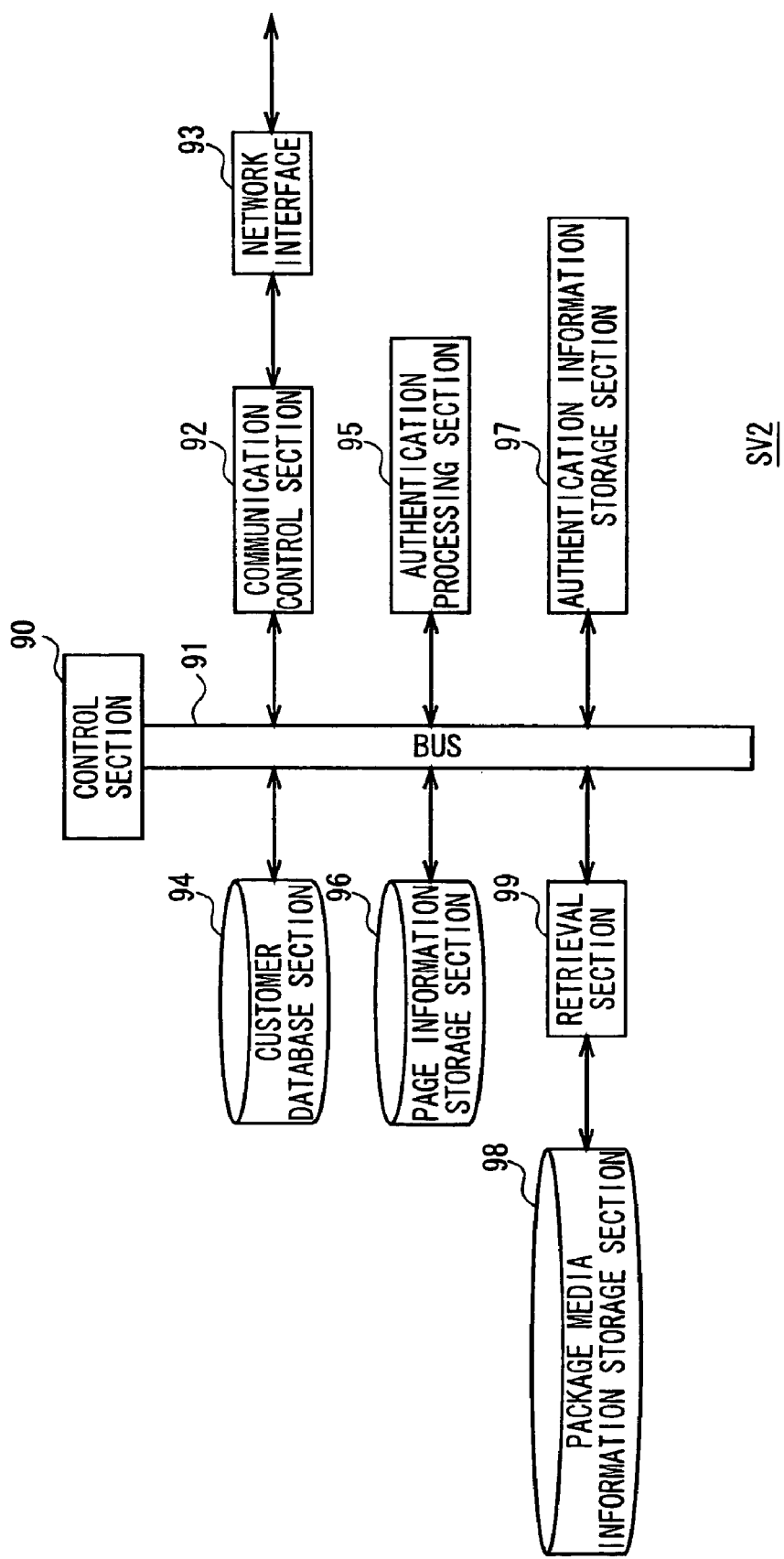
FIG. 6 is a block diagram showing the hardware configuration of a product sales server using functional circuit blocks.

With reference to FIG. 6, the hardware configuration of the product sales server SV2 will be described using functional circuit blocks. A control section 90 of the product sales server SV2 controls operation of each circuit connected via a bus 91.

A communication control section 92 under the control of the control section 90 interchanges various kinds of information with the client terminal 2, the portal server 3, and the like via a network interface 93.

A customer database section 94 stores user ID information of a user who has contracted with a company operating the product sales server SV2, along with its password information, as customer information. By the way, an authentication processing section 95 may have capabilities to authenticate a user based on portal authentication result information (this portal authentication result information is issued by the portal server 3 to the client terminal 2 and transmitted from the client terminal 2 to the product sales server SV2). In this case, the customer database section 94 can be omitted.

A page information storage section 96 stores page information, which is utilized for sales of package media and presenting package media such as CDs and DVDs for sale (this page information is also referred to as "package-media-sales page information"), and the like. The page information is managed by the product sales server SV2.

The package-media-sales page information, described in the XML language or the like, has a structure through which a user of the client terminal 2 can select package media such as CDs and DVDs which the user wants to buy.

When the client terminal 2 transmits a page information acquisition request signal, which requests the package-media-sales page information, the control section 90 receives the page information acquisition request signal via the network interface 93 and the communication control section 92. The control section 90 then transmits, in response to the page information acquisition request signal, the package-media-sales page information stored in the page information storage section 96 to the client terminal 2 via the communication control section 92 and the network interface 93.

When the client terminal 2 transmits the user's user ID information and the password information, the authentication processing section 95 receives the user ID information and the password information via the network interface 93 and the communication control section 92. The authentication processing section 95 then performs a user authentication process. In the user authentication process, the authentication processing section 95 checks whether or not the user ID information and password information received has been registered in the customer-database section 94 as customer information.

The authentication processing section 95 may perform another user authentication process, which is different from the one that uses the user ID information and the password information. In this case, the client terminal 2 transmits portal authentication result information (equivalent to an "authentication ticket" described below) issued by the portal server 3. The authentication processing section 95 receives the portal authentication result information via the network interface 93 and the communication control section 92, and then transmits the portal authentication result information to the portal server 3 via the communication control section 92 and the network interface 93.

In this manner, the portal authentication result information is transmitted from the authentication processing section 95 to the portal server 3. The portal server 3 then performs an authentication process to the portal authentication result information (i.e. the check process described above), and then transmits check results information. The authentication processing section 95 receives the check results information via the network interface 93 and the communication control section 92, and then checks whether or not the user is legitimate based on the check results information. In this case, a legitimate user is the one who has contracted with a company operating the music related service provision system 1.

After completing the user authentication process, the authentication processing section 95 issues server authentication result information (equivalent to a "service session ID information" described below). The server authentication result information shows a result of the user authentication process.

When the result of the user authentication process by the authentication processing section 95 indicates a fact that the user is legitimate, the control section 90 transmits the package-media-sales page information and the server authentication result information to the client terminal 2 via the communication control section 92 and the network interface 93. The package-media-sales page information for contractors has been stored in the page information storage section 96.

Whereas when the result of the user authentication process by the authentication processing section 95 shows a fact that the user is not legitimate, the control section 90 transmits authentication error information and authentication failure notification information to the client terminal 2 via the communication control section 92 and the network interface 93. In this case, the authentication failure notification information showing a failure of authentication has been stored in the page information storage section 96.

An authentication information storage section 97 temporarily stores the server authentication result information issued by the authentication processing section 95. The authentication information storage section 97 also stores other authentication information which is necessary for the authentication processing section 95 to authenticate a user of the client terminal 2.

A package media information storage section 98 has stored a plurality of pieces of package media information associated with corresponding retrieval keys. Each piece of package media information relates to a package medium such as CD and DVD for sale. The retrieval key is equivalent to package medium ID information and the like.

By the way, after the package-media-sales page information is transmitted to the client terminal 2, the client terminal 2 may transmits a media information request signal. The media information request signal requests package media information about package media such as CDs and DVDs. A retrieval section 99 receives the media information request signal via the network interface 93 and the communication control section 92, and then obtains a retrieval key from the media information request signal. The retrieval key is used to retrieve a specific package medium.

The retrieval section 99 then searches a plurality of piece of package media information stored in the package media information storage section 98 for a piece of package media information which meets a retrieval condition indicated by the retrieval key.

As a result, the control section 90 transmits the searched package media information to the client terminal 2 via the communication control section 92 and the network interface 93, and therefore shows a user the package media information about the specific package medium.

When the client terminal 2 transmits a purchase request signal, which requests a purchase of the package medium, the control section 90 receives the purchase request signal via the network interface 93 and the communication control section 92, and then performs a sale process. In the sale processes, the control section 90 for example performs a shipping procedure to ship the package medium to the user of the client terminal 2.

At this time, the control section 90 transmits fee-charging information to the fee-charging server SV5 via the communication control section 92 and the network interface 93. The fee-charging information is used to charge a user a fee for the purchased package medium. The fee-charging server SV5 performs a fee-charging process to charge the user a fee for the purchased package medium.

After the fee-charging server SV5 completes the fee-charging processes for the user, the control section 90 subsequently transmits sale completion page information to the client terminal 2 via the communication control section 92 and the network interface 93. The sale completion page information shows a fact that the sale process of the package medium has been completed.

(1-6) Functional Circuit Block Configuration of Radio Broadcast Information Delivery Server SV3

Figure 7:
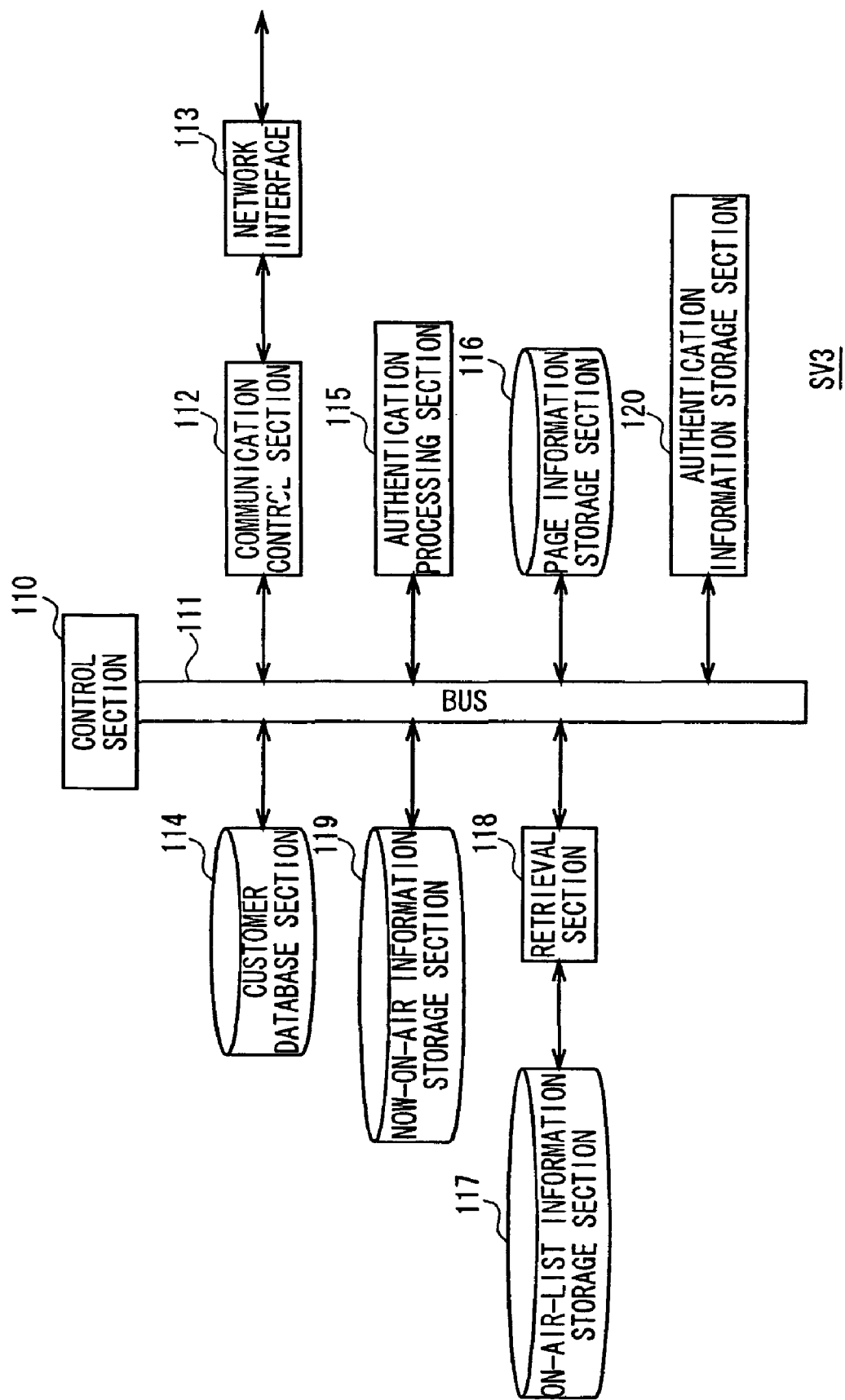
FIG. 7 is a block diagram showing the hardware configuration of a radio broadcast information delivery server using functional circuit blocks.

With reference to FIG. 7, the hardware configuration of the radio broadcast information delivery server SV3 will be described using functional circuit blocks. A control section 110 of the radio broadcast information delivery server SV3 controls operation of each circuit connected via a bus 111.

A communication control section 112 under the control of the control section 110 interchanges various kinds of information with the client terminal 2, the portal server 3, and the like via a network interface 113.

A customer database section 114 stores user ID information of a user who has contracted with a company operating the radio broadcast information delivery server SV3, along with its password information as customer information. By the way, an authentication processing section 115 may have capabilities to authenticate a user based on portal authentication result information (this portal authentication result information is issued by the portal server 3 to the client terminal 2 and transmitted from the client terminal 2 to the radio broadcast information delivery server SV3). In this case, the customer database section 114 can be omitted.

A page information storage section 116 stores page information which is used for acquisition of radio broadcast information, and the like. In this case, the radio broadcast information relates to radio programs which have already been broadcast from a radio station corresponding to the radio broadcast information delivery server SV3. The radio broadcast information is also referred to as "on-air-list information", and the page information used for acquisition of on-air-list information is also referred to as "on-air-list-information-distribution page information". The page information is managed by the radio broadcast information delivery server SV3.

The on-air-list-information-distribution page information, described in the XML language or the like, provides an input box and the like through which a user of the client terminal 2 can input retrieval keys of the on-air-list information which he/she wants to obtain. A radio program title, a date and time of broadcast of a radio program, and the like could be the retrieval key.

An on-air-list information storage section 117 stores on-air-list information. The on-air-list information is generated by listing the following information: a title of a radio program which has already been broadcast from a radio station corresponding to the radio broadcast information delivery server SV3; a start and end time of broadcast of the program; an artist name and title of music played in the program; the start time of broadcast of the music, and the like.

When the client terminal 2 transmits a page information acquisition request signal which requests on-air-list-information-distribution page information, the control section 110 receives the page information acquisition request signal via the network interface 113 and the communication control section 112. The control section 110 then transmits, in response to the page information acquisition request signal, the on-air-list-information-distribution page information which has been stored in the page information storage section 116 to the client terminal 2 via the communication control section 112 and the network interface 113.

When a user inputs a retrieval key of on-air-list information the user wants to obtain through the on-air-list-information-distribution page information, the client terminal 2 transmits an on-air-list information request signal including the retrieval key. The on-air-list information request signal requests download of the on-air-list information. A retrieval section 118 receives the on-air-list information request signal via the network interface 113 and the communication control section 112, and then obtains the retrieval key from the on-air-list information request signal.

The retrieval section 118 then searches, based on the retrieval key, the whole on-air-list information stored in the on-air-list information storage section 117 to extract part of the on-air-list-information which meets a retrieval condition indicated by the retrieval key. In this manner, part of on-air-list information the user wants to acquire is obtained.

The control section 110 subsequently transmits the obtained on-air-list information to the client terminal 2 via the communication control section 112 and the network interface 113.

A now-on-air information storage section 119 stores now-on-air information. The now-on-air information is made up of the following items: a title of a radio program currently being broadcast from a radio station corresponding to the radio broadcast information delivery server SV3; a start and end time of broadcast of the program; an artist name and title of music currently being played in the program; a start time of broadcast of the music, and the like.

When the client terminal 2 transmits the user's user ID information and the password information with a now-on-air information request signal which requests now-on-air information, the authentication processing section 115 receives the user ID information and the password information via the network interface 113 and the communication control section 112. The authentication processing section 115 then performs a user authentication process. In the user authentication process, the authentication processing section 115 checks whether or not the user ID information and password information received has been registered in the customer database section 114 as customer information.

The authentication processing section 115 may perform another user authentication process. This user authentication process is different from the one which uses the user ID information and the password information. In this case, the client terminal 2 transmits portal authentication result information (equivalent to an "authentication ticket": described below) issued by the portal server 3. The authentication processing section 115 receives the portal authentication result information via the network interface 113 and the communication control section 112, and then transmits the portal authentication result information to the portal server 3 via the communication control section 112 and the network interface 113.

In this manner, the portal authentication result information is transmitted from the authentication processing section 115 to the portal server 3. The portal server 3 then performs an authentication process to the portal authentication result information (i.e. the check process described above), and then transmits check results information. The authentication processing section 115 receives the check results information via the network interface 113 and the communication control section 112, and then checks whether or not the user is legitimate based on the check results information. In this case, a legitimate user is the one who has contracted with a company operating the music related service provision system 1.

When completing the user authentication process, the authentication processing section 115 issues server authentication result information (equivalent to a "service session ID information" described below). The server authentication result information shows a result of the user authentication process.

When the result of the user authentication process by the authentication processing section 115 shows a fact that the user is legitimate, the control section 110 transmits the server authentication result information and the now-on-air information stored in the now-on-air information storage section 119 to the client terminal 2 via the communication control section 112 and the network interface 113.

Whereas when the result of the user authentication process by the authentication processing section 115 shows a fact that the user is not legitimate, the control section 110 transmits authentication error information and authentication failure notification page information to the client terminal 2 via the communication control section 112 and the network interface 113. In this case, the authentication failure notification page information showing a failure of authentication has been stored in the page information storage section 116.

As described above, when the control section 110 receives a request for now-on-air information from a user, the control section 110 supplies the now-on-air information, if the authentication result shows a fact that the user is legitimate. Whereas if the authentication result shows a fact that the user is not legitimate, the control section 110 does not provide a radio broadcast information delivery service. That is to say, the control section 110 does not supply the now-on-air information. The radio broadcast information delivery service is a service provided by the radio broadcast information delivery server SV3.

An authentication information storage section 120 temporarily stores the server authentication result information issued by the authentication processing section 115. The authentication information storage section 120 also stores other authentication information which is necessary for the authentication processing section 115 to authenticate a user of the client terminal 2.

(1-7) Brief Overview of Processes of Each Server

With reference to sequence charts shown in FIGS. 8 through 13, brief overview of processes between the client terminal 2 and the portal server 3 will be described. Also, brief overview of processes between the client terminal 2 and other servers such as the music data delivery server SV1, the product sales server SV2, and the radio broadcast information delivery server SV3 will be described.

(1-7-1) User Authentication Process Between Client Terminal 2 and Portal Server 3

Figure 8:
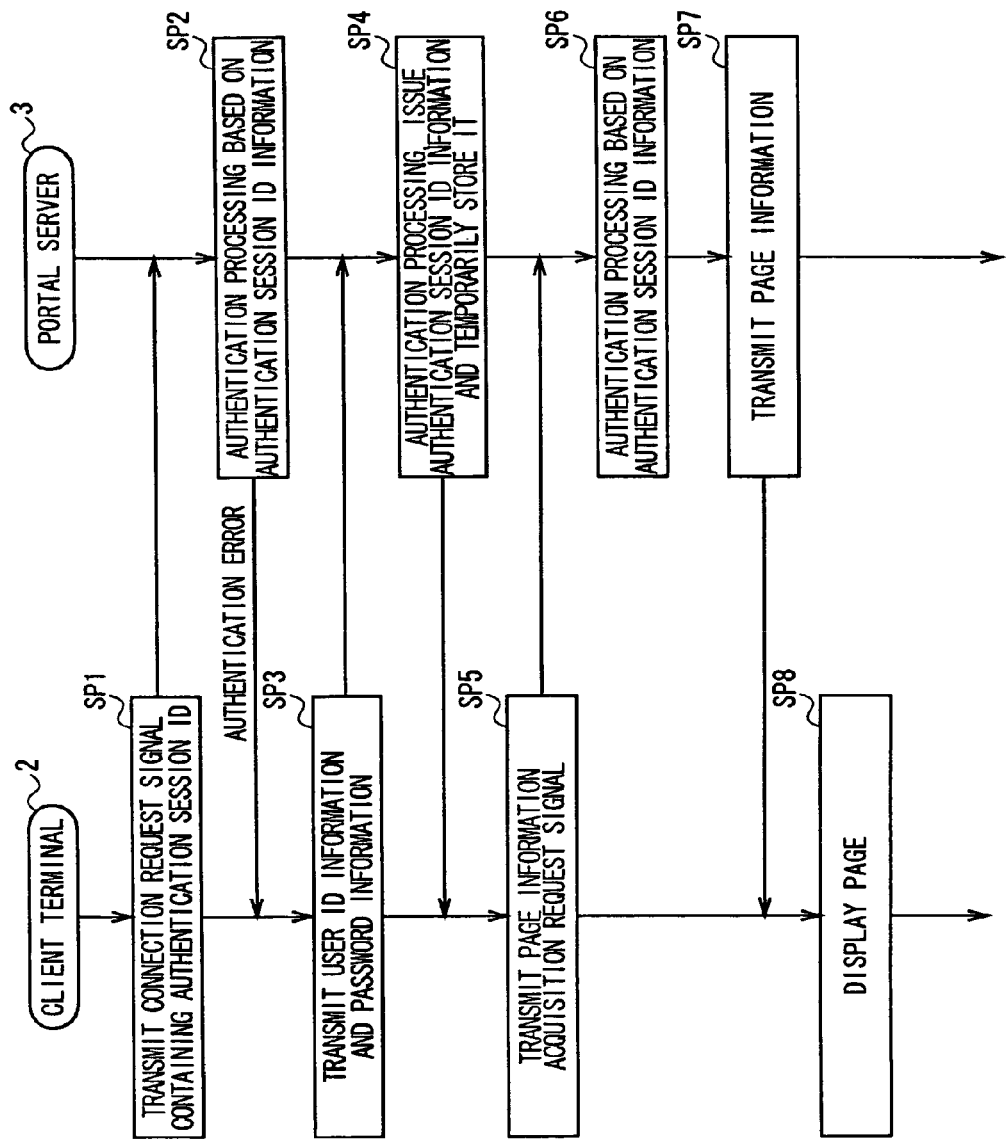
FIG. 8 is a sequence chart showing a user authentication process between the client terminal and the portal server.

Referring to FIG. 8, a user authentication process between the client terminal 2 and the portal server 3 will be described.

When a user who has contracted with a company operating the music related service provision system 1 operates the client terminal 2 to turn the client terminal 2 on, the operation input section 20 of the client terminal 2 detects an operation input signal. Alternatively, when a user pushes a particular operation button of the operation input section 20, the operation input section 20 detects an operation input signal. The input processing section 21 transforms the operation input signal into an operation command, and supplies the operation command to the control section 23. The control section 23 therefore starts an authentication request process.

At step SP1, after the control section 23 of the client terminal 2 starts an authentication request process, the control section 23 of the client terminal 2 generates a connection request signal, and then transmits the connection request signal to the portal server 3 via the communication control section 32 and the network interface 33. The connection request signal includes authentication session ID information, which has been temporarily stored in the authentication information storage section 38, and the like.

The authentication session ID information is issued by the portal server 3 each time when a communication connection between the client terminal 2 and the portal server 3 is established to perform various processes such as a user authentication process. The authentication session ID information identifies each communication connection state (i.e., session).

The authentication session ID information has a certain period of validity for a user authentication process and the like. The period of validity starts when the portal server 3 issues it. The period of validity for example is one minute.

In a case in which the client terminal 2 that has already obtained the authentication session ID information from the portal server 3 can not submit the authentication session ID information to the portal server 3 within the period of validity, the portal server 3 determines that the communication connection identified by the authentication session ID information has been broken.

In this manner, the portal server 3 prevents the issued authentication session ID information from being used improperly by someone who has not contracted with a company operating the music related service provision system 1 for the purpose of a user authentication process or the like.

In this case, the authentication information storage section 38 temporarily stores the authentication session ID information, which was issued by the portal server 3 when the communication connection between the client terminal 2 and the portal server 3 was established for the purpose of user authentication process or the like at a time in the past.

When the client terminal 2 transmits a connection request signal, the control section 50 of the portal server 3 at step SP2 receives the connection request signal via the network interface 53 and the communication control section 52. The control section 50 then transmits the authentication session ID information and the like in the connection request signal to the authentication processing section 56.

The authentication processing section 56 under the control of the control section 50 performs, based on the authentication session ID information and the like, an authentication process. This authentication session ID information was received as the connection request signal from the client terminal 2.

As a result, when the authentication processing section 56 determines that a user of the client terminal 2 is not legitimate, the control section 50 transmits authentication error information showing authentication error to the client terminal 2 via the communication control section 52 and the network interface 53. In this case, the authentication processing section 56 determines that the user is not legitimate, when the authentication session ID information and the like received from the client terminal 2 have expired, or when there are other reasons.

At step SP3, the control section 23 of the client terminal 2 receives the authentication error information from the portal server 3 via the network interface 33 and the communication control section 32. The control section 23 subsequently obtains user ID information, password information, and the like from the authentication information storage section 38, and then transmits the user ID information, the password information, and the like to the portal server 3 via the communication control section 32 and the network interface 33.

At step SP4, the control section 50 of the portal server 3 receives the user ID information, the password information, and the like from the client terminal 2 via the network interface 53 and the communication control section 52, and then supplies the user ID information, the password information, and the like to the authentication processing section 56.

The authentication processing section 56 under the control of the control section 50 performs a user authentication process. In the user authentication process, the authentication processing section 56 checks whether or not the user ID information, the password information, and the like from the client terminal 2 exist in the customer information registered in the customer database section 54.

As a result, when the authentication processing section 56 determines that a user of the client terminal 2 is legitimate, the authentication processing section 56 under the control of the control section 50 issues portal authentication result information for the client terminal 2. In this case, the portal authentication result information is equivalent to authentication session ID information which identifies the communication connection being maintained between the client terminal 2 and the portal server 3, and the like. The authentication processing section 56 then temporarily stores the authentication session ID information issued and the like in the authentication information storage section 57.

The control section 50 subsequently transmits the authentication session ID information and the like to the client terminal 2 via the communication control section 52 and the network interface 53. The authentication session ID information and the like were issued by the authentication processing section 56 to the client terminal 2.

At step SP5, the control section 23 of the client terminal 2 receives the authentication session ID information and the like from the portal server 3 via the network interface 33 and the communication control section 32, and then supplies the authentication session ID information and the like to the authentication processing section 37.

The authentication processing section 37 under the control of the control section 23 temporarily stores the authentication session ID information and the like received from the portal server 3 in the authentication information storage section 38.

The control section 23 subsequently transmits a page information acquisition request signal along with the authentication session ID information and the like (which were received from the portal server 3 and temporarily stored in the authentication information storage section 38) to the portal server 3 via the communication control section 32 and the network interface 33. The page information acquisition request signal requests the page information from the portal server 3.

At step SP6, the control section 50 of the portal server 3 receives the page information acquisition request signal, the authentication session ID information, and the like from the client terminal 2 via the network interface 53 and the communication control section 52, and then supplies the authentication session ID information, and the like to the authentication processing section 56.

The authentication processing section 56 under the control of the control section 50 then performs a user authentication process. In the user authentication process, the authentication processing section 56 compares the authentication session ID information and the like from the client terminal 2 with the ones temporarily stored in the authentication information storage section 57. The information temporarily stored in the authentication information storage section 57 was issued to the client terminal 2 at step SP4.

At step SP7, when a result of the authentication indicates a fact that a user of the client terminal 2 is legitimate, the authentication processing section 56 determines that the request for page information from the client terminal 2 is legitimate. The authentication processing section 56 then extends the period of validity of the authentication session ID information and the like.

Therefore, the control section 50 reads the page information requested by the user from the page information storage section 55, and transmits the page information, the authentication session ID information, and the like to the client terminal 2 via the communication control section 52 and the network interface 53. The authentication session ID information and the like have their period of validity extended through the authentication processing section 56.

At step SP8, the control section 23 of the client terminal 2 receives the page information, the authentication session ID information and the like from the portal server 3 via the network interface 33 and the communication control section 32. The authentication session ID information and the like have their period of validity extended. The control section 23 of the client terminal 2 then supplies the page information to the page information generation section 36. The control section 23 of the client terminal 2 also supplies the authentication session ID information and the like to the authentication processing section 37.

The page information generation section 36 generates, based on the page information from the control section 23, video data of a page containing links to the music data delivery server SV1, the product sales server SV2, and the radio broadcast information delivery server SV3. The page information generation section 36 subsequently supplies the video data to the display control section 24.

The display control section 24 performs digital-to-analog conversion to the video data supplied from the page information generation section 36 to generate an analog video signal. The display control section 24 subsequently supplies the analog video signal to the display section 25 which then displays, based on the analog video signal, an image of a page of the portal server 3.

The authentication processing section 37 under the control of the control section 23 temporarily stores the authentication session ID information and the like in the authentication information storage section 38. The authentication session ID information and the like which have their period of validity extended were received from the portal server 3. In this case, the authentication session ID information and the like overwrite the ones previously and temporarily stored in the authentication information storage section 38. The information previously and temporarily stored in the authentication information storage section 38 does not have their period of validity extended. In this manner, the authentication session ID information and the like temporarily stored at above step SP5 are updated to the ones having their period of validity extended.

(1-7-2) Procedure of User Authentication Process Between Client Terminal 2 and Servers SV1 Through SV3

Figure 9:
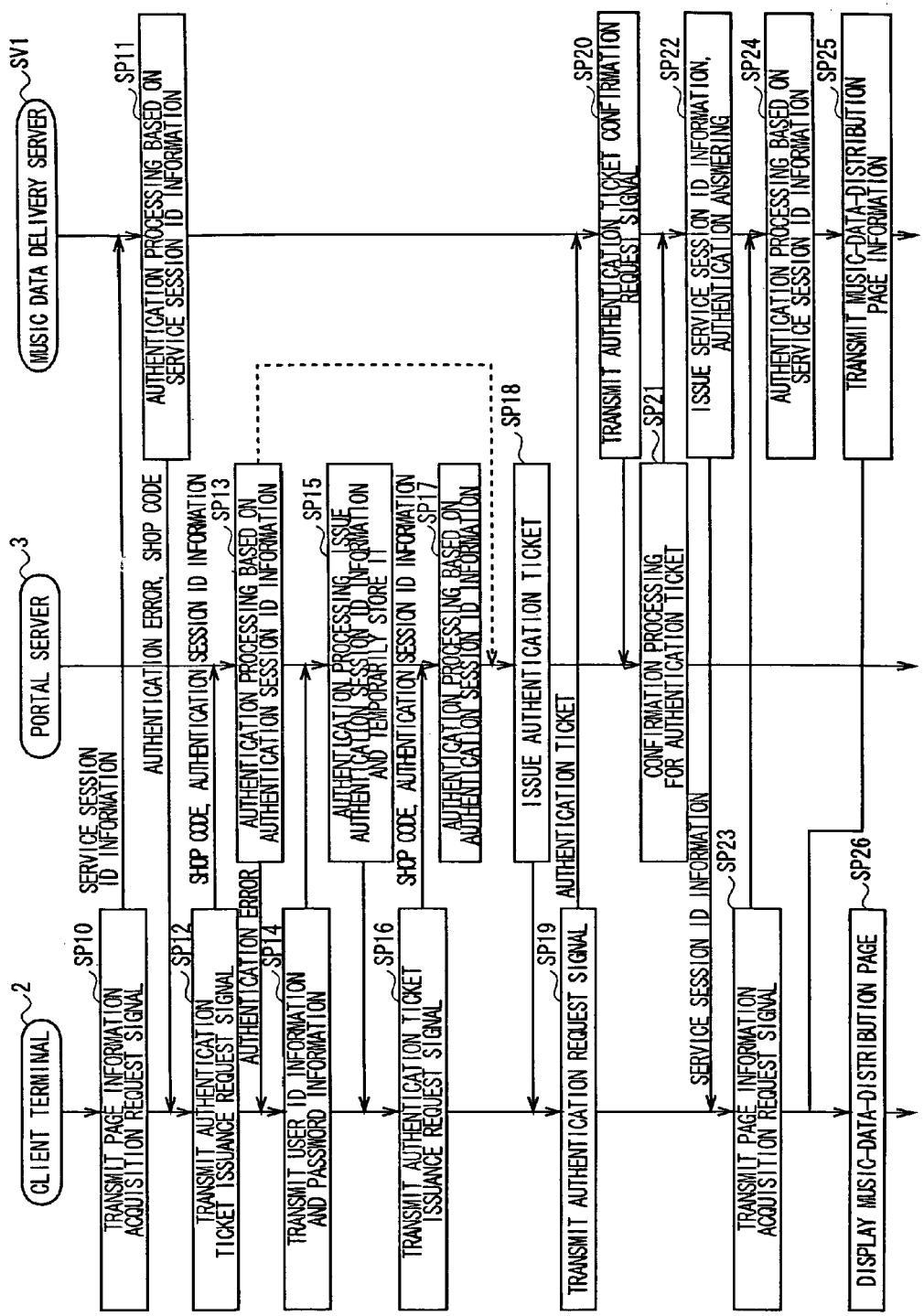
FIG. 9 is a sequence chart showing a user authentication process between the client terminal and the music data delivery server.

Referring to FIG. 9, a user authentication process will be described. The user authentication process is executed between the client terminal 2 and the music data delivery server SV1, the product sales server SV2 and the radio broadcast information delivery server SV3.

In this case, when the client terminal 2 accesses, after acquiring page information from the portal server 3 as described above (FIG. 8), the music data delivery server SV1, the product sales server SV2 and the radio broadcast information delivery server SV3 based on links embedded in the page information, the user authentication process is executed. This user authentication process is also referred to as an "indirect access authentication process".

In addition, when the client terminal 2 directly accesses the music data delivery server SV1, the product sales server SV2 and the radio broadcast information delivery server SV3 based on the URL information and the like previously bookmarked without obtaining page information from the portal server 3, the user authentication process is executed. This user authentication process is also referred to as a "direct access authentication process".

The indirect access authentication process can be performed in any combination of the following: the client terminal 2 and the music data delivery server SV1; the client terminal 2 and the product sales server SV2; and, the client terminal 2 and the radio broadcast information delivery server SV3.

The direct access authentication process also can be performed in any combination of the following: the client terminal 2 and the music data delivery server SV1; the client terminal 2 and the product sales server SV2; and, the client terminal 2 and the radio broadcast information delivery server SV3.

A difference between the indirect access authentication process and the direct access authentication process is a way of acquiring URL information which the client terminal 2 uses to access the music data delivery server SV1, the product sales server SV2 and the radio broadcast information delivery server SV3. The indirect access authentication process and the direct access authentication process perform the same procedure after obtaining the URL information.

Accordingly, for ease of explanation, the following description uses the music data delivery server SV1 which the client terminal 2 accesses. Both the indirect access authentication process and the direct access authentication process will be collectively described as a user authentication process.

At step SP10, the control section 23 of the client terminal 2 transmits a page information acquisition request signal, the service session ID information read from the authentication information storage section 38, and the like to the music data delivery server SV1 through the communication control section 32 and the network interface 33. At this time, the control section 23 of the client terminal 2 uses the URL information that has been embedded in the page information as links, or has been previously bookmarked. The page information acquisition request signal requests the music-data-distribution page information (if the client terminal 2 accesses the product sales server SV2 or the radio broadcast information delivery server SV3, the page information acquisition request signal requests the package-media-sales page information or the on-air-list-information-distribution page information).

Each time when the communication connection between the client terminal 2 and the music data delivery server SV1, the client terminal 2 and the product sales server SV2, or the client terminal 2 and the radio broadcast information delivery server SV3 is established to perform various processes such as the user authentication process, the service session ID information is issued by the connected server SV1, SV2 or SV3. The service session ID information identifies each communication connection state (i.e., session).

The service session ID information has a certain period of validity of the user authentication processes and the like, in the same way as the above-noted authentication session ID information. The period of validity starts when the music data delivery server SV1, the product sales server SV2 or the radio broadcast information delivery server SV3 issues it. The period of validity for example is one minute.

In a case in which the client terminal 2 that already has the service session ID information issued by the server SV1, SV2 or SV3 can not submit the service session ID information to the issued server SV1, SV2 or SV3 within the period of validity, the issued server SV1, SV2 or SV3 determines that the communication connection identified by the service session ID information has been broken.

In this manner, the music data delivery server SV1, the product sales server SV2 or the radio broadcast information delivery server SV3 prevents the issued authentication session ID information from being used improperly by someone who has not contracted with a company operating the music related service provision system 1 for the purpose of the user authentication process or the like.

In this case, the service session ID information, which is temporarily stored in the authentication information storage section 38, was issued by the music data delivery server SV1, the product sales server SV2 or the radio broadcast information delivery server SV3 when the communication connection between the client terminal 2 and the server SV1, the client terminal 2 and the server SV2 or the client terminal 2 and the server SV3 was established for the purpose of the user authentication process or the like at a time in the past.

At step SP11, the control section 70 of the music data delivery server SV1 receives the page information acquisition request signal, the service session ID information, and the like from the client terminal 2 via the network interface 73 and the communication control section 72. The control section 70 of the music data delivery server SV1 then supplies the service session ID information and the like to the authentication processing section 75.

The authentication processing section 75 under the control of the control section 70 performs the user authentication process. In the user authentication process, the authentication processing section 75 compares the service session ID information and the like from client terminal 2 with those temporarily stored in the authentication information storage section 77.

As a result, if a result of the authentication shows a fact that a user of the client terminal 2 is not legitimate, the authentication processing section 75 determines that the request for music-data-distribution page information from the client terminal 2 is not legitimate. For example, when the service session ID information from the client terminal 2 has expired, the authentication result shows a fact that a user of the client terminal 2 is not legitimate.

The control section 70 subsequently transmits authentication error information showing authentication error, and a shop code identifying the music data delivery server SV1 to the client terminal 2 via the communication control section 72 and the network interface 73, because the authentication processing section 75 determines that a user of the client terminal 2 is not legitimate.

At step SP12, the control section 23 of the client terminal 2 receives the authentication error information and the shop code from the music data delivery server SV1 via the network interface 33 and the communication control section 32. The control section 23 of the client terminal 2 subsequently recognizes that the user is not authenticated as a legitimate user based on the authentication error information, and then temporarily stores the shop code from the music data delivery server SV1 in the authentication information storage section 38.

The control section 23 subsequently generates an authentication ticket issuance request signal. The authentication ticket issuance request signal requests an issue of an authentication ticket to be used to access the music data delivery server SV1. The control section 23 then transmits the authentication ticket issuance request signal, the shop code of the music data delivery server SV1, the authentication session ID information, which was temporarily stored in the authentication information storage section 38, and the like to the portal server 3 via the communication control section 32 and the network interface 33.

At step SP13, the control section 50 of the portal server 3 receives the authentication ticket issuance request signal, the shop code, the authentication session ID information, and the like from the client terminal 2 via the network interface 53 and the communication control section 52, and then supplies the information received to the authentication processing section 56.

The authentication processing section 56 under the control of the control section 50 performs a user authentication process. In the user authentication process, the authentication processing section 56 compares the authentication session ID information and the like from the client terminal 2 with those temporarily stored in the authentication information storage section 57.

As a result, if a result of the authentication shows a fact that a user of the client terminal 2 is not legitimate, the authentication processing section 56 determines that the request for authentication ticket from the client terminal 2 is not legitimate. For example, when the authentication session ID information from the client terminal 2 has expired, the result of authentication shows that a user of the client terminal 2 is not legitimate.

The control section 50 subsequently transmits authentication error information showing authentication error to the client terminal 2 via the communication control section 52 and the network interface 53 because the authentication processing section 56 determines that a user of the client terminal 2 is not legitimate.

Whereas if the result of the authentication shows a fact that a user of the client terminal 2 is legitimate, the authentication processing section 56 determines that the request for authentication ticket from the client terminal 2 is legitimate. For example, when the authentication session ID information from the client terminal 2 has not expired, the result of the authentication shows a fact that a user of the client terminal 2 is legitimate.

In a case in which the result of the authentication from the authentication processing section 56 shows a fact that a user of the client terminal 2 is legitimate, the control section 50 proceeds to step SP18 as described below.

At step SP14, the control section 23 of the client terminal 2 receives the authentication error information from the portal server 3 via the network interface 33 and the communication control section 32. The control section 23 of the client terminal 2 subsequently reads the user ID information, the password information and the like from the authentication information storage section 38, and then transmits the user ID information, the password information and the like to the portal server 3 via the communication control section 32 and the network interface 33.

At step SP15, the control section 50 of the portal server 3 receives the user ID information, the password information and the like from the client terminal 2 via the network interface 53 and the communication control section 52, and then supplies the user ID information, the password information and the like to the authentication processing section 56.

Therefore, the authentication processing section 56 under the control of the control section 50 performs a user authentication process. In the user authentication process, the authentication processing section 56 checks whether or not the user ID information, the password information and the like from the client terminal 2 exists in the customer information registered in the customer database section 54.

As a result, if a result of the authentication shows that a user of the client terminal 2 is legitimate, the authentication processing section 56 under the control of the control section 50 issues authentication session ID information (portal authentication result information) for the communication connection currently maintained between the client terminal 2 and the portal server 3, and the like. The authentication processing section 56 then temporarily stores the authentication session ID information and the like issued to the client terminal 2 in the authentication information storage section 57.

The control section 50 subsequently transmits the authentication session ID information and the like, which were issued to the client terminal 2 by the authentication processing section 56, to the client terminal 2 via the communication control section 52 and the network interface 53.

At step SP16, the control section 23 of the client terminal 2 receives the authentication session ID information and the like from the portal server 3 via the network interface 33 and the communication control section 32, and then temporarily stores the authentication session ID information and the like in the authentication information storage section 38 through the authentication processing section 37.

The control section 23 then regenerates an authentication ticket issuance request signal which requests an issue of an authentication ticket. The control section 23 subsequently transmits the authentication ticket issuance request signal, the shop code, which was temporarily stored in the authentication information storage section 38, the authentication session ID information, which was temporarily stored at that time, and the like, to the portal server 3 via the communication control section 32 and the network interface 33.

In this embodiment, the client terminal 2 temporarily stores the shop code in the authentication information storage section 38. However, this invention is not limited to this. The client terminal 2 may interchange again the shop code with the portal server 3 while performing the processes of steps SP12 through SP16. This allows the client terminal 2 to transmit the shop code to the portal server 3 at step SP16 without temporarily storing it in the authentication information storage section 38.

At step SP17, the control section 50 of the portal server 3 receives the authentication ticket issuance request signal, the shop code, the authentication session ID information and the like from the client terminal 2 via the network interface 53 and the communication control section 52, and then supplies the information received to the authentication processing section 56.

The authentication processing section 56 under the control of the control section 50 performs a user authentication process. In the user authentication process, the authentication processing section 56 compares the authentication session ID information and the like from the client terminal 2 with those temporarily stored in the authentication information storage section 57.

If a result of the authentication shows a fact that a user of the client terminal 2 is legitimate, the authentication processing section 56 determines that the request for authentication tickets from the client terminal 2 is legitimate. For example, in a case in which the authentication session ID information and the like from the client terminal 2 have not expired yet, the authentication result shows a fact that a user of the client terminal 2 is legitimate.

Then, the control section 50 proceeds to step SP18, as a user of the client terminal 2 is authenticated as a legitimate user by the authentication processing section 56.

At step SP18, the authentication processing section 56 under the control of the control section 50 issues an authentication ticket (i.e. the portal authentication result information) and the like based on the shop code and the authentication ticket issuance request signal received from the client terminal 2 by the process of step SP17 described above. The authentication ticket allows the client terminal 2 to access the music data delivery server SV1 corresponding to the shop code.

The authentication processing section 56 under the control of the control section 50 temporarily stores the issued authentication ticket and the like in the authentication information storage section 57, and then extends the period of validity of the authentication session ID information and the like issued to the client terminal 2.

The control section 50 then transmits the authentication ticket, the authentication session ID information having its period of validity extended by the authentication processing section 56, and the like to the client terminal 2 via the communication control section 52 and the network interface 53.

At step SP19, the control section 23 of the client terminal 2 receives the authentication ticket, the authentication session ID information having its period of validity extended, and the like from the portal server 3 via the network interface 33 and the communication control section 32, and then supplies the authentication session ID information to the authentication processing section 37.

The control section 23 transmits the authentication ticket which was received from the portal server 3, an authentication request signal, and the like to the music data delivery server SV1 via the communication control section 32 and the network interface 33.

At this time, the authentication processing section 37 under the control of the control section 23 temporarily stores the authentication session ID information and the like in the authentication information storage section 38. The authentication session ID information and the like which have their period of validity extended were received from the portal server 3. In this case, the authentication session ID information and the like overwrite those previously and temporarily stored in the authentication information storage section 38. The information previously and temporarily stored in the authentication information storage section 38 does not have the period of validity extended. In this manner, the authentication session ID information and the like temporarily stored at above-noted step SP16 are updated to those having their period of validity extended.

At step SP20, the control section 70 of the music data delivery server SV1 receives the authentication request signal, the authentication ticket and the like from the client terminal 2 via the network interface 73 and the communication control section 72.

The control section 70 then transmits the authentication ticket, which was received from the client terminal 2, an authentication ticket confirmation request signal, which requests a confirmation of the authentication ticket, and the like to the portal server 3 via the communication control section 72 and the network interface 73.

At step SP21, the control section 50 of the portal server 3 receives the authentication ticket confirmation request signal, the authentication ticket, and the like from the music data delivery server SV1 via the network interface 53 and the communication control section 52. The control section 50 of the portal server 3 then supplies the authentication ticket confirmation request signal, the authentication ticket, and the like to the authentication processing section 56.

In response to the authentication ticket confirmation request signal, the authentication processing section 56 under the control of the control section 50 performs a confirmation process to confirm the authentication ticket received from the music data delivery server SV1. In the confirmation process, the authentication processing section 56 compares the authentication ticket and the like from the music data delivery server SV1 with those temporarily stored in the authentication information storage section 57.

If a result of the confirmation by the authentication processing section 56 shows a fact that the authentication ticket and the like from the music data delivery server SV1 are legitimate, the control section 50 transmits confirmation result information to the music data delivery server SV1 via the communication control section 52 and the network interface 53. In this case, the confirmation result information shows that the authentication ticket and the like are legitimate.

At step SP22, the control section 70 of the music data delivery server SV1 receives the confirmation result information from the portal server 3 via the network interface 73 and the communication control section 72, and then supplies the confirmation result information to the authentication processing section 75.

In response to the confirmation result information, the authentication processing section 75 under the control of the control section 70 issues the service session ID information (i.e. the server authentication result information) for the communication connection currently maintained between the client terminal 2 and the music data delivery server SV1, and the like. The authentication processing section 75 then temporarily stores the issued service session ID information and the like in the authentication information storage section 77.

The control section 70 transmits the service session ID information and the like issued to the client terminal 2 by the authentication processing section 75 to the client terminal 2 via the communication control section 72 and the network interface 73.

At step SP23, the control section 23 of the client terminal 2 receives the service session ID information and the like from the music data delivery server SV1 via the network interface 33 and the communication control section 32, and then temporarily stores the service session ID information and the like in the authentication information storage section 38 using the authentication processing section 37.

Therefore, the control section 23 transmits a page information acquisition request signal, which requests the music-data-distribution page information, the service session ID information and the like to the music data delivery server SV1 via the communication control section 32 and the network interface 33. The service session ID information was received from the music data delivery server SV1 and then temporarily stored in the authentication information storage section 38.

At step SP24, the control section 70 of the music data delivery server SV1 receives the page information acquisition request signal, the service session ID information and the like from the client terminal 2 via the network interface 73 and the communication control section 72, and then supplies the service session ID information and the like to the authentication processing section 75.

The authentication processing section 75 under the control of the control section 70 performs a user authentication process. In the user authentication process, the authentication processing section 75 compares the service session ID information and the like received from the client terminal 2 with those temporarily stored in the authentication information storage section 77. The information temporarily stored in the authentication information storage section 77 was issued to the client terminal 2 by the process of step SP22 described above.

If a result of the authentication shows a fact that a user of the client terminal 2 is legitimate, the authentication processing section 75 determines that the request for music-data-distribution page information from the client terminal 2 is legitimate. For example, when the service session ID information and the like from the client terminal 2 have not expired yet, the result of the authentication shows the fact that a user of the client terminal 2 is legitimate.

Then, the control section 70 proceeds to step SP25, as a user of the client terminal 2 is authenticated as a legitimate user by the authentication processing section 75.

At step SP25, the control section 70 reads out the music-data-distribution page information, which is requested by a user, from the page information storage section 76. The control section 70 also extends the period of validity of the service session ID information and the like issued to the client terminal 2 through the authentication processing section 75.

The control section 70 subsequently transmits the music-data-distribution page information read from the page information storage section 76, the service session ID information having its period of validity extended by the authentication processing section 75, and the like to the client terminal 2 via the communication control section 72 and the network interface 73.

At step SP26, the control section 23 of the client terminal 2 receives the music-data-distribution page information, the service session ID information having its period of validity extended, and the like from the music data delivery server SV1 via the network interface 33 and the communication control section 32. The control section 23 of the client terminal 2 then supplies the music-data-distribution page information to the page information generation section 36. The control section 23 of the client terminal 2 also supplies the service session ID information and the like received from the music data delivery server SV1 to the authentication processing section 37.

The authentication processing section 37 under the control of the control section 23 temporarily stores the service session ID information and the like in the authentication information storage section 38. The service session ID information and the like, which have their periods of validity extended, were received from the music data delivery server SV1. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored by the process of above-noted step SP23 are updated to those having their period of validity extended.

The page information generation section 36 generates video data based on the music-data-distribution page information, and then supplies the video data to the display control section 24.

The display control section 24 performs digital-to-analog conversion to the video data supplied from the page information generation section 36 to generate an analog video signal. The display control section 24 then supplies the analog video signal to the display section 25. The display section 25 displays an image of the music-data-distribution page based on the analog video signal.

(1-7-3) Music Related Service Provision Processes

After completing the user authentication process (FIG. 9) between the client terminal 2 and the music data delivery server SV1, the client terminal 2 and the product sales server SV2, or the client terminal 2 and the radio broadcast information delivery server SV3, the music related service provision process is executed. With reference to FIG. 10 through FIG. 13, the music related service provision process will be described in the following situation: the client terminal 2 receives a music data distribution service through the music-data-distribution page information obtained during the user authentication process from the music data delivery server SV1; the client terminal 2 receives a sales service through the package-media-sales page information obtained during the user authentication process from the product sales server SV2; and the client terminal 2 receives a radio broadcast information distribution service through the on-air-list-information-distribution page information obtained during the user authentication process from the radio broadcast information delivery server SV3.

(1-7-3-1) Music Data Distribution Service Provision Process

Figure 10:
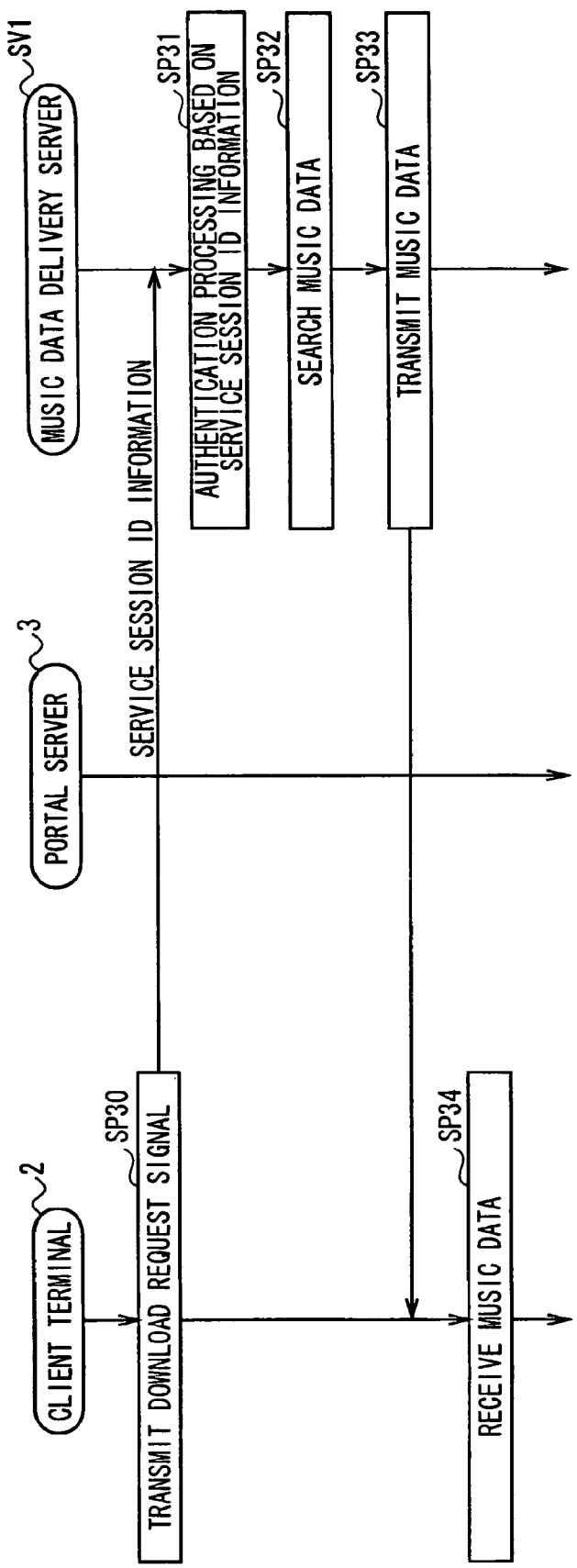
FIG. 10 is a sequence chart showing a music data distribution service provision process.

Referring to FIG. 10, the music data distribution service provision process will be described. In the music data distribution service provision process, the client terminal 2 receives the music data distribution service from the music data delivery server SV1.

At step SP30, if a control command which selects part of the music-data-distribution page displayed as images on the display section 25 is input through the input processing section 21, the control section 23 of the client terminal 2 generates a download request signal, which requests a download of music data a user wants to download.

The control section 23 then transmits the download-request signal, the service session ID information, and the like to the music data delivery server SV1 via the communication control section 32 and the network interface 33. The service session ID information was issued by the music data delivery server SV1 and then temporarily stored in the authentication information storage section 38.

At step SP31, the control section 70 of the music data delivery server SV1 receives the download request signal, the service session ID information and the like from the client terminal 2 via the network interface 73 and the communication control section 72, and then supplies the service session ID information and the like to the authentication processing section 75.

The authentication processing section 75 under the control of the control section 70 performs a user authentication process. In the user authentication process, the authentication processing section 75 compares the service session ID information and the like received from the client terminal 2 with those temporarily stored in the authentication information storage section 77.

If the authentication processing section 75 authenticates a user as a legitimate user, the control section 70 proceeds to step SP32. In this case, the user has requested a download of music data through the client terminal 2.

At step SP32, the retrieval section 79 performs a search process based on a retrieval key in the download request signal. In the search process, the retrieval section 79 searches a plurality of music data stored in the music data storage section 78 for the music data which corresponds to a retrieval condition indicated by the retrieval key and is the one the user wants to download.

When the retrieval section 79 has the music data found, the control section 70 extends the period of validity of the service session ID information and the like issued to the client terminal 2 using the authentication processing section 75, and then proceeds to step SP33.

At step SP33, the control section 70 reads the music data, which the user wants to download and is found by the retrieval section 79, from the music data storage section 78. The control section 70 then transmits the music data, the service session ID information having its period of validity extended by the authentication processing section 75, and the like to the client terminal 2 via the communication control section 72 and the network interface 73.

At step SP34, the control section 23 of the client terminal 2 receives the music data, which the user wants to download, the service session ID information having its period of validity extended, and the like from the music data delivery server SV1 via the network interface 33 and the communication control section 32. The control section 23 of the client terminal 2 then stores the music data in the storage medium 29. The control section 23 of the client terminal 2 also supplies the service session ID information and the like received from the music data delivery server SV1 to the authentication processing section 37.

The authentication processing section 37 under the control of the control section 23 temporarily stores the service session ID information and the like in the authentication information storage section 38. The service session ID information and the like, which have their period of validity extended, were received from the music data delivery server SV1. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored are updated to those having their period of validity extended.

As described above, the client terminal 2 is capable of downloading the music data, which a user wants to acquire, using the music data distribution service provided by the music data delivery server SV1.

(1-7-3-2) Product Sales Service Provision Process

Figure 11:
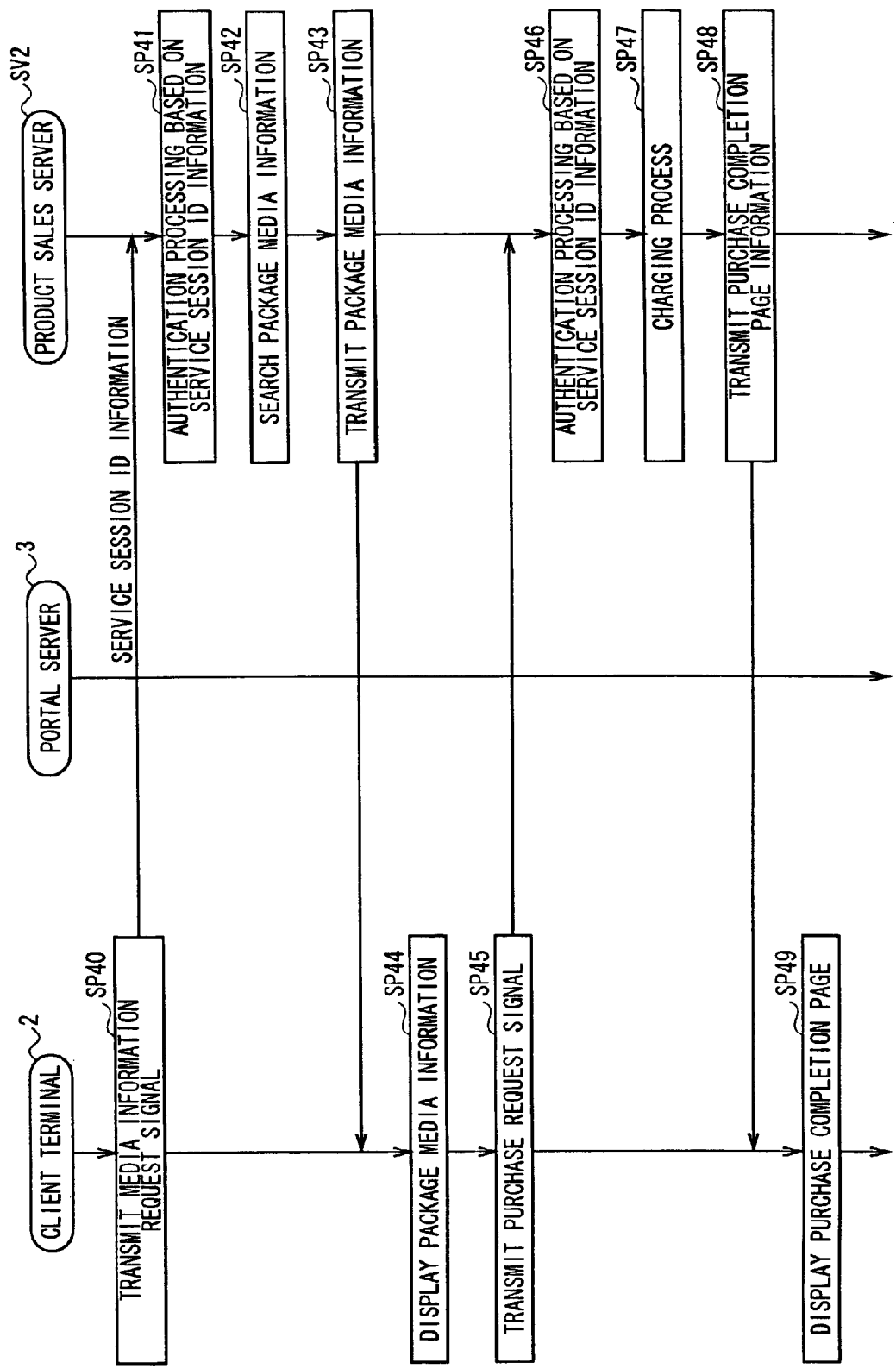
FIG. 11 is a sequence chart showing a product sales service provision process.

Referring to FIG. 11, the product sales service provision process will be described. In the product sales service provision process, the client terminal 2 receives a product sales service from the product sales server SV2.

At step SP40, if a control command which selects part of the package-media-sales page information displayed as an image on the display section 25 is input through the input processing section 21, the control section 23 of the client terminal 2 generates a media information request signal. The media information request signal requests package media information relating to a specific package media corresponding to the control command.

The control-section 23 then transmits the media information request signal, the service session ID information and the like to the product sales server SV2 via the communication control section 32 and the network interface 33. The service session ID information was issued by the product sales server SV2 and then temporarily stored in the authentication information storage section 38.

At step SP41, the control section 90 of the product sales server SV2 receives the media information request signal, the service session ID information and the like from the client terminal 2 via the network interface 93 and the communication control section 92, and then supplies the service session ID information and the like to the authentication processing section 95.

The authentication processing section 95 under the control of the control section 90 performs a user authentication process. In the user authentication process, the authentication processing section 95 compares the service session ID information and the like received from the client terminal 2 with those temporarily stored in the authentication information storage section 97.

If the authentication processing section 95 authenticates a user as a legitimate user, the control section 90 proceeds to step SP42. In this case, the user has requested the package media information relating to the package media using the client terminal 2.

At step SP42, the retrieval section 99 performs, based on a retrieval key in the media information request signal, a search process. In the search process, the retrieval section 99 searches a plurality of pieces of package media information stored in the package media information storage section 98 for a certain piece of package media information corresponding to a retrieval condition indicated by the retrieval key.

When the retrieval section 99 has the piece of package media information found, the control section 90 extends the period of validity of the service session ID information and the like issued to the client terminal 2 through the authentication processing section 95, and then proceeds to step SP43.

At step SP43, the control section 90 reads out the package media information, which was found by the retrieval section 99, from the package media information storage section 98. The control section 90 then transmits the package media information, the service session ID information having its period of validity extended by the authentication processing section 95, and the like to the client terminal 2 via the communication control section 92 and the network interface 93.

At step SP44, the control section 23 of the client terminal 2 receives the package media information, the service session ID information having its period of validity extended, and the like from the product sales server SV2 via the network interface 33 and the communication control section 32, and then supplies the package media information to the page information generation section 36. The control section 23 of the client terminal 2 also supplies the service session ID information and the like received from the product sales server SV2 to the authentication processing section 37.

The authentication processing section 37 under the control of the control section 23 temporarily stores the service session ID information and the like in the authentication information storage section 38. The service session ID information and the like, which have their period of validity extended, were received from the product sales server SV2. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored are updated to those having their period of validity extended.

The page information generation section 36 generates, based on the package media information supplied from the control section 23, video data. The page information generation section 36 then transforms the video data into an analog video signal through the display control section 24, and then supplies the analog video signal to the display section 25.

After the display section 25 starts to display an image of the package media information based on the analog video signal, the control section 23 proceeds to step SP45.

At step SP45, if a control command that requests a purchase of the package media corresponding to the package media information displayed as an image on the display section 25 is input through the input processing section 21, the control section 23 generates, in response to the control command, a purchase request signal which requests the purchase of the package media.

The control section 23 then transmits the purchase request signal, the service session ID information having its period of validity extended, and the like to the product sales server SV2 via the communication control section 32 and the network interface 33. The service session ID information was received from the product sales server SV2 and then temporarily stored in the authentication information storage section 38.

At step SP46, the control section 90 of the product sales server SV2 receives the purchase request signal, the service session ID information and the like from the client terminal 2 via the network interface 93 and the communication control section 92, and then supplies the service session ID information and the like to the authentication processing section 95.

The authentication processing section 95 under the control of the control section 90 performs a user authentication process. In the user authentication process, the authentication processing section 95 compares the service session ID information and the like received from the client terminal 2 with those temporarily stored in the authentication information storage section 97.

As a result, if the authentication processing section 95 authenticates the user, who requests the purchase of the package media through the client terminal 2, as a legitimate user, the control section 90 proceeds to step SP47.

At step SP47, the control section 90 performs a product sales process. In the product sales process, the control section 90 executes a procedure to deliver the requested package media to the user of the client terminal 2. The control section 90 also transmits fee-charging information to the fee-charging server SV5 via the communication control section 92 and the network interface 93. The fee-charging information is used to charge the user a fee for the purchased package media. Therefore, the fee-charging server SV5 performs a fee-charging process to charge the user a fee for the purchased package media.

The control section 90 also extends the period of validity of service session ID information and the like issued to the client terminal 2 using the authentication processing section 95.

At step SP48, after completing the fee-charging process, the control section 90 transmits purchase completion page information showing a completion of the purchase of package media, the service session ID information having its period of validity extended by the authentication processing section 95, and the like to the client terminal 2 via the communication control section 92 and the network interface 93.

At step SP49, the control section 23 of the client terminal 2 receives the purchase completion page information, the service session ID information having its period of validity extended, and the like from the product sales server SV2 via the network interface 33 and the communication control section 32, and then supplies the purchase completion page information to the page information generation section 36. The control section 23 also supplies the service session ID information and the like received from the product sales server SV2 to the authentication processing section 37.

The authentication processing section 37 under the control of the control section 23 temporarily stores the service session ID information and the like in the authentication information storage section 38. The service session ID information and the like, which have their period of validity extended, were received from the product sales server SV2. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored are updated to those having their period of validity extended.

The page information generation section 36 generates, based on the purchase completion page information supplied from the control section 23, video data. The page information generation section 36 subsequently transforms the video data into an analog video signal through the display control section 24, and then supplies the analog video signal to the display section 25.

Therefore, the control section 23 can display, based on the analog video signal, an image of the purchase completion page on the display section 25.

As described above, the client terminal 2 allows a user to purchase the package media he/she wants using the sales services provided by the product sales server SV2.

(1-7-3-3) On-Air-List Information Distribution Service Provision Process

Figure 12:
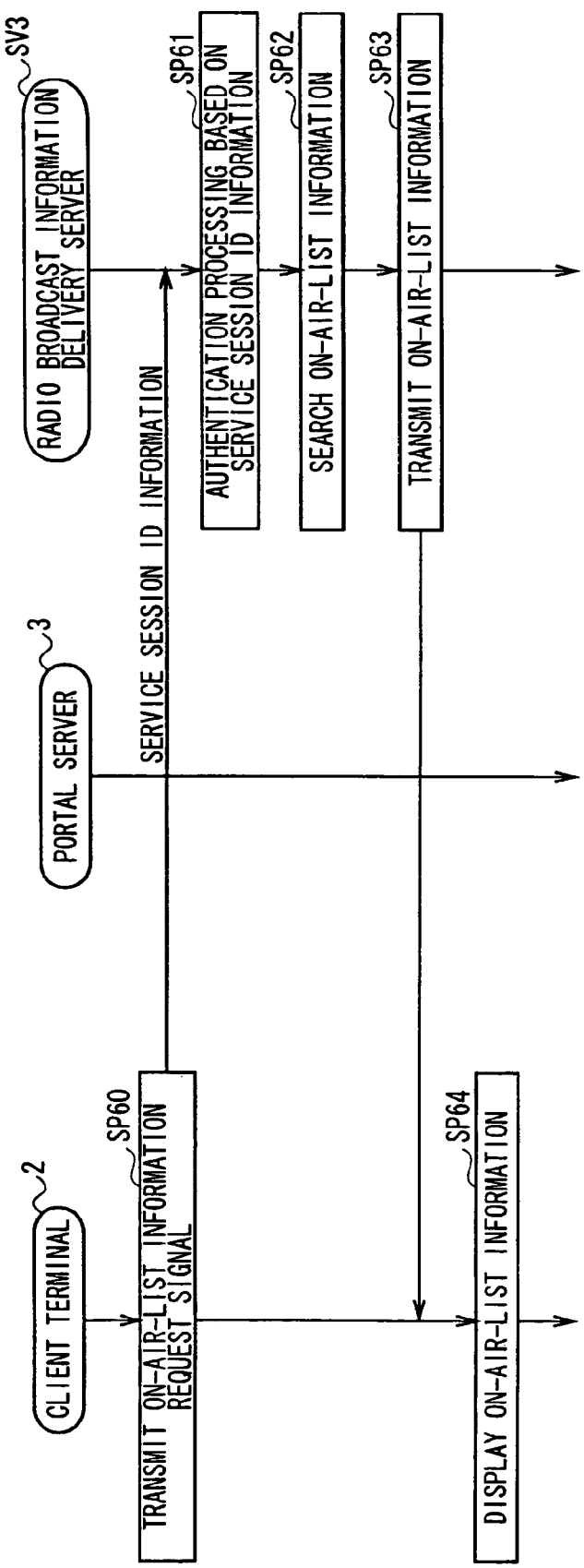
FIG. 12 is a sequence chart showing a radio broadcast information (on-air list information) distribution service provision process (1).

With reference to FIG. 12, a radio broadcast information distribution service provision process will be described. In the radio broadcast information distribution service provision process, the client terminal 2 receives especially an on-air-list information distribution service as the radio broadcast information distribution service from the radio broadcast information delivery server SV3.

At step SP60, a user input a retrieval key in an input box disposed on the on-air-list-information-distribution page displayed as an image on the display section 25. The retrieval key, which is used to retrieve the on-air-list information, is a character string corresponding to the on-air-list information the user wants to obtain. At this time, a control command corresponding to the character string is input through the input processing section 21. The control section 23 of the client terminal 2 generates, based on the control command input, an on-air-list information request signal which requests a download of the on-air-list information the user wants to obtain.

The control section 23 then transmits the on-air-list information request signal, the service session ID information temporarily stored in the authentication information storage section 38, and the like to the radio broadcast information delivery server SV3 via the communication control section 32 and the network interface 33. The service session ID information was issued by the radio broadcast information delivery server SV3.

At step SP61, the control section 110 of the radio broadcast information delivery server SV3 receives the on-air-list information request signal, the service session ID information and the like from the client terminal 2 via the network interface 113 and the communication control section 112, and then supplies the service session ID information and the like to the authentication processing section 115.

The authentication processing section 115 under the control of the control section 110 performs a user authentication process. In the user authentication process, the authentication processing section 115 compares the service session ID information and the like received from the client terminal 2 with those temporarily stored in the authentication information storage section 120.

As a result, if the authentication processing section 115 authenticates the user, who requests the on-air-list information using the client terminal 2, as a legitimate user, the control section 110 proceeds to step SP62.

At step SP62, the retrieval section 118 performs, based on the retrieval key in the on-air-list information request signal, a search process in which the retrieval section 118 searches the whole on-air-list information in the on-air-list information storage section 117 for a certain part of the on-air-list information which meets a retrieval condition indicated by the retrieval key to obtain the desired on-air-list information.

When the retrieval section 118 has the on-air-list information found, the control section 110 extends the period of validity of the service session ID information and the like issued to the client terminal 2 through the authentication processing section 115. The control section 110 then proceeds to step SP63.

At step SP63, the control section 110 reads out the on-air-list information, which was found by the retrieval section 118, from the on-air-list information storage section 117. The control section 110 then transmits the on-air-list information, the service session ID information having its period of validity extended by the authentication processing section 115, and the like to the client terminal 2 via the communication control section 112 and the network interface 113.

At step SP64, the control section 23 of the client terminal 2 receives the on-air-list information, the service session ID information having its period of validity extended, and the like from the radio broadcast information delivery server SV3 via the network interface 33 and the communication control section 32, and then supplies the on-air-list information to the page information generation section 36. The control section 23 of the client terminal 2 also supplies the service session ID information and the like received from the radio broadcast information delivery server SV3 to the authentication processing section 37.

The authentication processing section 37 under the control of the control section 23 temporarily stores the service session ID information and the like in the authentication information storage section 38. The service session ID information and the like, which have their period of validity extended, were received from the radio broadcast information delivery server SV3. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored are updated to those having their period of validity extended.

The page information generation section 36 generates, based on the on-air-list information supplied from the control section 23, video data. The page information generation section 36 then transforms the video data into an analog video signal through the display control section 24, and then supplies the analog video signal to the display section 25. The display section 25 therefore displays, based on the analog video signal, an image or the on-air-list information.

As described above, the client terminal 2 allows a user to obtain the desired on-air-list information using the radio broadcast information distribution service provided by the radio broadcast information delivery server SV3.

(1-7-3-4) Now-on-Air Information Distribution Service Provision Process

Figure 13:
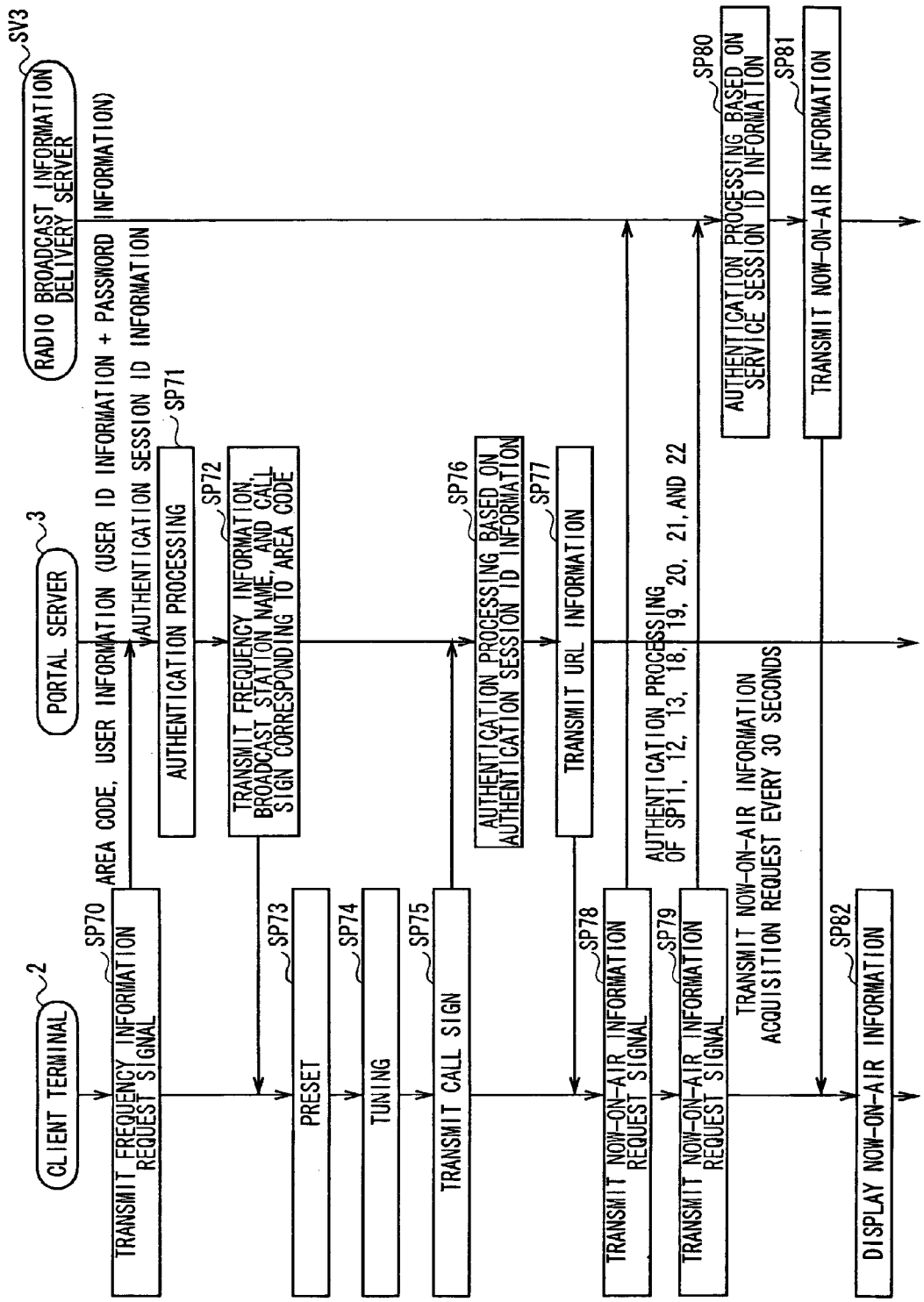
FIG. 13 is a sequence chart showing a radio broadcast information (now-on-air information) distribution service provision process (2).

Referring to FIG. 13, the radio broadcast information distribution service provision process will be described. In the radio broadcast information distribution service provision process, the client terminal 2 receives especially the now-on-air information distribution service as the radio broadcast information distribution service from the radio broadcast information delivery server SV3.

There is a plurality of radio broadcast information delivery servers SV3 providing the now-on-air information, each of which corresponds to a different radio station (call sign).

At initial state, the client terminal 2 may not store the URL information of those radio broadcast information delivery servers SV3 corresponding to radio stations.

With the radio broadcast information distribution service provision process described below, the following describes a situation in which the portal server 3 manages the URL information of each radio broadcast information delivery server SV3. Specifically, in this case, the portal server 3 manages a plurality of pieces of URL information, each of which corresponds to a call sign of a radio station.

In addition, with the radio broadcast information distribution service provision process described below, the client terminal 2 does not have the authentication session ID information and the like temporarily stored in the authentication information storage section 38, when requesting frequency information from the portal server 3 to automatically preset broadcast frequencies of radio stations. The frequency information includes the broadcast frequencies. In this case, first of all the client terminal 2 transmits the user ID information, the password information, and the like to the portal server 3.

At step SP70, if an operation command which requests an auto-preset of broadcast frequencies of radio stations is input through the input processing section 21, the control section 23 of the client terminal 2 transmits a frequency information request signal, an area code input by a user, the user ID information and password information stored in the authentication information storage section 38, and the like to the portal server 3 via the communication control section 32 and the network interface 33. The frequency information request signal requests the frequency information about broadcast frequencies of radio stations from which the client terminal 2 can receive their broadcasts.

At step SP71, the control section 50 of the portal server 3 receives the frequency information request signal, the area code, the user ID information, the password information and the like from the client terminal 2 via the network interface 53 and the communication control section 52, and then supplies the user ID information and the password information received from the client terminal 2 to the authentication processing section 56.

The authentication processing section 56 under the control of the control section 50 performs a user authentication process. In the user authentication process, the authentication processing section 56 compares the user ID information, the password information and the like received from the client terminal 2 with the customer information registered in the customer database section 54.

As a result, if the authentication processing section 56 authenticates a user of the client terminal 2 as a legitimate user, the authentication processing section 56 determines that the request for frequency information from the client terminal

2 is legitimate. Therefore, the authentication processing section 56 under the control of the control section 50 issues authentication session ID information and the like. The authentication session ID information identifies the communication connection currently maintained between the client terminal 2 and the portal server 3. The authentication processing section 56 then temporarily stores the authentication session ID information and the like in the authentication information storage section 57.

The control section 50 subsequently proceeds to step SP72, as the authentication processing section 56 authenticates the user as a legitimate user.

At step SP72, the control section 50 retrieves, based on the area code from the client terminal 2, the frequency information, radio station names and call signs corresponding to the area code from a list which is stored in the frequency information storage section 58 and includes a plurality of pieces of frequency information, radio station names and call signs. The control section 50 then reads out the retrieved frequency information, radio station names and call signs in list format.

The control section 50 subsequently transmits the frequency information, radio station names and call signs read from the frequency information storage section 58 in list format, along with the authentication session ID information and the like, to the client terminal 2 via the communication control section 52 and the network interface 53. The authentication session ID information was issued to the client terminal 2 by the authentication processing section 56 at above-noted step SP71.

At step SP73, the control section 23 of the client terminal 2 receives the list, which includes the frequency information, the radio station names and the call signs, from the portal server 3 via the network interface 33 and the communication control section 32. The control section 23 of the client terminal 2 also receives the authentication session ID information and the like from the portal server 3 via the network interface 33 and the communication control section 32. The control section 23 of the client terminal 2 then supplies the authentication session ID information and the like received from the portal server 3 to the authentication processing section 37. The control section 23 of the client terminal 2 also supplies the list, which includes the frequency information, the radio station names and the call signs, to the display control section 24.

The authentication processing section 37 under the control of the control section 23 temporarily stores the authentication session. ID information and the like received from the portal server 3 in the authentication information storage section 38.

The display control section 24 supplies the list, which includes the frequency information, the radio station names and the call signs, to the display section 25. The display section 25 therefore displays the list.

At this time, based a selection command input through the input processing section 21, the control section 23 stores the selected frequency information, radio station name and call sign in the storage medium 29 as a preset, and then proceeds to step SP74.

At step SP74, in response to a tuning control command input through the input processing section 21, the control section 23 controls, based on the tuning control command input, the tuner section 31 to extract, from radio waves, a radio broadcast signal of a radio broadcast transmitted in a broadcast frequency corresponding to the tuning control command.

The tuner section 31 therefore extracts the radio broadcast signal in the broadcast frequency from the radio waves received by the broadcast signal reception section 30. The tuner section 31 then performs a prescribed reception process such as decoding to generate audio data, and then supplies the audio data to the audio control section 26.

The audio control section 26 therefore transforms the audio data supplied from the tuner section 31 into an analog audio signal, and supplies the analog audio signal to the speaker 27 which then outputs audio of the selected radio program.

At step SP75, the radio broadcasting display control section 39 under the control of the control section 23 reads a call sign from the storage medium 29. In this case, the call sign stored in the storage medium 29 has been associated with the frequency information showing the broadcast frequency corresponding to the above-noted tuning control command. The radio broadcasting display control section 39 then transmits the call sign, the authentication session ID information temporarily stored in the authentication information storage section 38, and the like to the portal server 3 via the communication control section 32 and the network interface 33.

At step SP76, the control section 50 of the portal server 3 receives the call sign, the authentication session ID information and the like from the client terminal 2 via the network interface 53 and the communication control section 52, and supplies the authentication session ID information and the like to the authentication processing section 56.

The authentication processing section 56 under the control of the control section 50 performs a user authentication process. In the user authentication process, the authentication processing section 56 compares the authentication session ID information and the like received from the client terminal 2 with those temporarily stored in the authentication information storage section 57.

As a result, if the authentication processing section 56 authenticates the user, who transmits the call sign using the client terminal 2, as a legitimate user, the control section 50 proceeds to step SP77. In this case, since the authentication session ID information and the like received from the client terminal 2 have not expired yet, the authentication processing section 56 authenticates the user as a legitimate user.

At step SP77, the control section 50 performs, based on the call sign from the client terminal 2, a retrieving process in which the control section 50 retrieves a piece of URL information corresponding to the call sign from among a plurality of pieces of ULR information stored in the URL storage section 59.

The control section 50 also extends the period of validity of the authentication session ID information and the like issued to the client terminal 2 using the authentication processing section 56.

The control section 50 subsequently reads the retrieved URL information from the URL storage section 59, and then transmits the URL information, the authentication session ID information having its period of validity extended by the authentication processing section 56, and the like to the client terminal 2 via the communication processing section 52 and the network interface 53.

At step SP78, the control section 23 of the client terminal 2 receives the URL information, the authentication session ID information having its period of validity extended, and the like from the portal server 3 via the network interface 33 and the communication control section 32, and then supplies the authentication session ID information and the like to the authentication processing section 37. The control section 23 of the client terminal 2 also supplies the URL information to the radio broadcasting display control section 39.

The authentication processing section 37 under the control of the control section 23 temporarily stores the authentication session ID information and the like in the authentication information storage section 38. The authentication session ID information and the like, which have their period of validity extended, were received from the portal server 3. In this case, the authentication session ID information and the like overwrite those previously and temporarily stored in the authentication information storage section 38. The information previously and temporarily stored in the authentication information storage section 38 does not have the period of validity extended. In this manner, the authentication session ID information and the like temporarily stored are updated to those having their period of validity extended.

The radio broadcasting display control section 39 under the control of the control section 23 associates the URL information supplied from the control section 23 with the call sign stored in the storage medium 29, and then temporarily stores them in the storage medium 29 or the like.

Then, the radio broadcasting display control section 39 under the control of the control section 23 transmits a now-on-air information request signal which requests now-on-air information, the service session ID information temporarily stored in the authentication information storage section 38, and the like to the radio broadcast information delivery server SV3 via the communication control section 32 and the network interface 33. In this case, the radio broadcasting display control section 39 transmits, based on the URL information temporarily stored in the storage medium 29 or the like, the now-on-air information request signal. The service session ID information stored in the authentication information storage section 38 was received from the radio broadcast information delivery server SV3.

By the way, in the radio broadcast information distribution service provision process, the process of step SP78 corresponds to the process of step SP10 in FIG. 9. In the process of step SP78, the now-on-air information request signal, the service session ID information and the like are transmitted from the client terminal 2 to the radio broadcast information delivery server SV3.

Accordingly, in the radio broadcast information distribution service provision process, after the process of step SP78, the client terminal 2, the radio broadcast information delivery server SV3 and the portal server 3 performs the same user authentication process as the one made up of step SP11 through SP13 and step SP18 through SP22, and then proceed to step SP79. By the way, the processes of step SP11 through SP13 and step SP18 through SP22 are illustrated in FIG. 9.

At step SP79, the radio broadcasting display control section 39 of the client terminal 2 under the control of the control section 23 re-transmits, based on the URL information temporarily stored in the storage medium 29 or the like, the now-on-air information request signal, the service session ID information temporarily stored in the authentication information storage section 38, and the like to the radio broadcast information delivery server SV3 via the communication control section 32 and the network interface 33. The service session ID information, which was temporarily stored in the authentication information storage section 38, was received from the radio broadcast information delivery server SV3.

At step SP80, the control section 110 of the radio broadcast information delivery server SV3 receives the now-on-air information request signal, the service session ID information and the like from the client terminal 2 via the network interface 113 and the communication control section 112, and then supplies the received authentication session ID information and the like to the authentication processing section 115.

The authentication processing section 115 under the control of the control section 110 performs a user authentication process. In the user authentication process, the authentication processing section 115 compares the service session ID information and the like received from the client terminal 2 with those temporarily stored in the authentication information storage section 120.

As a result, if the authentication processing section 115 authenticates the user of the client terminal 2 as a legitimate user, the authentication processing section 115 determines that the request for now-on-air information from the client terminal 2 is legitimate.

After the authentication processing section 115 authenticates the user of the client terminal 2 as a legitimate user, the control section 110 extends the period of validity of the service session ID information and the like issued to the client terminal 2 through the authentication processing section 115, and then proceeds to step SP81.

At step SP81, the control section 110 reads now-on-air information from the now-on-air information storage section 119, and then transmits the now-on-air information, the service session ID information having its period of validity extended by the authentication processing section 115, and the like to the client terminal 2 via the communication control section 112 and the network interface 113.

At step SP82, the control section 23 of the client terminal 2 receives the now-on-air information, the service session ID information having its period of validity extended and the like from the radio broadcast information delivery server SV3 via the network interface 33 and the communication control section 32, and then supplies the service session ID information and the like to the authentication processing section 37. The control section 23 of the client terminal 2 also supplies the now-on-air information to the radio broadcasting display control section 39.

The authentication processing section 37 under the control of the control section 23 temporarily stores the service session ID information and the like in the authentication information storage section 38. The service session ID information and the like, which have their period of validity extended, were received from the radio broadcast information delivery server SV3. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored are updated to those having their period of validity extended.

The radio broadcasting display control section 39 supplies the now-on-air information supplied from the control section 23 to the display section 25 via the display control section 24. The display section 25 therefore displays the now-on-air information relating to the radio program currently received.

After that, in the radio broadcast information distribution service provision process, the client terminal 2 repeats a request process of now-on-air information (step SP79) at a certain interval of time. When receiving the request from the client terminal 2, the radio broadcast information delivery server SV3 sequentially performs the process of step SP80 and SP81.

In this manner, the client terminal 2 can update the now-on-air information displayed on the display section 25 every second. The now-on-air information includes the following items: a title of a radio program currently received by the client terminal 2; a start time of the radio program; an end time of the radio program; an artist name and title of music currently played in the radio program; and a start time of the broadcast of the music.

(1-8) Hardware Circuit Block Configuration of Client Terminal 2

(1-8-1) Circuit Configuration

The hardware configuration of the client terminal 2 will be described using hardware circuit blocks. In the hardware configuration of the client terminal 2 with the hardware circuit blocks, a part of capabilities of the client terminal 2 is a process performed by software modules as described below.

Figure 14:
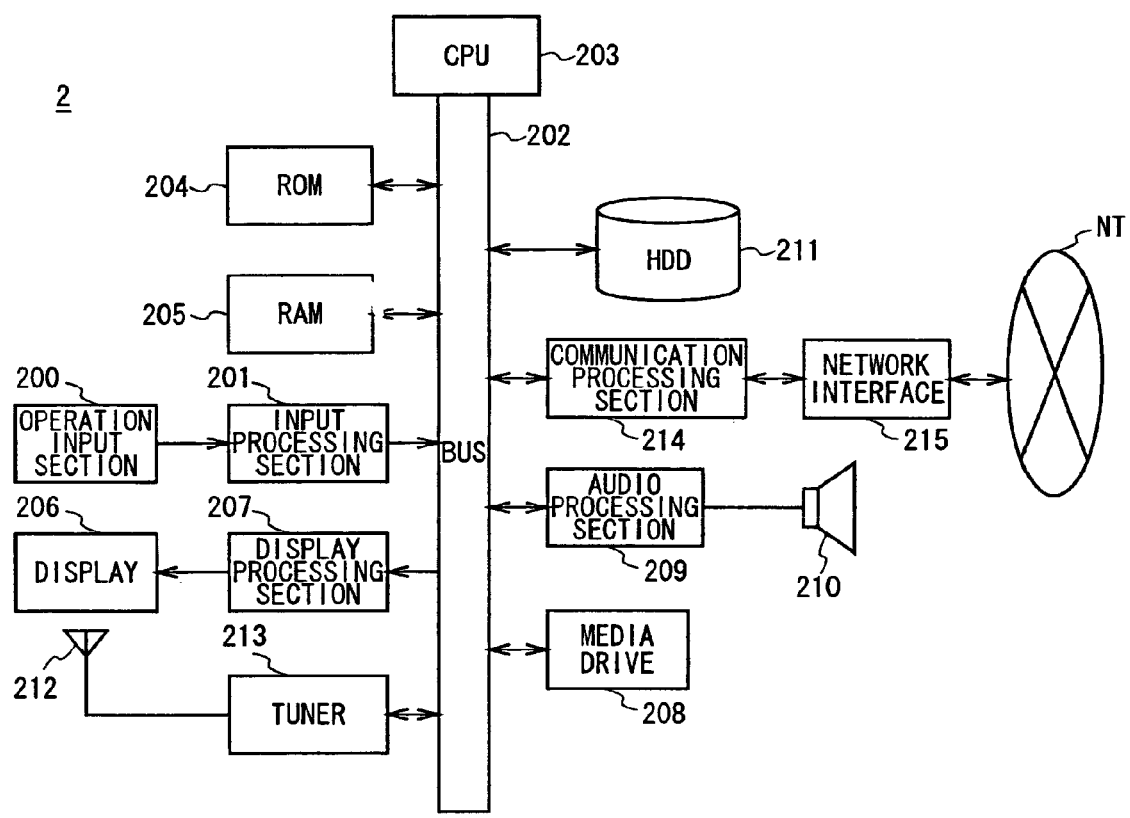
FIG. 14 is a block diagram showing the hardware configuration of a client terminal using hardware circuit blocks.

Referring to FIG. 14, the client terminal 2 has an operation input section 200 on its housing or a remote control (not shown). The operation input section 200 provides various operation buttons. When a user operates the operation input section 200, the operation input section 200 detects the operation and then supplies an operation input signal corresponding to the operation to an input processing section 201.

The input processing section 201 performs a prescribed process to the supplied operation input signal to transform the operation input signal into an operation command. The input processing section 201 then supplies the operation command via a bus 202 to a CPU (Central Processing Unit) 203.

A ROM (Read Only Memory) 204 previously has stored various programs, such as a basic program and an application program. The CPU 203 reads these programs from the ROM 204 via the bus 202, and loads these programs onto a RAM (Random Access Memory) 205. The CPU 203 takes overall control of the client terminal 2 based on the programs, and performs, in response to the operation command supplied from the input processing section 201, a prescribed computation process and various processes.

For example, a display 206 is a display device such as a liquid crystal display. The display 206 may be directly or externally disposed on the housing.

A result of process by the CPU 203 and various video data are supplied to the display 206 via a display processing section 207 as an analog video signal. The display 206 displays an image based on the analog video signal.

For example, CDs and "MEMORY STICK (Registered Trademark of Sony Corporation)" store content data. The MEMORY STICK includes a flash memory covered with an exterior case. A media drive 208, for example, reads the content data from the CD and the "MEMORY STICK (Registered Trademark of Sony Corporation)", and then plays back the content data. Alternatively, the media drive 208 records the content data, which is to be recorded, on the CD or the "MEMORY STICK (Registered Trademark of Sony Corporation)".

When the media drive 208 reads video data (content data) from the CDs or the "MEMORY STICK (Registered Trademark of Sony Corporation)", the media drive 208 supplies the video data to the display processing section 207 via the bus 202.

When the media drive 208 reads audio data (content data) from the CDs or "MEMORY STICK (Registered Trademark of Sony Corporation)", the media drive 208 supplies the audio data to an audio processing section 209.

The display processing section 207 performs digital-to-analog conversion to the video data, which was supplied via the bus 202, to generate an analog video signal. The display processing section 207 then supplies the analog video signal to the display 206. The display 206 displays an image based on the analog video signal.

The audio processing section 209 performs digital-to-analog conversion to the audio data, which was supplied via the bus 202, to generate an analog audio signal. The audio processing section 209 then supplies the analog audio signal to a 2-channel speaker 210 which therefore outputs sound on stereo based on the analog audio signal.

In addition, the CPU 203 is able to supply the content data read by the media drive 208 via the bus 202 to a hard disk drive 211. The hard disk drive 211 stores the content data as content files.

The CPU 203 manages the content data stored in the hard disk drive 211 using the directory configuration illustrated by FIG. 3.

Also, the CPU 203 is capable of reading the content files from the hard disk drive 211 as content data.

When the CPU 203 reads video data (content data) from the hard disk drive 211, the CPU 203 supplies the video data to the display processing section 207 via the bus 202.

When the CPU 203 reads audio data (content data) from the hard disk drive 211, the CPU 203 supplies the audio data to the audio processing section 209.

An antenna 212 receives radio broadcast waves from radio stations. The antenna 212 then supplies the radio broadcast waves to a tuner 213 equivalent to an AM/FM tuner.

For example, a user selects a certain radio station through the operation input section 200. The tuner 213 under the control of the CPU 203 extracts, from the radio broadcast waves received by the antenna 212, a radio broadcast signal of the broadcast frequency corresponding to the selected radio station. The tuner 213 then performs a prescribed reception process to the radio broadcast signal to generate audio data, and then supplies the audio data via the bus 202 to the audio processing section 209.

The audio processing section 209 transforms the audio data supplied from the tuner 213 into an analog audio signal, and then supplies the analog audio signal to the speaker 210 which therefore outputs sound of a radio program broadcast from a radio station. This allows a user to listen to sound of the radio program.

The CPU 203 also may supply the audio data obtained by the tuner 213 to the hard disk-drive 211 to record them on the hard disk drive 211. In this manner, the CPU 203 is able to record sound of radio programs.

The CPU 203 connects with a network NT via a communication processing section 214 and a network interface 215. The CPU 203 therefore can access the portal server 3 and other servers SV1 through SV4 on the network NT, and interchange various data with the portal server 3 and other servers SV1 through SV4.

(1-8-2) Configuration of Program Modules

Figure 15:
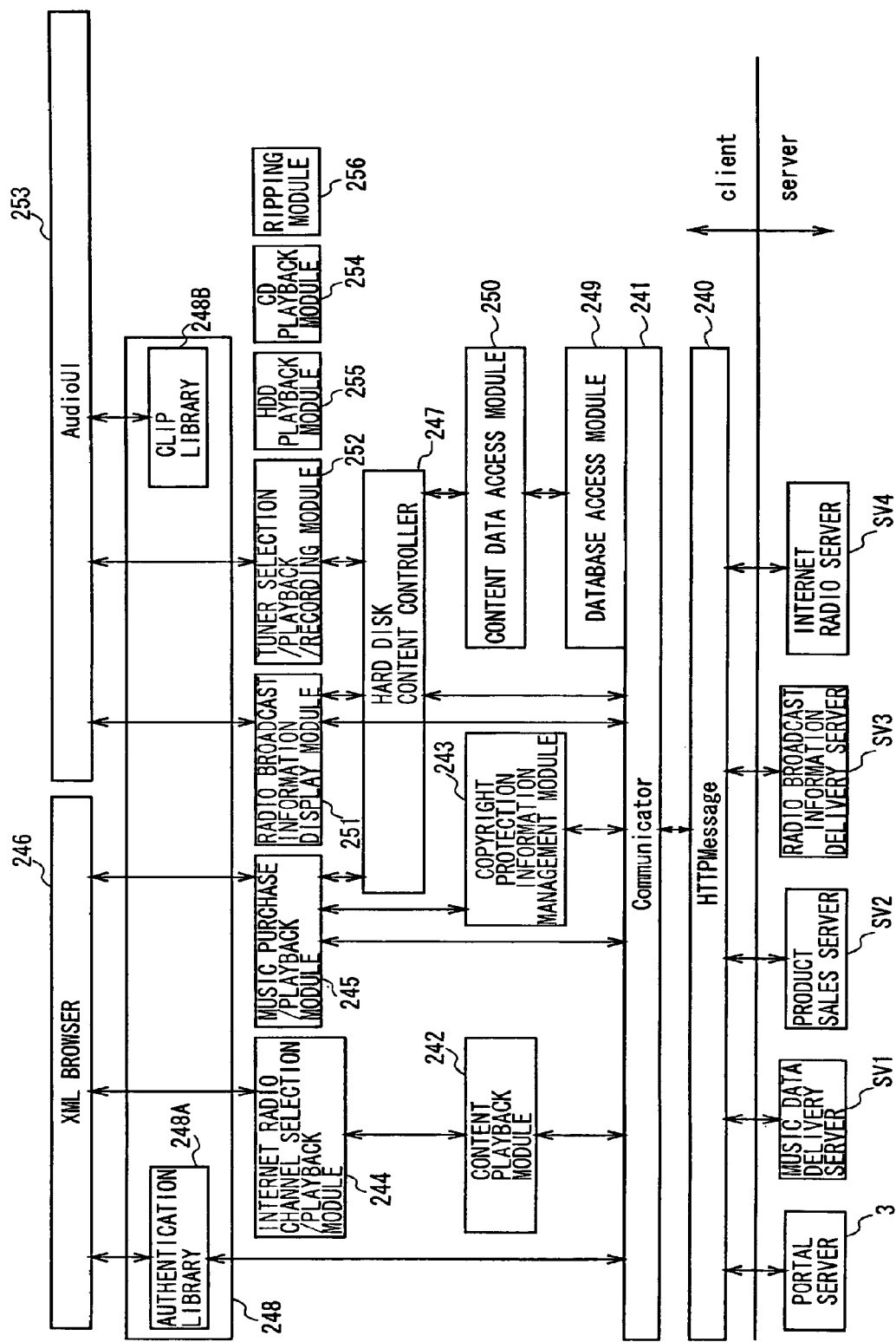
FIG. 15 is a schematic diagram showing program modules of the client terminal.

Program modules are applied to the client terminal 2 that has the hardware configuration described by the hardware circuit blocks shown in FIG. 14. As shown in FIG. 15, the program modules operate on OS, and interchange with the portal server 3 and other servers SV1 through SV4.

An HTTP (Hyper Text Transfer Protocol) message program 240 interchanges with the portal server 3 and other servers SV1 through SV4 in HTTP communication. A communicator program 241 interchanges data with the HTTP message program 240.

A content playback module 242 and a copyright protection information management module 243 are disposed above the communicator program 241. The content playback module 242 interprets the codec of contents, and reproduces them. The copyright protection information management module 243 deals with information relating to copyright protection. An Internet radio channel selection/playback module 244 and a music purchase/playback module 245 are disposed on the content playback module 242 and the copyright protection information management module 243 respectively. The Internet radio channel selection/playback module 244 selects channels of Internet radio and plays the selected channels.

The music purchase/playback module 245 controls the purchase of music and the playback of demo music.

The Internet radio channel selection/playback module 244 and the music purchase/playback module 245 perform a playback process to generate audio data. The audio data is transferred to the audio processing section 209 to output audio from the speaker 210.

A XML browser module 246 is disposed above the Internet radio channel selection/playback module 244 and the music purchase/playback module 245. The XML browser module 246 interprets XML files received from various servers, and then displays images on the display 206.

For example, a user selects a piece of music through the XML browser module 246. The music purchase/playback module 245 therefore performs a purchasing process for purchasing the piece of music. The purchased piece of music is supplied via a hard disk content controller 247 to the hard disk drive 211 to stores it on the hard disk drive 211.

The communicator program 241 connects with an authentication library 248A of a library 248. The authentication library 248A performs various kinds of authentication processes in association with the portal server 3 and the like.

A database access module 249, a content data access module 250, and the hard disk content controller 247 are disposed above the communicator program 241.

The database access module 249 accesses various kinds of databases disposed in the hard disk drive 211. The content data access module 250 accesses content data stored in the hard disk drive 211. The hard disk content controller 247 manages content data stored in the hard disk drive 211.

A radio broadcast information display module 251 and a tuner selection/playback/recording module 252 are disposed above the hard disk content controller 247. The radio broadcast information display module 251 performs processes for displaying a title and artist name of music broadcast from radio stations. The tuner selection/playback/recording module 252 selects radio stations. The tuner selection/playback/recording module 252 also records content data (music) received from a radio station on the hard disk drive 211.

For example, a user selects a radio station through an audio user interface (UI) 253 to receive music from the radio station. The received music is supplied via the content data access module 250 to the hard disk drive 211 to stores it in the hard disk drive 211.

The tuner selection/playback/recording module 252 performs playback processes to generate audio data (content data). The audio data is supplied to the audio processing section 209 to output audio from the speaker 210.

The radio broadcast information display module 251 uses the tuner selection/playback/recording module 252 to receive radio broadcast information from the radio broadcast information delivery server SV3 via the HTTP message program 240. For example, the received radio broadcast information is now-on-air information about a title and artist name of music currently broadcast by a radio station. The radio broadcast information display module 251 then transmits the information via the audio user interface (UI) 253 to the display 206 which displays the information.

The radio broadcast information, which was transmitted via the audio user interface 253 and displayed on the display 206, may be temporarily stored in a clip library 248B of the library 248. In response to user's instruction, the radio broadcast information is finally transferred via the database access module 249 to the hard disk drive 211 to be recorded on the hard disk drive 211.

A CD playback module 254 controls the media drive 208 to play back CDs.

Audio data played back from CDs by the CD playback module 254 are transferred to the audio processing section 209 to output audio from the speaker 210.

A HDD playback module 255 connects with the hard disk content controller 247 and the copyright protection information management module 243 (the connection is not shown here).

The HDD playback module 255 under the control of the hard disk content controller 247 reads audio data (content data) from the hard disk drive 211. The HDD playback module 255 then plays back the audio data based on copyright management information supplied from the copyright protection information management module 243.

In addition, audio data, which was played by the HDD playback module 255 based on the copyright management information, is supplied to the audio processing section 209 which then outputs audio from the speaker 210.

A ripping module 256 connects with the hard disk content controller 247 and the copyright protection information management module 243 (the connection is not shown here).

The ripping module 256 controls the CD playback module 254, the copyright protection information management module 243, and the hard disk content controller 247 to store (i.e., rip) audio data played back from CDs by the CD playback module 254 and its copyright management information in the hard disk drive 211. Specifically, the copyright management information is supplied from the copyright protection information management module 243 to control the audio data. The storage process of the audio data and copyright management information is also controlled by the hard disk content controller 247.

As for the program modules described above, the HTTP message program 240 and the communicator program 241 can provide the same function as the communication control section 32 of the client terminal 2 (FIG. 2) does.

The content playback module 242 can provide the same function as the encoder/decoder section 34 of the client terminal 2 (FIG. 2) does.

The copyright protection information management module 243 can provide the same function as the copyright management section 35 of the client terminal 2 (FIG. 2) does.

The Internet radio channel selection/playback module 244 can provide the same function as the control section 23 and audio control section 26 of the client terminal 2 (FIG. 2) do.

The music purchase/playback module 245 can provide the same function as the control section 23 and audio control section 26 of the client terminal 2 (FIG. 2) do.

The XML browser module 246 can provide the same function as the input processing section 21 and page information generation section 36 of the client terminal 2 (FIG. 2) do.

The hard disk content controller 247, the database access module 249, and the content data access module 250 can provide the same function as the control section 23 of the client terminal 2 (FIG. 2) does.

The authentication library 248A of the library 248 can provide the same function as the authentication processing section 37 and the authentication information storage section 38 of the client terminal 2 (FIG. 2) do.

The clip library 248B of the library 248 can provide the same function as the control section 23 of the client terminal 2 (FIG. 2) does.

The radio broadcast information display module 251 can provide the same function as the radio broadcasting display control section 39 of the client terminal 2 (FIG. 2) does.

The tuner selection/playback/recording module 252 can provide the same function as the control section 23, audio control section 26 and tuner section 31 of the client terminal 2 (FIG. 2) do.

The audio user interface 253 can provide the same function as the input processing section 21, control section 23 and display control section 24 of the client terminal 2 (FIG. 2) do.

The CD playback module 254 can provide the same function as the audio control section 26 and external recording media recording and reproducing section 28 of the client terminal 2 (FIG. 2) do.

The HDD playback module 255 can provide the same function as the control-section 23 and audio control section 26 of the client terminal 2 (FIG. 2) do.

The ripping module 256 can provide the same function as the control section 23, external recording media recording and reproducing section 28 and encoder/decoder section 34 of the client terminal 2 (FIG. 2) do.

Accordingly, the client terminal 2 illustrated by FIG. 14 (which has the hardware configuration of hardware circuit blocks) can perform the same processes as the client terminal 2 illustrated by FIG. 2 (which has the hardware configuration of functional circuit blocks) does, as the CPU 203 performs processes based on the above-noted program modules.

(1-9) Hardware Circuit Block Configuration of Each Server

The portal server 3, the music data delivery server SV1, the product sales server SV2, and the radio broadcast information delivery server SV3 includes hardware circuit blocks. The hardware configuration of these servers 3, SV1, SV2, and SV3 will be described.

In a case in which the portal server 3, the music data delivery server SV1, the product sales server SV2, and the radio broadcast information delivery server SV3 includes hardware circuit blocks, these servers 3, SV1, SV2, and SV3 can use software to provide various kinds of functions. Accordingly, in this case, each server 3, SV1, SV2, and SV3 has the same hardware configuration.

Figure 16:
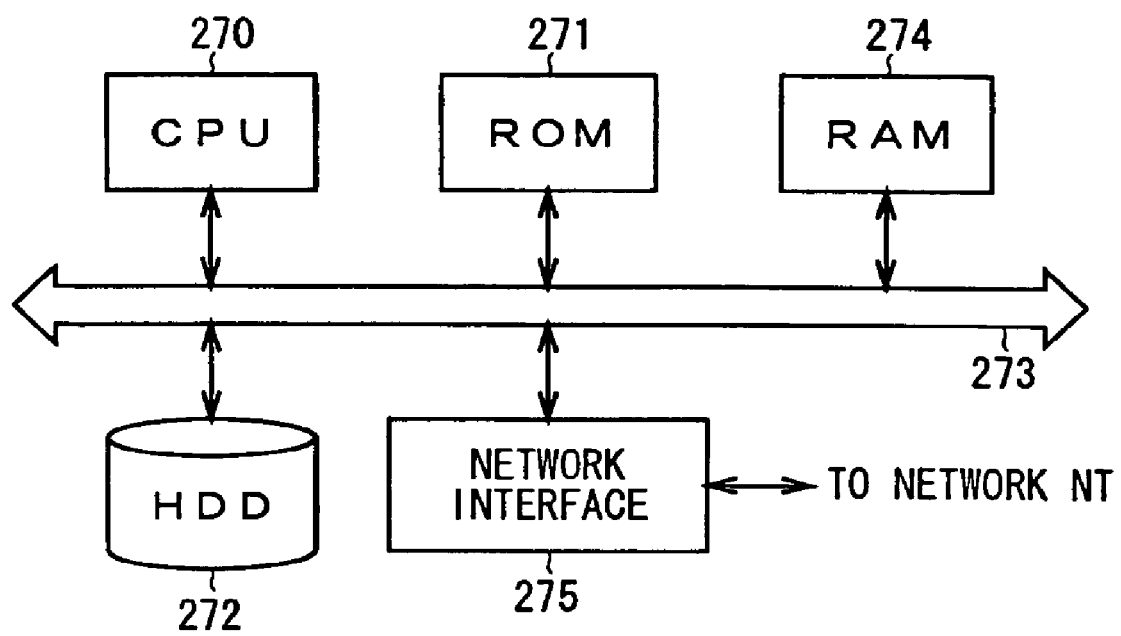
FIG. 16 is a block diagram showing the hardware configuration of servers using hardware circuit blocks.

Referring to FIG. 16, the basic hardware configuration of a server including hardware circuit blocks will be described. This configuration can be applied to any one of these servers: the portal server 3, the music data delivery server SV1, the product sales server SV2, and the radio broadcast information delivery server SV3.

The server has a CPU 270. The CPU 270 takes overall control of the server. A ROM 271 or a hard disk drive 272 stores various kinds of programs such as basic programs and application programs. The CPU 270 loads these programs onto a RAM 274 via a bus 273 and performs various kinds of processes based on the programs.

The hard disk drive 272 temporarily or permanently stores various kinds of data and information including page information to be published. The hard disk drive 272 may have a database on its hard disk to store various kinds of registration information such as customer information.

The CPU 270 reads from the hard disk drive 272 various kinds of data, information and registration information to perform various kinds of processes using them.

A network interface 275 connects with the client terminal 2 and various kinds of servers via the network NT to interchange various kinds of data and information.

In the server, the CPU 270 essentially performs various kinds of processes using various kinds of programs stored in the ROM 271 or the hard disk drive 272.

Therefore, this server's CPU 270 can perform the same functions as the control section 50, communication control section 52, and authentication processing section 56 of the portal server 3 illustrated by FIG. 4, if the programs stored in the ROM 271 or the hard disk drive 272 are selected properly in dependence upon the functions provided by the portal server 3 (FIG. 4). And this server's hard disk drive 272 can work as the customer database section 54, page information storage section 55, authentication information storage section 57, frequency information storage section 58, and URL storage section 59 of the portal server 3 (FIG. 4). By the way, the portal server 3 illustrated by FIG. 4 includes functional circuit blocks.

This server's CPU 270 also can perform the same functions as the control section 70, communication control section 72, authentication processing section 75, and retrieval section 79 of the music data delivery server SV1 illustrated by FIG. 5, if the programs stored in the ROM 271 or the hard disk drive 272 are selected properly in dependence upon the functions provided by the music data delivery server SV1 (FIG. 5). And this server's hard disk drive 272 can work as the customer database section 74, page information storage section 76, authentication information storage section 77, and music data storage section 78 of the music data delivery server SV1 (FIG. 5). By the way, the music data delivery server SV1 illustrated by FIG. 5 includes functional circuit blocks.

This server's CPU 270 also can perform the same functions as the control section 90, communication control section 92, authentication processing section 95, and retrieval section 99 of the product sales server SV2 illustrated by FIG. 6, if the programs stored in the ROM 271 or the hard disk drive 272 are selected properly in dependence upon the functions provided by the product sales server SV2 (FIG. 6). And this server's hard disk drive 272 can work as the customer database section 94, page information storage section 96, authentication information storage section 97, and package media information storage section 98 of the product sales server SV2 (FIG. 6). By the way, the product sales server SV2 illustrated by FIG. 6 includes functional circuit blocks.

This server's CPU 270 also can perform the same functions as the control section 110, communication control section 112, authentication processing section 115, and retrieval section 118 of the radio broadcast information delivery server SV3 illustrated by FIG. 7, if the programs stored in the ROM 271 or the hard disk drive 272 are selected properly in dependence upon the functions provided by the radio broadcast information delivery server SV3 (FIG. 7). And this server's hard disk drive 272 can work as the customer database section 114, page information storage section 116, on-air-list information storage section 117, now-on-air information storage section 119 and authentication information storage section 120 of the radio broadcast information delivery server SV3 (FIG. 7). By the way, the radio broadcast information delivery server SV3 illustrated by FIG. 7 includes functional circuit blocks.

In this manner, if the programs stored in the ROM 271 or the hard disk drive 272 are selected properly, the server including hardware circuit blocks can provide the same functions as the portal server 3, music data delivery server SV1, product sales server SV2, and radio broadcast information delivery server SV3 including functional circuit blocks as illustrated by FIG. 4 through FIG. 7.

In the above-noted embodiments, the client terminal 2 receives radio broadcasts from radio stations. However, the present invention is not limited to this. For example, the client terminal 2 can receive television broadcasts from television stations, and acquire various kinds of broadcast information relating to television programs from servers on the network NT.

In the above-noted embodiments, the client terminal 2 is equipped with the hardware circuit blocks, the functional circuit blocks, and the program modules. However, the present invention is not limited to this. For example, other terminals such as mobile phones and personal computers also can be equipped with the hardware circuit blocks, the functional circuit blocks, and the program modules. The terminals including the hardware circuit blocks, the functional circuit blocks, and the program modules can perform the same processes as the above-mentioned client terminal 2.

(2) Process During Purchase of Album (2-1) Overview

In the present embodiment, the music data delivery server SV1 shown in FIG. 1 can provide the client terminal 2 with an album music data set which includes the same music data as those recorded on an album CD.

Each music data in the album music data set has been previously associated with album identification information to identify an album the music data belongs to.

By the way, the album CD, which is sold at stores, contains a plurality of music data in a recording order intended by an artist and participants. Accordingly, each music data in the album music data set is previously associated with recoding order information indicative of the recording order.

For example, when a user performs, through the operation input section 200 of the client terminal 2, an album download operation to download the album music data set, the client terminal 2 transmits to the music data delivery server SV1 a request signal that directs the music data delivery server SV1 to transmit the album music data set corresponding to the album download operation.

In response to the request signal from the client terminal 2, the music data delivery server SV1 performs a predetermined fee-charging process. The music data delivery server SV1 subsequently reads out the album music data set corresponding to the request signal from the hard disk drive 272 of the music data delivery server SV1, and then transmits the album music data set to the client terminal 2. The client terminal 2 stores the album music data set received from the music data delivery server SV1 in the hard disk drive 211.

In this manner, when the user just performs one album download operation, then the plurality of music data (equivalent to the album music data set), which are collectively defined as one album, are downloaded on the client terminal 2.

Figure 17:
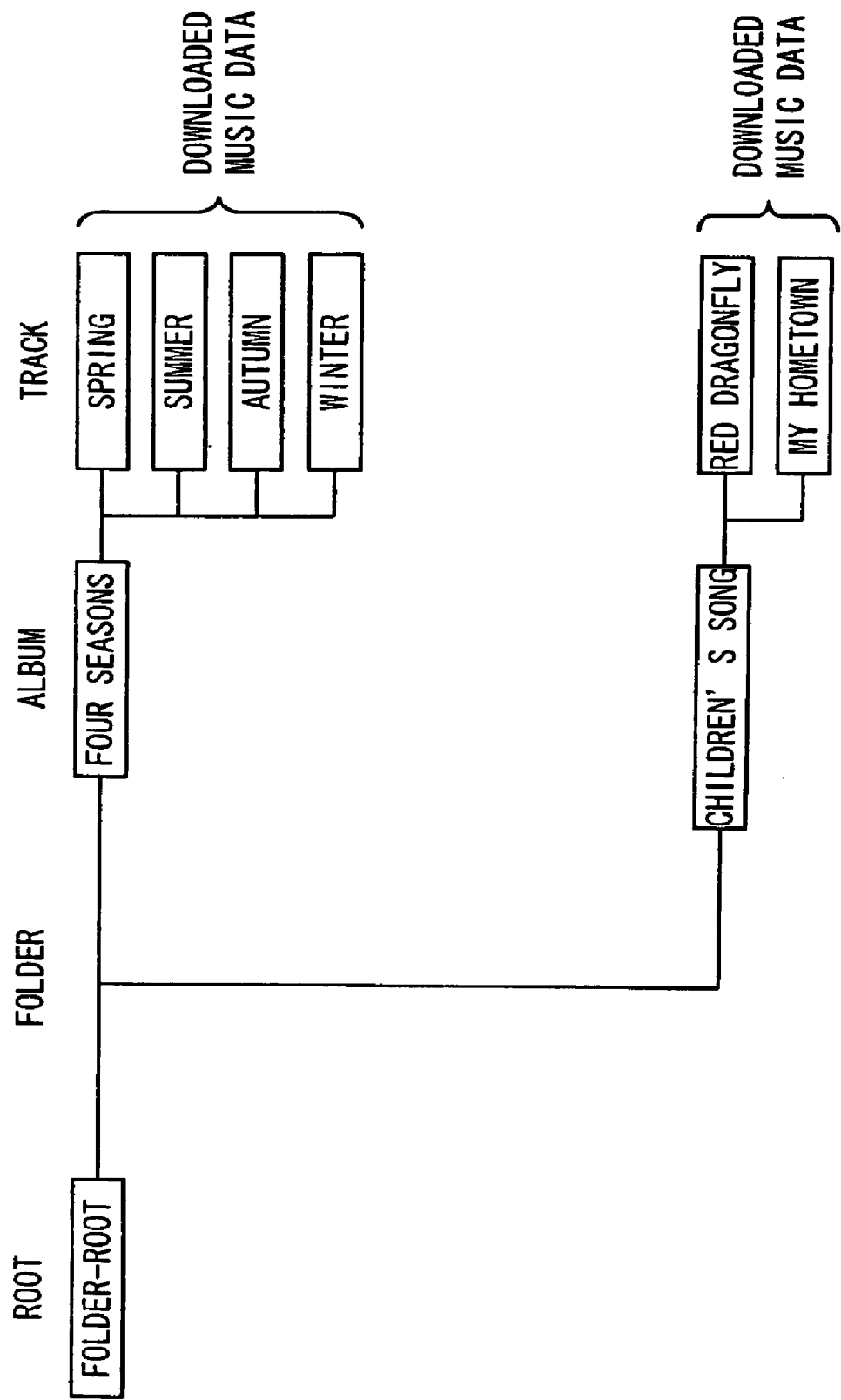
FIG. 17 is a schematic diagram illustrating a title list screen (1).

For example, if the user performs the album purchase operation two times through the operation input section 200, two types of album music data sets, which are equivalent to two types of album CDs, are downloaded on the client terminal 2. After that, when the user performs an automatic classifying operation to display the titles of music data in these album music data sets automatically classified, the client terminal 2 performs an automatic classifying process. As a result of the process, the client terminal 2 displays a title list screen on the display 206 as shown in FIG. 17.

An example of the automatic classifying process will be described. In the automatic classifying process, first of all the client terminal 2 checks all pieces of the album identification information each of which is associated with each music data downloaded as the album music data set. As a result, the client terminal 2 recognizes that there are two types of albums those music data belong to, and then creates album folders for these albums on the title list screen. In the present embodiment, each album folder created shows its album title: "Four Seasons" and "Children's Song".

The client terminal 2 subsequently associates, based on the album identification information associated with the music data, the titles of music data ("Spring", "Summer", and the like) with one of the album folders on the display. With the music data associated with the album folders, the client terminal 2 then arranges, based on the recording order information associated with the music data, the titles of the music data of each folder in the recording order.

Therefore, the title list screen displays the titles of music data in the two album music data sets classified by albums. In addition, the titles of the music data of each group are displayed in the recording order on the album CDs.

Accordingly, the user does not have to perform operations such as putting each music data of the album music data set into a corresponding album folder. In this manner, the plurality of music data is classified in an effective manner.

By the way, when the user selects the album folder of "Four Seasons" on the title list screen and then performs a predetermined playback operation, the client terminal 2 plays back the plurality of music data associated with the album folder of "Four Seasons" in the same order as they are displayed (i.e. in the recording order).

Figure 18:
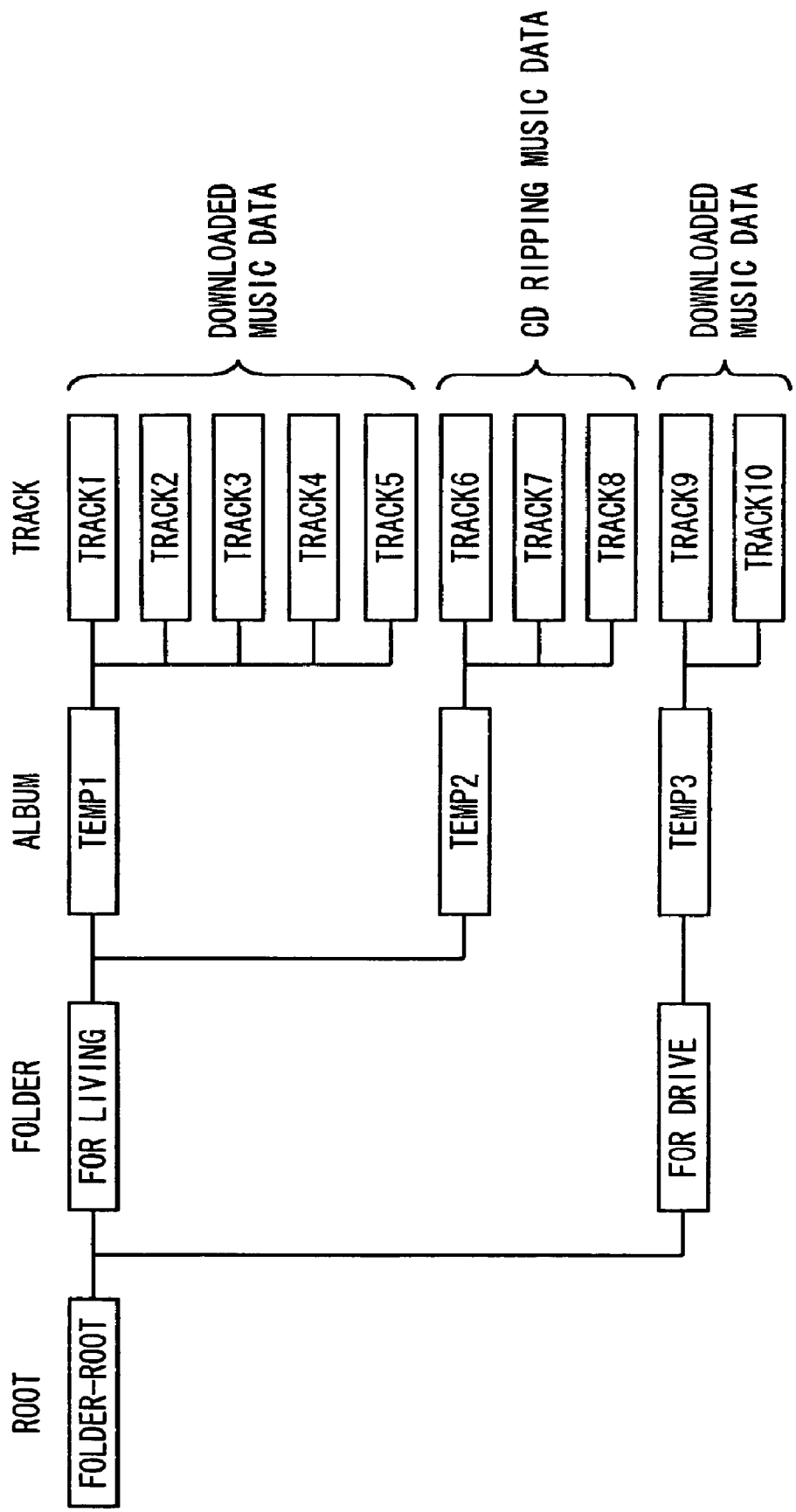
FIG. 18 is a schematic diagram illustrating a title list screen (2).
Figure 19:
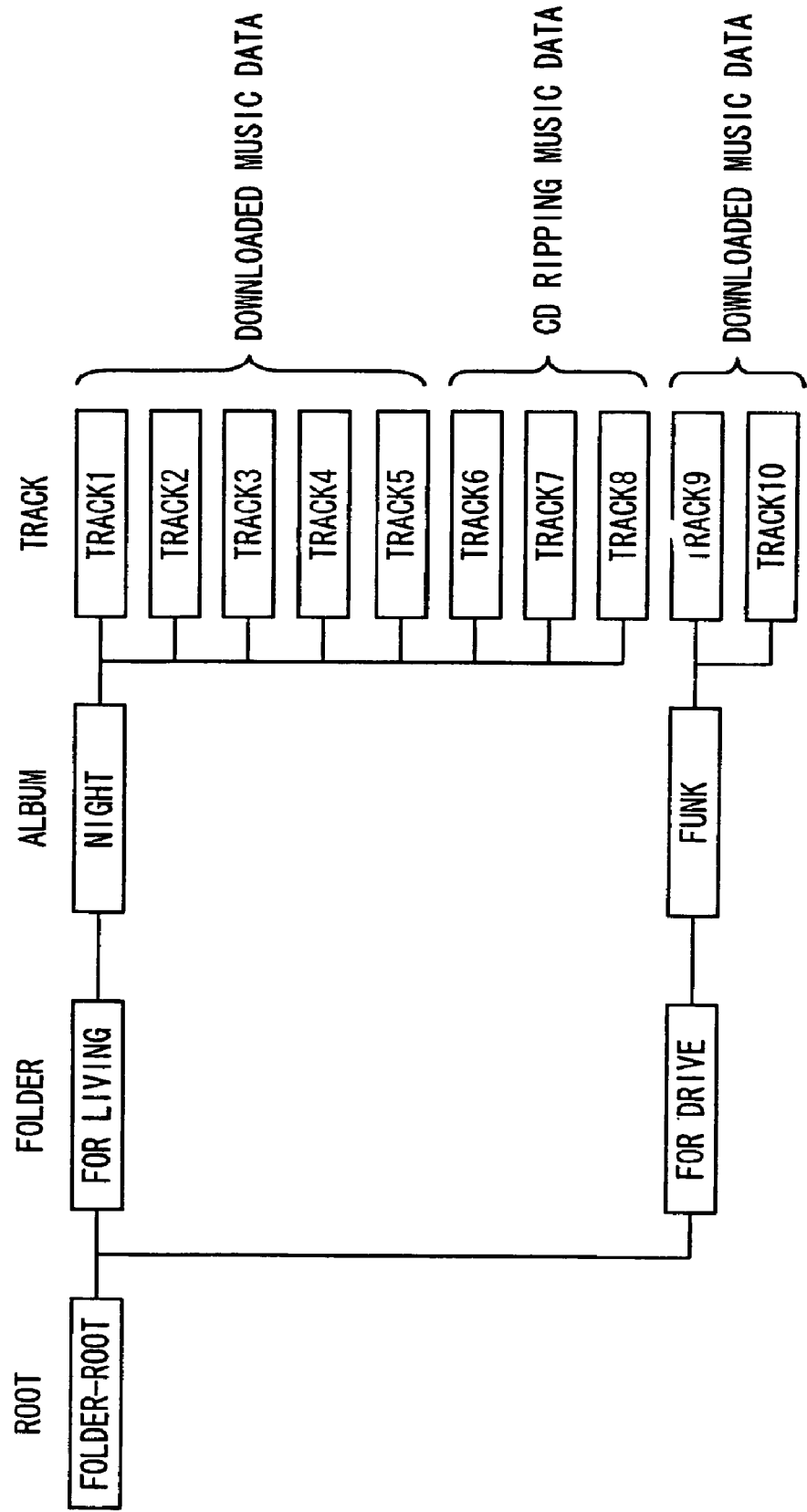
FIG. 19 is a schematic diagram illustrating a title list screen (3).

In addition, in the present embodiment, as shown in FIG. 18 and 19, the user may create folders himself/herself, and then put each music data of the album music data sets into a folder he/she wants.

For example, on the title list screen shown in FIG. 18, for example, the folders of "For Living" and "For Drive" are created by the user. Under these folders, folders of "temp1", "temp2" and "temp3" are created in line with user's intentions. After the user puts each music data into the folders of "temp1", "temp2" and "temp3", the titles of the music data ("track1", "track2", and the like) become associated with the folders of "temp1", "temp2" and "temp3" on the display. In this case, the titles of the music data downloaded are associated with the folders of "temp1" and "temp3". The titles of the music data ripped from music CDs (i.e. copied from music CDs) are associated with the folder of "temp2".

On the other hand, on the title list screen shown in FIG. 19, for example, the folders of "For Living" and "For Drive" are created by the user. Under these folders, folders of "Night" and "Funk" are created in line with user's intentions. After the user puts each music data into the folders of "Night" and "Funk", the titles of the music data become associated with the folders of "Night" and "Funk" on the display. In this case, the titles of the music the user listens to at night are associated with the folder of "Night", and the titles of the relevant music data are associated with the folder of "Funk".

(2-2) Attribute Information of Music Data

With reference to FIG. 20, attribute information associated with the music data will be described.

In the present embodiment, the music data downloaded from the music data delivery server SV1 are associated with the attribute information. After the client terminal 2 downloads the music data from the music data delivery server SV1, the client terminal 2 records the attribute information of the downloaded music data on an attribute information management table TB1 which is in a database installed in the hard disk drive 211.

Referring to the attribute information management table TB1 shown in FIG. 20, the attribute information of the music data will be described in detail.

There are three types of groups in the attribute information of the music data: a group of information related to the music data itself (this group will be referred to as a TrackInfo information group); a group of information related to an album the music data belongs to (this group will be referred to as an AlbumInfo information group); and a group of information related to a compression format of the music data and the like (this group will be referred to as a MusicData information group).

The TrackInfo information group includes music data identification information (equivalent to a section of "Content ID" in FIG. 20) to be used to identify the music data; title information of the music data (equivalent to a section of "Title" in FIG. 20); and artist name information (equivalent to a section of "Artist" in FIG. 20).

The AlbumInfo information group includes album identification information (equivalent to a section of "Album ID" in FIG. 20) to be used to identify an album which the music data belongs to; title information of the album (equivalent to a section of "Title" in FIG. 20) which the music data belongs to; and artist name information (equivalent to a section of "Artist" in FIG. 20). In addition, the AlbumInfo information group includes recording order information (equivalent to a section of "Track Order" in FIG. 20) indicative of the recording order of the music data.

The MusicData information group includes information on a compression format of the music data (equivalent to a section of "Codec" in FIG. 20); and information on its bit rate (equivalent to a section of "Bitrate" in FIG. 20).

By the way, in the present embodiment, the client terminal 2 manages storage location information (equivalent to a path on the hard disk drive 211 and indicated by a section of "Data Body" in FIG. 20) that indicates the location of hard disk drive 211 where the music data is recorded, as a part of the MusicData information group.

(2-3) Database on Client Terminal

A play list table and a music management table, which are included in the database installed in the hard disk driver 211 of the client terminal 2, will be described.

Figure 21:
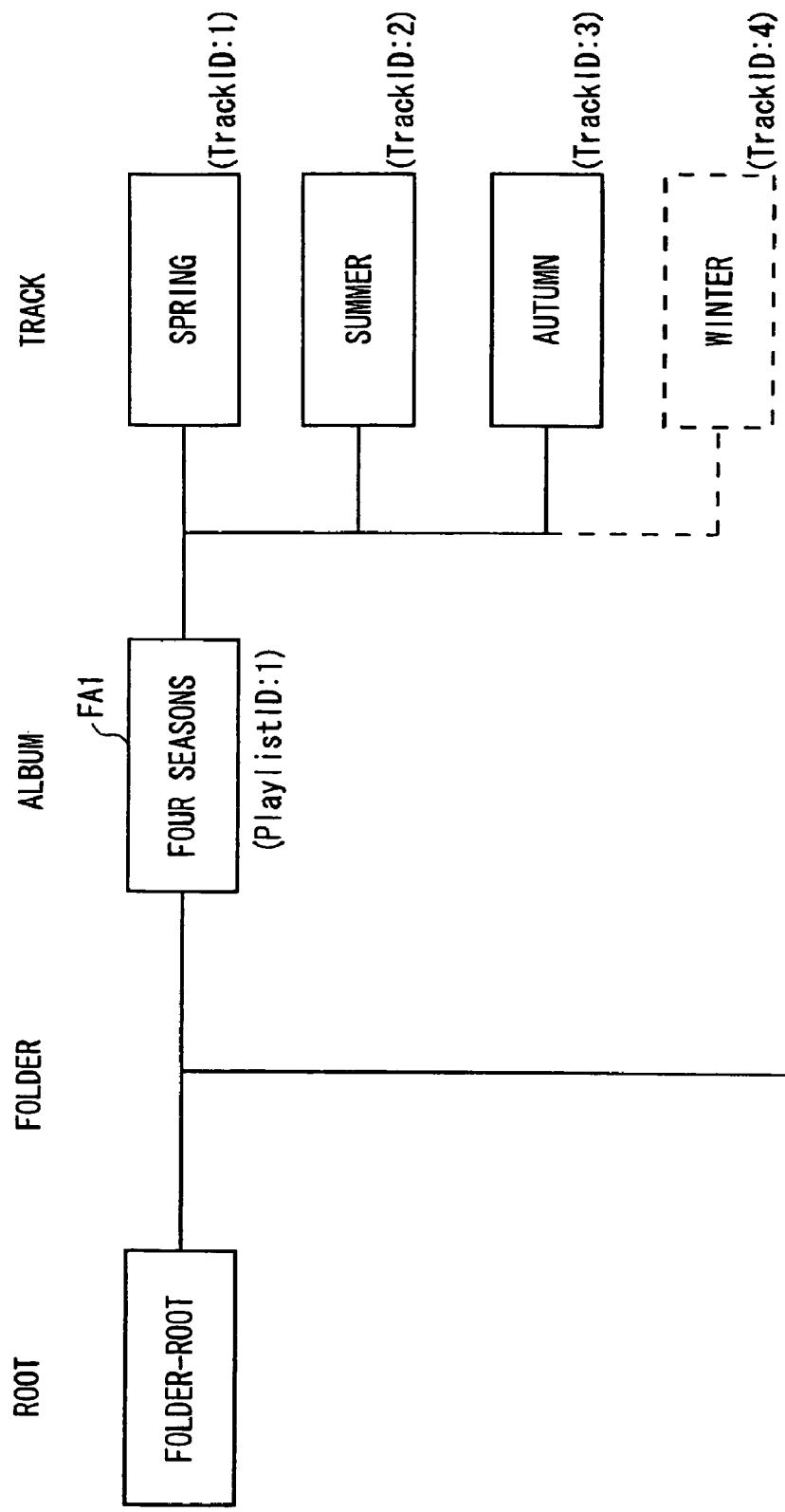
FIG. 21 is a schematic diagram illustrating a title list screen (4).
Figure 22:
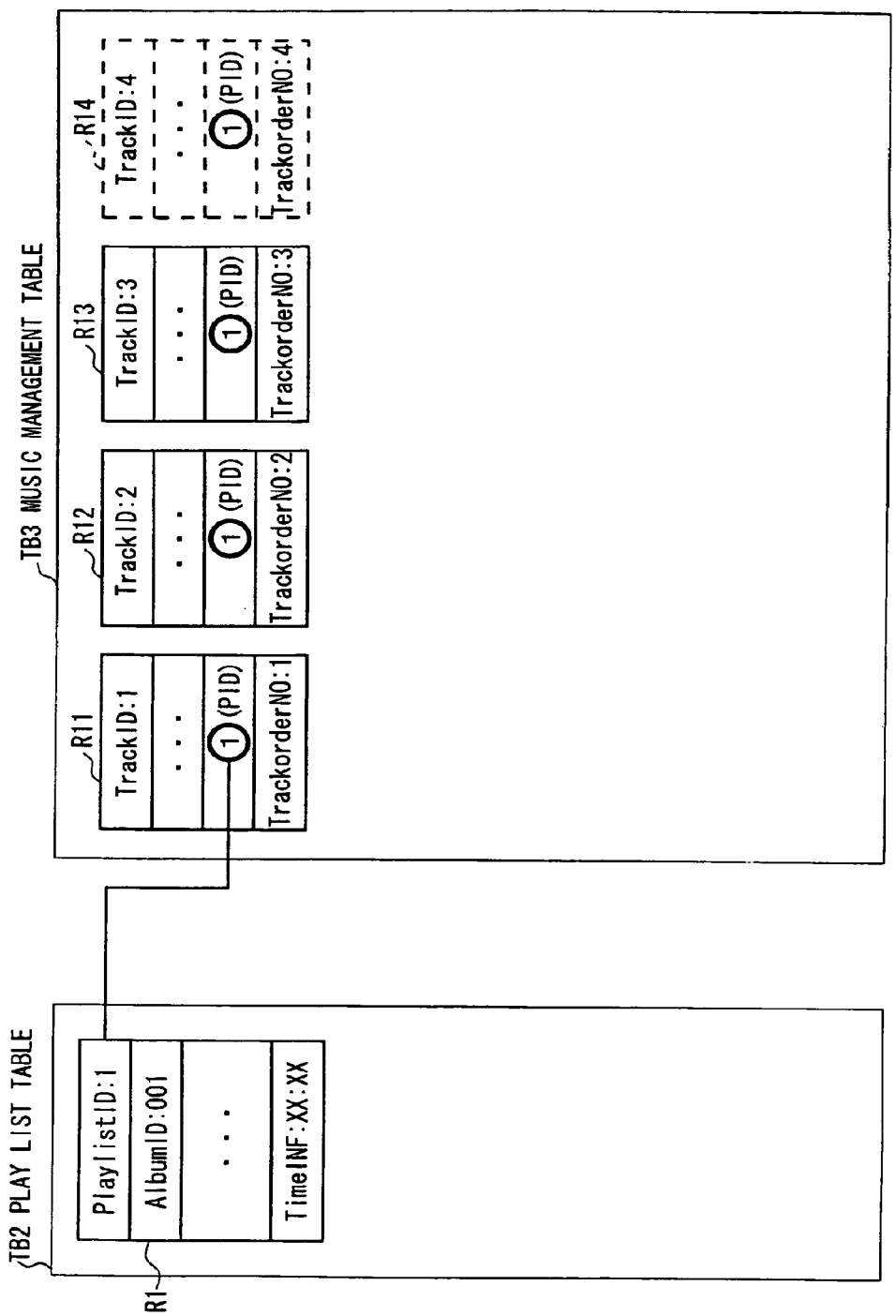
FIG. 22 is a schematic diagram showing the state of a table (1).

For example, in a case in which the titles of music data ("Spring", "Summer" and "Autumn"), which belong to the album of "Four Seasons", are associated with an album folder FA1 on the display 206 of the client terminal 2 as shown in FIG. 21 (the sections indicated by dotted lines in FIG. 21 do not exist at this time), a play list table TB2 includes a record R1 corresponding to the album folder FA1 (the album of "Four Seasons") and a music management table TB3 includes three records R11, R12 and R13 corresponding to the three pieces of music data as shown in FIG. 22 (the sections indicated by dotted lines in FIG. 22 do not exist at this time) in the database installed in the hard disk drive 211 of the client terminal 2.

That is to say, when the album folder FA1 is created, the play list table TB2 shown in FIG. 22 produces the record (also referred to as a play list record) R1 corresponding to the album folder FA. This play list record R1 includes play list record identification information (PlaylistID), which is uniquely associated with each play list record; album identification information (AlbumID) corresponding to the album of "Four Seasons"; and created date and time information (TimeINF) indicative of the date and time when the album folder FA1 is created.

On the other hand, the music management table TB3 produces the records (also referred to as music data records) R11, R12 and R13 for each music data. The music data records R11, R12 and R13 include music data record identification information (TrackID), which is uniquely associated with each music data record; recording order information (TrackorderNO), which indicates the recording order of the corresponding music data; storage location information (not shown) indicative of the location where the music data is stored; and the play list record identification information (PlaylistID: 1 ("PlaylistID" is often abbreviated to "PID" in Figures)) of the play list record R1 corresponding to the album folder FA which the music data is associated with. In this manner, each music data record R11, R12 and R13 is associated with the play list record R1 through the play list record identification information (attach a relation).

For example, when a user selects the album folder FA1 (FIG. 21) and then performs a playback operation, the CPU 203 of the client terminal 2 checks the music data records R11, R12 and R13, which are associated with the play list record R1 corresponding to the album folder FA1, to obtain the storage location information and recording order information (TrackorderNO) of each music data ("Spring", "Summer" and "Autumn") belonging to the album of "Four Seasons". The client terminal 2 subsequently reads out, based on the storage location information and the recording order information (TrackorderNO), the music data of "Spring", "Summer" and "Autumn" from the hard disk drive 211 to play back them in the recording order.

Therefore, the description in the play list record R1 and music data records R11, R12 and R13 (which are associated with the play list record R1) is equivalent to that of a so-called play list. Based on those records R1, R11, R12 and R13 which are equivalent to a play list, the client terminal 2 plays back the music data.

By the way, the music purchase/playback module 245 shown in FIG. 15 performs the playback process. Besides the playback process, this music purchase module 45 performs a process of purchasing music data to download it from the music data delivery server SV1.

(2-4) Automatic Classifying Process

An automatic classifying process, which automatically classifies the titles of music data to display them, will be described in detail.

Figure 23:
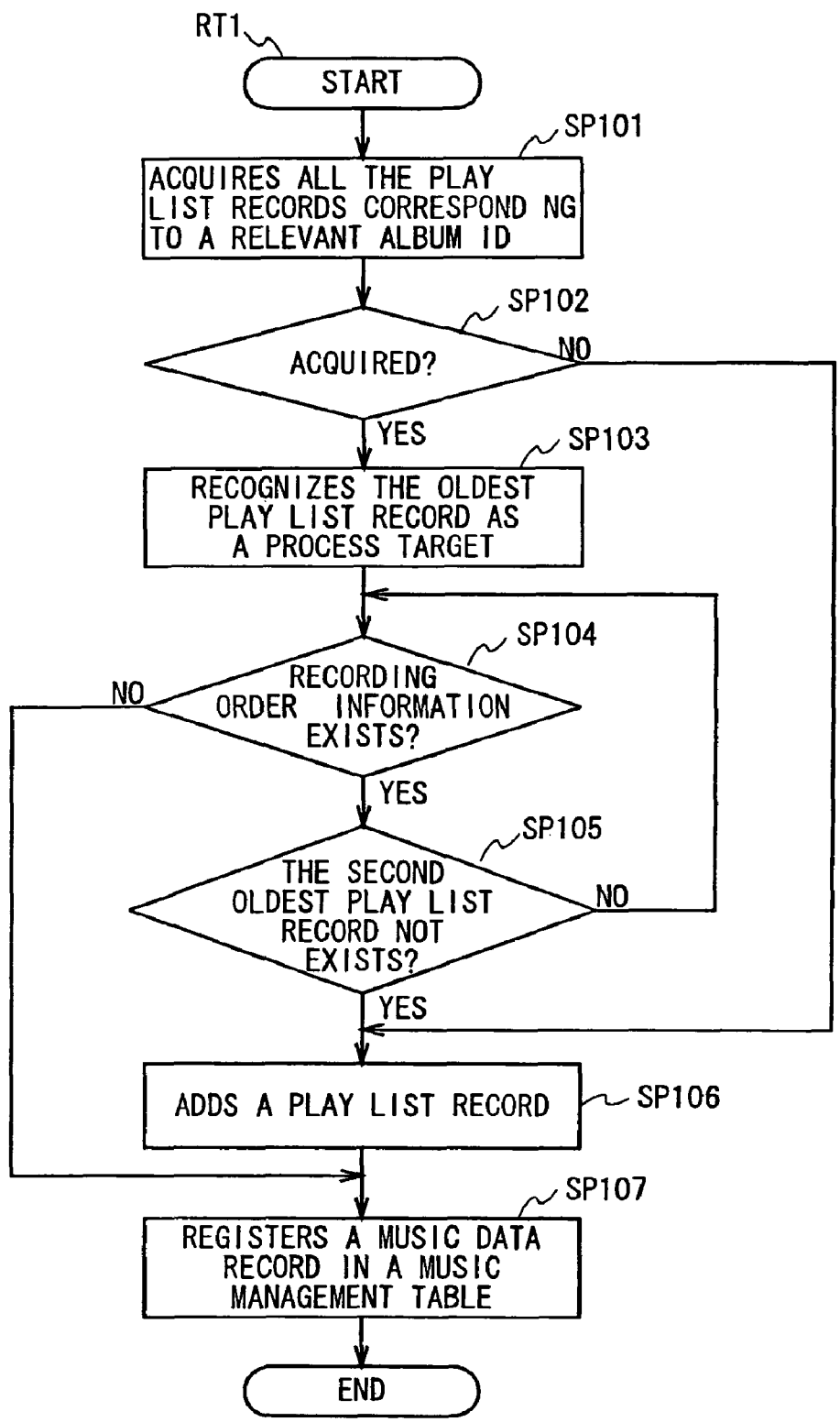
FIG. 23 is a flowchart illustrating an automatic classifying process during registration.

With the display 206 displaying the title list screen as shown in FIG. 21 (the sections indicated by dotted lines do not exist at this time), the CPU 203 of the client terminal 2 for example downloads new music data ("Winter"), which belongs to the album of "Four Seasons", from the music data delivery server SV1, and then proceeds to step SP101 on a procedure RT1 shown in FIG. 23 (which is a procedure of "Automatic Classifying Process during Registration").

The attribute information associated with the music data of "Winter" includes the album identification information of "AlbumID: 001" indicative of the album of "Four Seasons"; and the recording order information of "TrackorderNO: 4" which means that this music data is fourth song.

The CPU 203 of the client terminal 2 at step SP101 obtains the album identification information of "AlbumID: 001" which is a part of the attribute information associated with the newly downloaded music data of "Winter", and then performs a record acquisition process to acquire from the database all the play list records that includes the album identification information of "AlbumID: 001".

The CPU 203 of the client terminal 2 subsequently proceeds to step SP102, and then checks whether or not it has acquired one or more play list records corresponding to the album identification information of "AlbumID: 001" as the result of the record acquisition process. In this case, because the CPU 203 of the client terminal 2 can acquire from the play list table TB2 (FIG. 22) the play list record R1 corresponding to the album identification information of "AlbumID: 001", the CPU 203 of the client terminal 2 obtains affirmative result and then proceeds to step SP103.

By the way, in a case in which the CPU 203 of the client terminal 2 can not acquire any play list record corresponding to the album identification information of "AlbumID: 001", the CPU 203 of the client terminal 2 obtains negative result and then proceeds to step SP106. And then, the CPU 203 of the client terminal 2 adds a new play list record to the play list table TB2 for the album identification information of "AlbumID: 001", and then displays an album folder corresponding to this newly added play list record on the title list screen.

Since the CPU 203 of the client terminal 2 acquired only one play list record R1 at step SP102, the CPU 203 of the client terminal 2 at step SP103 defines this play list record R1 as a process-target record which will be processed later.

By the way, if the CPU 203 of the client terminal 2 acquired a plurality of play list records at step SP102, the CPU 203 of the client terminal 2 at step SP103 sorts, based on the created data and time information (TimeINF) of those play list records, those play list records in order of time, and then defines the oldest play list record (in terms of the created date and time information (TimeINF)) as a process-target record.

The CPU 203 of the client terminal 2 subsequently proceeds to step SP104, and then checks whether or not the record order information of "TrackorderNO: 4", associated with the newly downloaded music data of "Winter", exists in the recording order information (TrackorderNO: 1, 2 and 3) of the music data records R11, R12 and R13 associated with the process-target record (which is the play list record R1).

In this case, the CPU 203 of the client terminal 2 obtains negative result. Therefore, the CPU 203 of the client terminal 2 proceeds to step SP107, and then creates a music data record R14 (indicated by dotted lines in FIG. 22) corresponding to the newly downloaded music data of "Winter" on the music management table TB3 such that the music data record R14 is associated with the process-target record (which is the play list record R1). After updating the music management table TB3 in that manner, the CPU 203 of the client terminal 2 performs, based on the updated music management table TB3, a title list screen display process (described below) to update the contents displayed on the title list screen. As a result, the title list screen displays a title of the fourth music data of "Winter" (indicated by dotted lines in FIG. 21) right next to the third music data of "Autumn" such that the title of the music data of "Winter" is associated with the album folder FA1.

Figure 24:
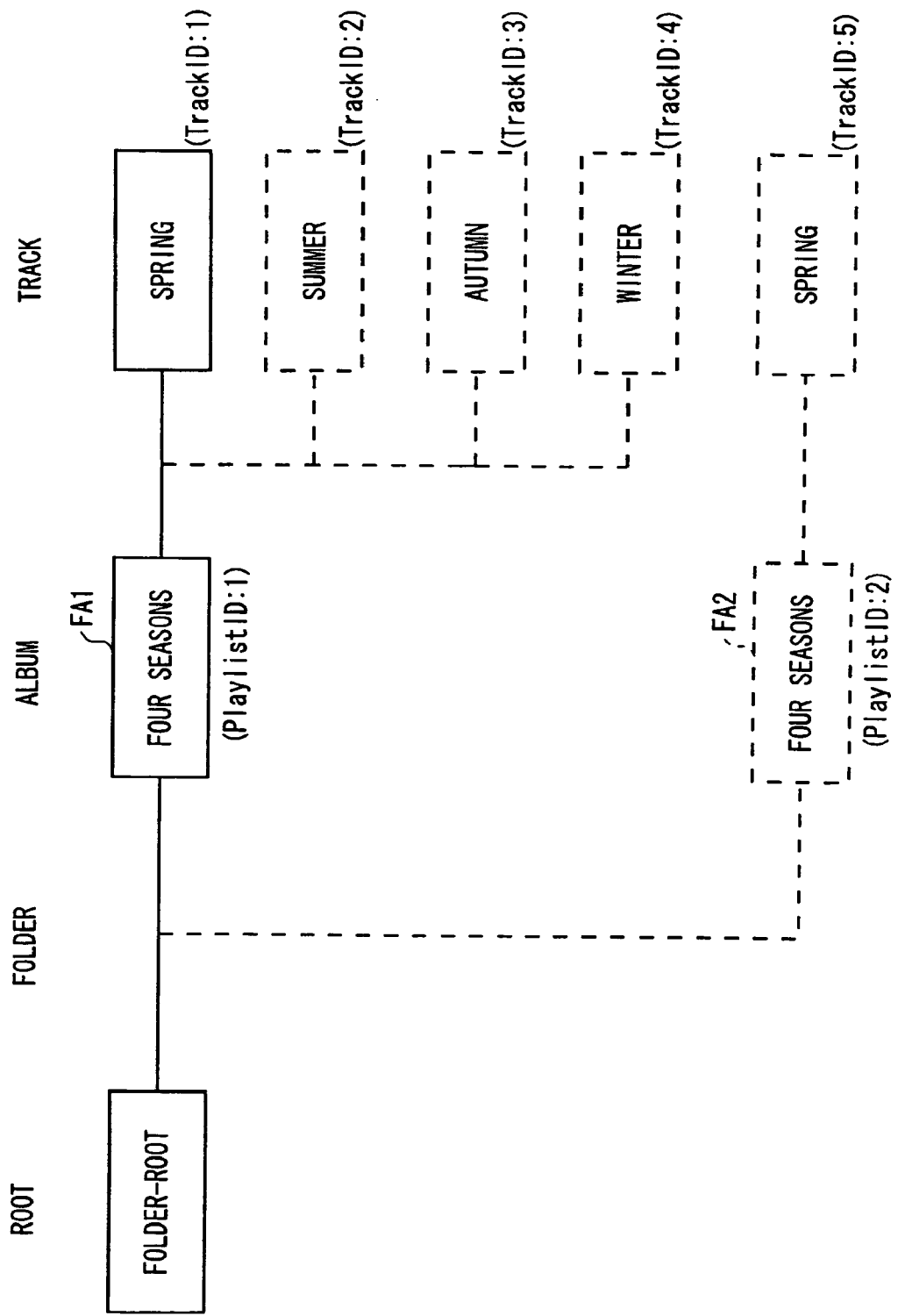
FIG. 24 is a schematic diagram illustrating a title list screen (5).
Figure 25:
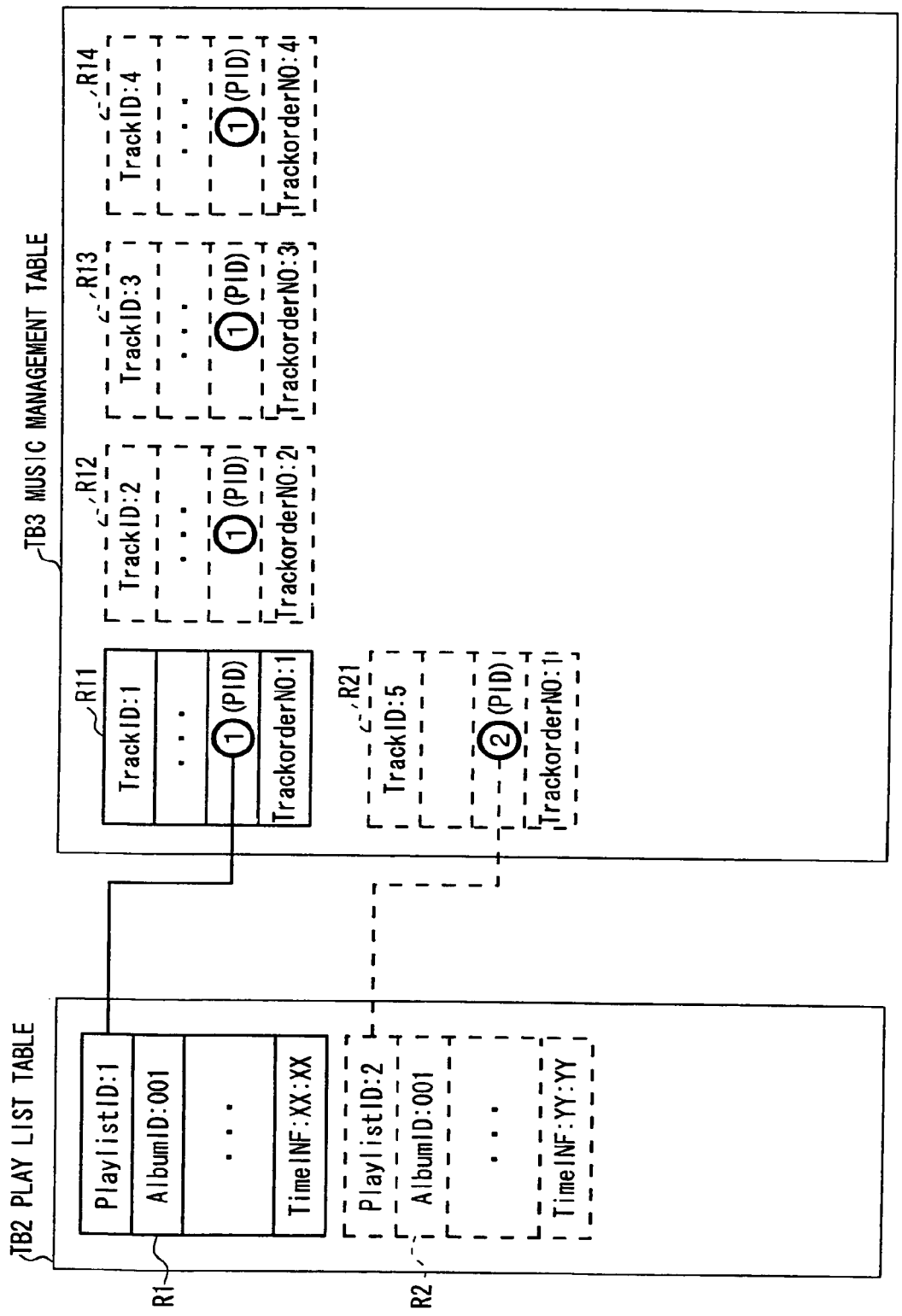
FIG. 25 is a schematic diagram showing the state of a table (2).

By the way, as shown in FIGS. 24 and 25 (the sections indicated by dotted lines do not exist at this time), after the client terminal 2 has downloaded only one music data of "Spring", the client terminal 2 may download an album music data set of the album of "Four Seasons" and then perform the automatic classifying process. This automatic classifying process will be described with reference to the flowchart shown in FIG. 23.

When the CPU 203 of the client terminal 2 downloads the album music data set of the album of "Four Seasons" from the music data delivery server SV1, the CPU 203 of the client terminal 2 proceeds to step SP101 of the procedure RT1 of the automatic classifying process to register the first music data of "Spring" of the album music data set in the database.

In this case, the attribute information of the music data ("Spring", "Summer", "Autumn" and "Winter") in the album music data set include the album identification information of "AlbumID: 001" to identify the album of "Four Seasons"; and the recording order information of "TrackorderNO: 1", "TrackorderNO: 2", "TrackorderNO: 3" and "TrackorderNO: 4" for each music data.

The CPU 203 of the client terminal 2 at step SP101 obtains the album identification information of "AlbumID: 001" from the attribute information associated with the music data of "Spring", and then performs a record acquisition process to acquire from the database all the play list records corresponding to the album identification information of "AlbumID: 001".

The CPU 203 of the client terminal 2 subsequently proceeds to step SP102, and then checks whether or not it has acquired one or more play list records corresponding to the album identification information of "AlbumID: 001" as the result of the record acquisition process. In this case, because the CPU 203 of the client terminal 2 can acquire the play list record R1 (FIG. 25) corresponding to the album identification information of "AlbumID: 001", the CPU 203 of the client terminal 2 obtains affirmative result and then proceeds to step SP103.

Since the CPU 203 of the client terminal 2 acquired only one play list record R1 at step SP102, the CPU 203 of the client terminal 2 at step SP103 defines this play list record R1 as a process-target record.

The CPU 203 of the client terminal 2 subsequently proceeds to step SP104, and then checks whether or not the recording order information ("TrackorderNO: 1") of the recently downloaded music data ("Spring") is the same as that of the music data record R11 ("TrackorderNO: 1") associated with the process-target record (which is the play list record R1). In this case, the CPU 203 of the client terminal 2 obtains affirmative result and then proceeds to step SP105.

The CPU 203 of the client terminal 2 at step SP105 checks, based on the created date and time information (TimeINF), whether or not the second oldest play list record exists among all the play list records acquired at step SP101 (the oldest play list record is the one currently recognized as the process-target record). In this case, the CPU 203 of the client terminal 2 acquired only the play list record R1 at step SP101, which is currently recognized as the process-target record. Therefore, the CPU 203 of the client terminal 2 determines that there is not the second oldest play list record, and then proceeds to step SP106.

By the way, in a case in which there are a plurality of play list records acquired at step SP101 and therefore there is the second oldest play list record (in terms of the created date and time information) among them, the CPU 203 of the client terminal 2 defines the second oldest play list record as a new process-target record, and then returns to above step SP104.

The CPU 203 of the client terminal 2 at step SP106 creates a new play list record R2 (indicated by dotted lines in FIG. 25) on the play list table TB2 for the album of "Four Seasons", and then produces a second album folder FA2 (indicated by dotted lines in FIG. 24) corresponding to the newly created play list record R2 on the title list screen.

The CPU 203 of the client terminal 2 subsequently proceeds to step SP107, and then creates, as shown in FIG. 25, a music data record R21 on the music management table TB3 for the recently downloaded music data of "Spring" such that the music data record R21 is associated with the new play list record R2 created at step SP106. The CPU 203 of the client terminal 2 then displays, based on the music management table TB3 updated in that manner, a title of the recently downloaded music data of "Spring" on the title list display screen such that this title is associated with the newly created second album folder FA2, as shown in FIG. 24.

To register the rest of the music data ("Summer", "Autumn" and "Winter") of the album music data set in the database, the CPU 203 of the client terminal 2 repeats the process of step SP101 to SP107 in the procedure RT1 of the automatic classifying process.

As a result, the music management table TB3 produces, as shown in FIG. 25, the music data records R12, R13 and R14 of the music data ("Summer", "Autumn" and "Winter") such that they are associated with the first play list record R1. In response to that, the title list screen displays, as shown in FIG. 24, the titles of the music data of "Summer", "Autumn" and "Winter" such that they are associated with the first album folder FA1.

In this manner, the client terminal 2 can display all titles of the music data ("Summer", "Autumn" and "Winter") belonging to the album of "Four Seasons" without lacking any one of them, such that they are associated with the first album folder FA1. As for the music data of "Spring" which was downloaded second time, the client terminal 2 displays this music data such that it is associated with the newly created second album folder FA2.

In this manner, when displaying the titles, the client terminal 2 first of all associates all types of the titles of the music data ("Spring", "Summer", "Autumn" and "Winter") belonging to the album of "Four Seasons" with the first created album folder FA1. As for the music data of "Spring" which was downloaded again, the client terminal 2 associates it with the newly created album folder FA2 (not with the album folder FA1).

Accordingly, the client terminal 2 can correctively display, through the album folder FA1, all types of the titles of music data ("Spring", "Summer", "Autumn" and "Winter") belonging to the album of "Four Seasons" without doubling or lacking any one of them. In addition, the titles of music data ("Spring", "Summer", "Autumn" and "Winter") are displayed in a recording order which is intended by the artists.

Figure 26:
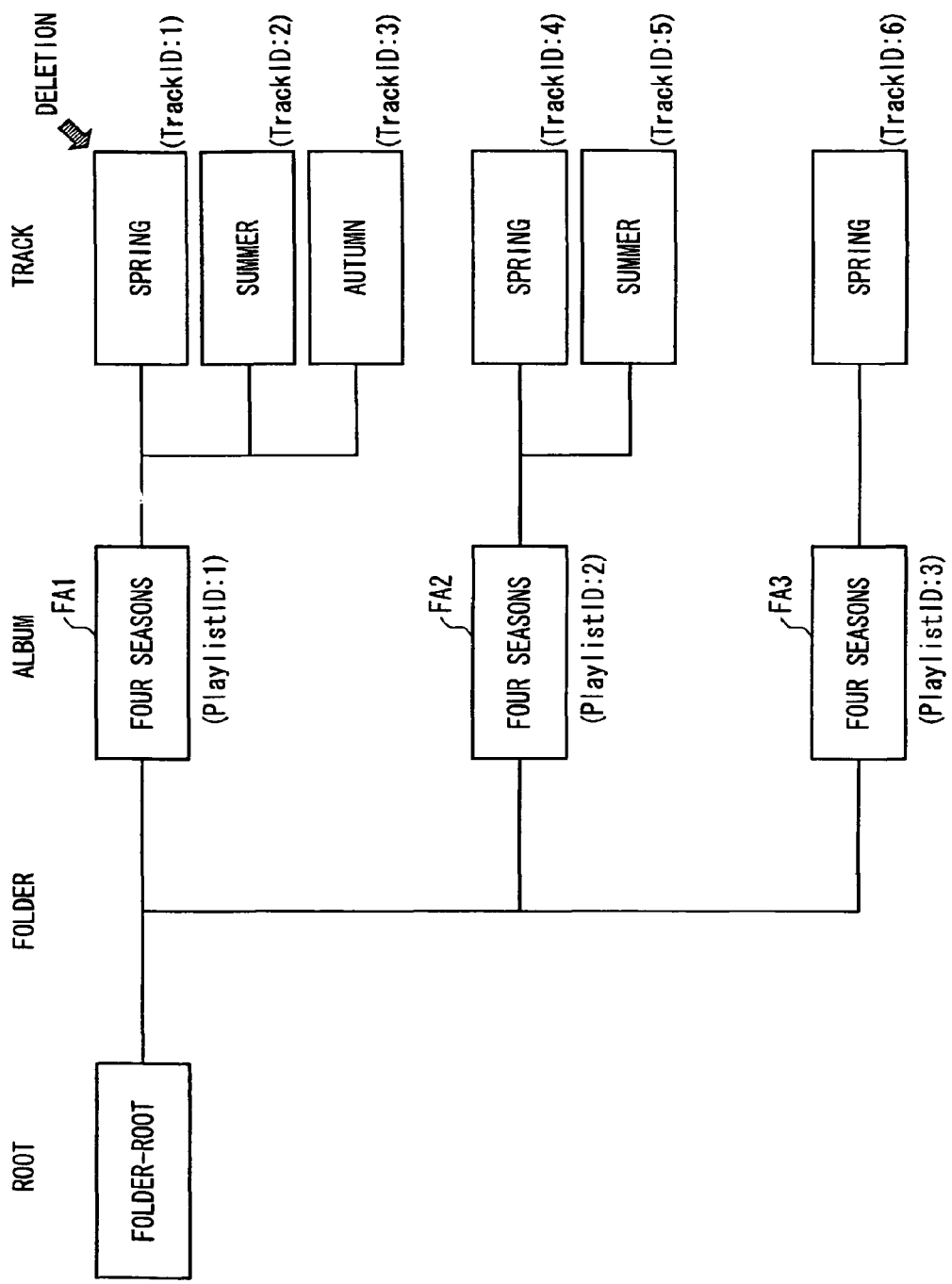
FIG. 26 is a schematic diagram illustrating a title list screen (6).
Figure 27:
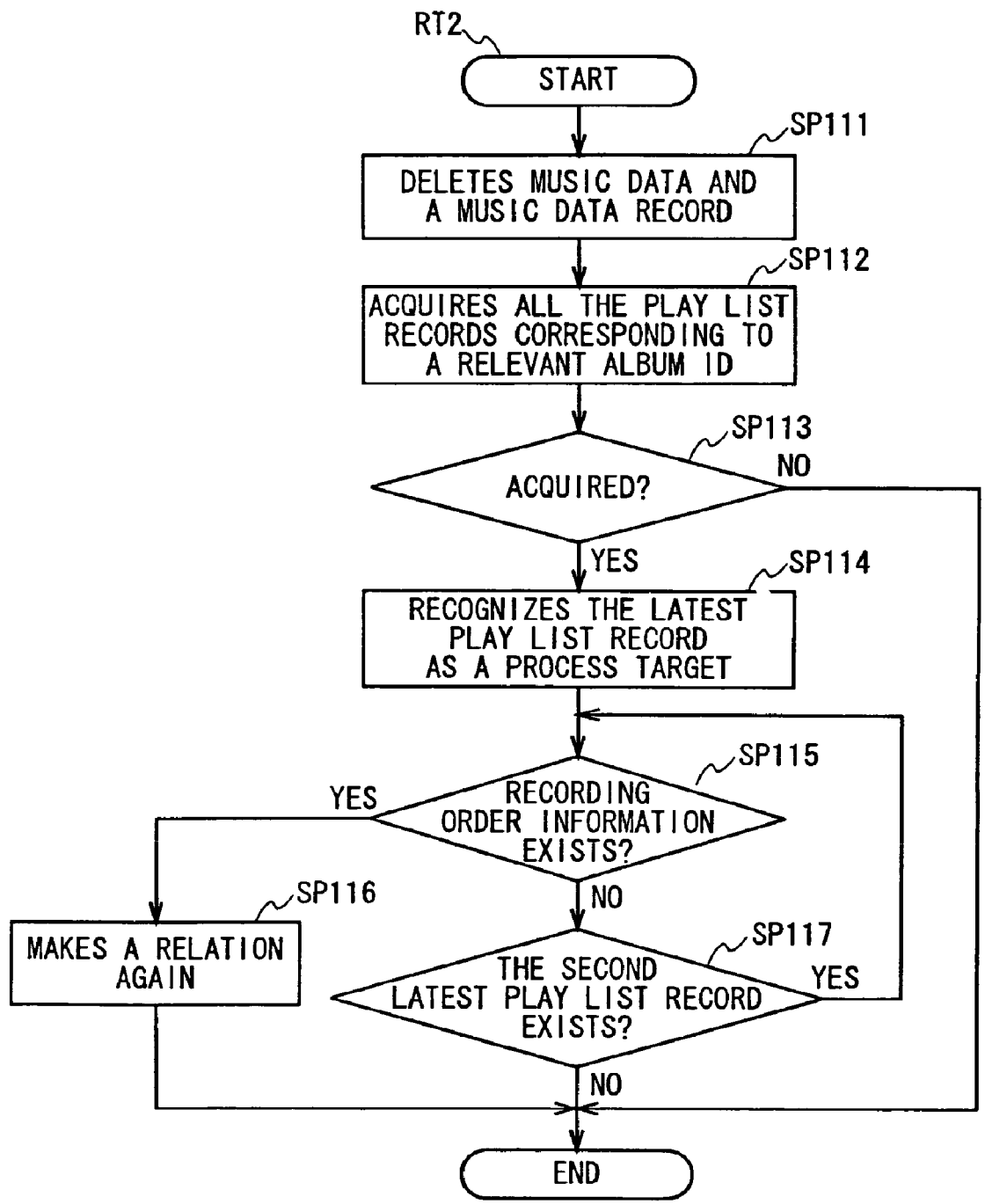
FIG. 27 is a flowchart illustrating an automatic classifying process during deletion.

As shown in FIG. 26, after the client terminal 2 downloads three pieces of music data of "Spring" and two pieces of music data of "Summer" and one piece of music data of "Autumn", the client terminal may delete one of the music data of "Spring" by performing a deletion process. A Procedure RT2 of an automatic classifying process during the deletion process will be described with reference to a flowchart shown in FIG. 27.

Figure 28:
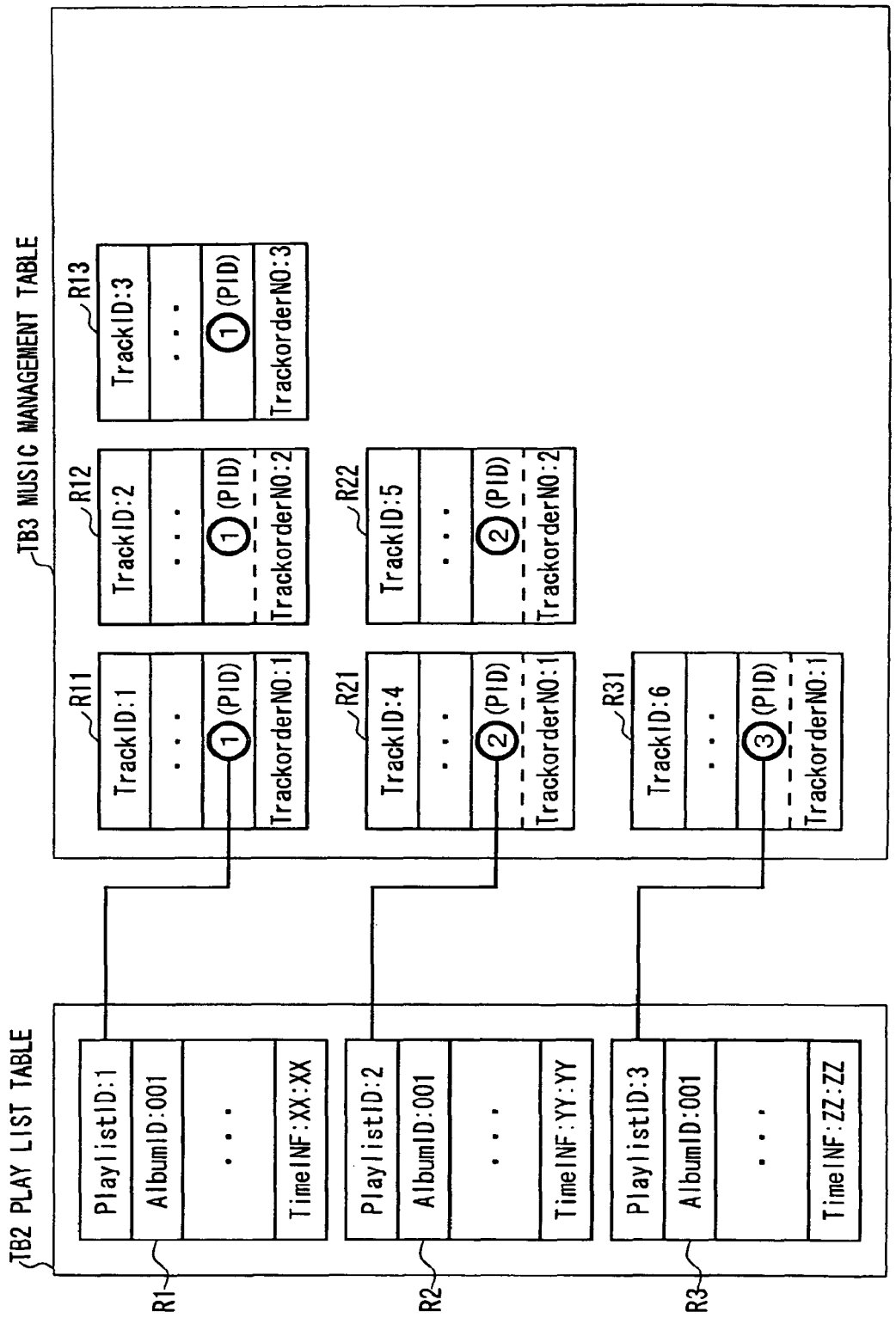
FIG. 28 is a schematic diagram showing the state of a table (3).

FIG. 28 shows the current state of the play list table TB2 and the music management table TB3. The play list table TB2 includes three play list records R1, R2 and R3 which are corresponding to the album of "Four Seasons". For ease of explanation, those play list records R1, R2 and R3 will be also referred to as a first play list record R1, a second play list record R2 and a third play list record R3 in order by created date and time.

On the other hand, the music management table TB3 includes three music data records R11, R12 and R13 for three different types of music data ("Spring", "Summer" and "Autumn") such that they are associated with the first play list record R1. The music management table TB3 also includes two music data records R21 and R22 for two different types of music data ("Spring" and "Summer") such that they are associated with the second play list record R2. In addition, the music management table TB3 includes one music data record R31 for one of the music data of "Spring" such that it is associated with the third play list record R3.

When the user performs, through the operation input section 200, an operation to delete one of the music data of "Spring" associated with the first album folder FA1 (FIG. 26), the CPU 203 of the client terminal 2 proceeds to step SP111, and then deletes the music data record R11 corresponding to this music data of "Spring" and this music data itself from the hard disk drive 211.

The CPU 203 of the client terminal 2 subsequently proceeds to step SP112, and then acquires from the database the first play list record R1, second play list record R2 and third play list record R3 which include the same album identification information (AlbumID: 001) as that of the deleted music data ("Spring").

The CPU 203 of the client terminal 2 subsequently proceeds to step SP113, and checks whether or not it has acquired one or more play list records corresponding to the album identification information (AlbumID: 001) as the result of the record acquisition process at step SP112. In this case, because the CPU 203 of the client terminal 2 has acquired three play list records R1, R2 and R3, the CPU 203 of the client terminal 2 proceeds to step SP114.

The CPU 203 of the client terminal 2 at step SP114 sorts, based on the created date and time information (TimeINF), the three play list records R1, R2 and R3 acquired at step SP112 by order of time, and defines the latest play list record R3, out of the three play list records R1, R2, and R3 sorted, as a process-target record.

The CPU 203 of the client terminal 2 subsequently proceeds to step SP115, and checks whether or not the recording order information (TrackorderNO: 1) of the music data record R31 associated with the process-target record (which is the third play list record R3) is the same as that of the deleted music data (i.e. the music data of "Spring" with "TrackorderNO: 1").

Figure 29:
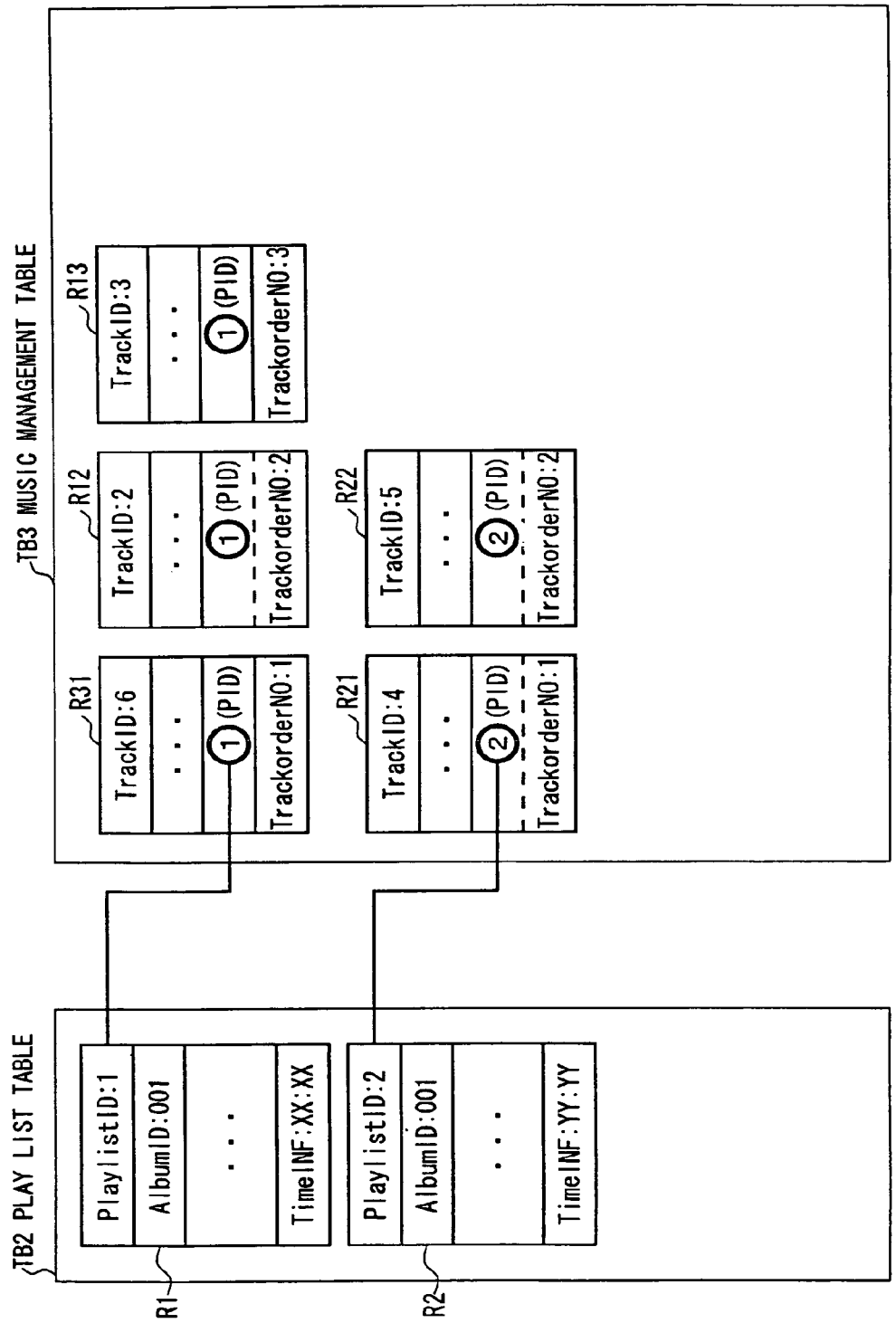
FIG. 29 is a schematic diagram showing the state of a table (4).

In this case, the CPU 203 of the client terminal 2 obtains affirmative result, and therefore proceeds to step SP116. At step SP116, as shown in FIG. 29, the CPU 203 of the client terminal 2 associates the music data record R31 (having the same recording order information as the deleted music data) with the play list record R1 which the music record R11 of the deleted music data ("Spring") was associated with. In addition, the CPU 203 of the client terminal 2 deletes the play list record R3 because only the music data record R31 was associated with it. The CPU 203 of the client terminal 2 then moves, based on the play list table TB2 and music management table TB3 updated in that manner, the title of the music data of "Spring", which was associated with the third album folder FA3 on the screen, to the place where the title of the deleted music data of "Spring" was displayed under the first album folder FA1, and then stops displaying the third album folder FA3.

By the way, when negative result is obtained at step SP115, the CPU 203 of the client terminal 2 proceeds to step SP117, and then checks whether or not the second latest play list record exists among the play list records acquired at step SP112 (the latest play list record is currently recognized as the process-target record). The CPU 203 of the client terminal 2 returns to above step SP115 when affirmative result is obtained. Whereas when negative result is obtained, the CPU 203 of the client terminal 2 proceeds to end step to end the automatic classifying process.

As described above, the client terminal 2 selects the latest created third play list record R3 out of the play list records R2 and R3 which are associated with the music data records R21 and R31 having the same recording order information as the deleted music data record R11 (FIG. 28), and then associates the music data record R31, which was associated with the selected third play list record R3, with the play list record R1, which the deleted music data record R11 was associated with.

Figure 31:
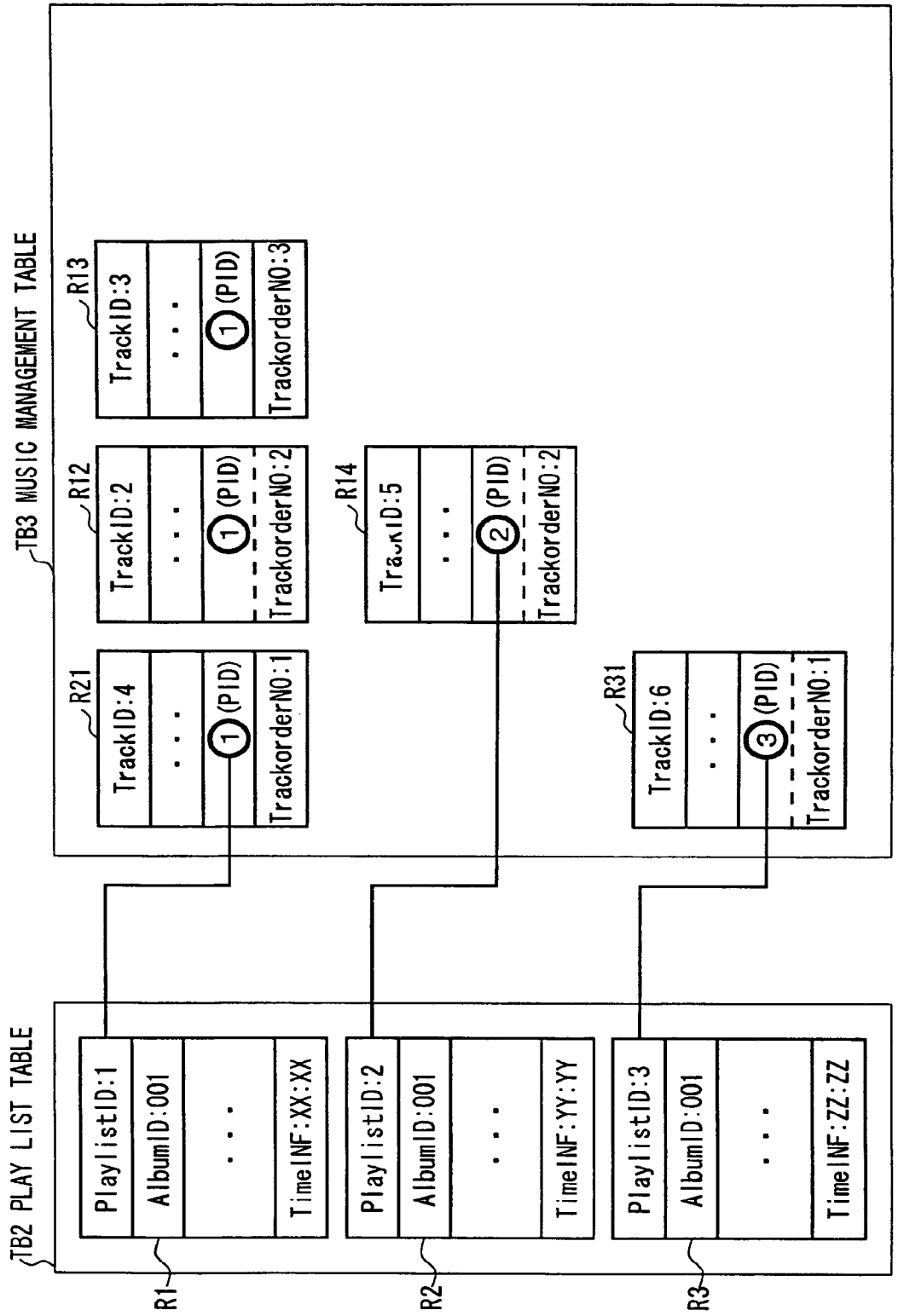
FIG. 31 is a schematic diagram showing the state of a table (5).

By contrast, for example, if the client terminal 2 selects the second latest created play list record R2 out of the play list records R2 and R3 which are associated with the music data records R21 and R31 having the same recording order information as the deleted music data record R11 and then associates the music data record R21, which was associated with the selected play list record R2, with the play list record R1, which the deleted music data record R11 was associated with, only the music data record R14 of the second music data remains associated with the second play list record R2 and only the music data record R31 of the first music data remains associated with the third play list record R3 as shown in FIG. 31. Therefore, it is hard to say that the music data records are well classified. After that, if the client terminal 2 associates the music data record R31 of the first music data, which was associated with the third play list record R3, with the second play list record R2, they seem to be well classified like those shown in FIG. 29. However, in this case, the client terminal 2 has to perform the process of associating the music data records with the play list records two times. In that regard, using the above method of the present embodiment, the client terminal 2 does not have to perform the process of association two times to classify them as shown in FIG. 29. This improves the processing efficiency of the client terminal 2.

Figure 32:
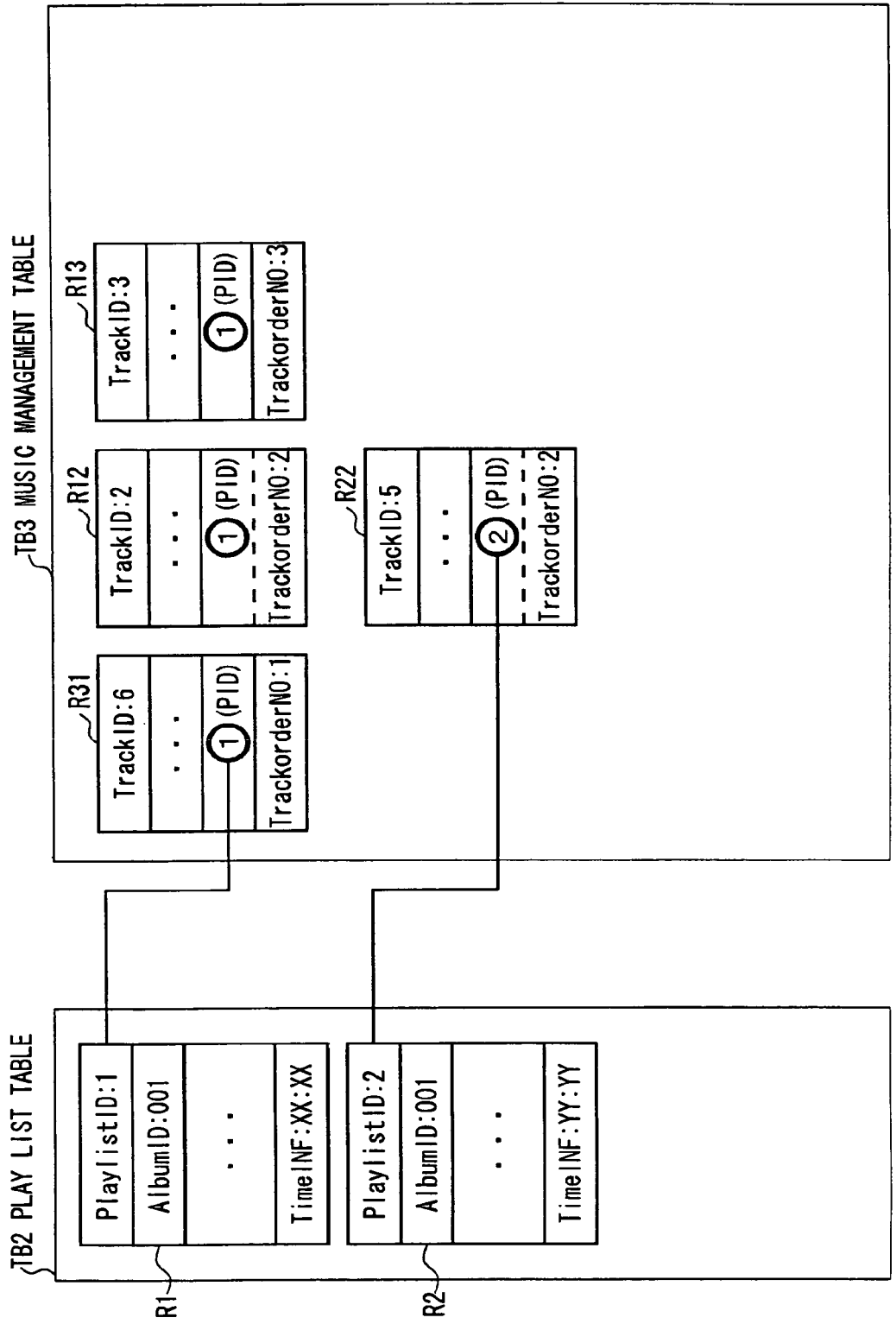
FIG. 32 is a schematic diagram showing the state of a table (6).
Figure 33:
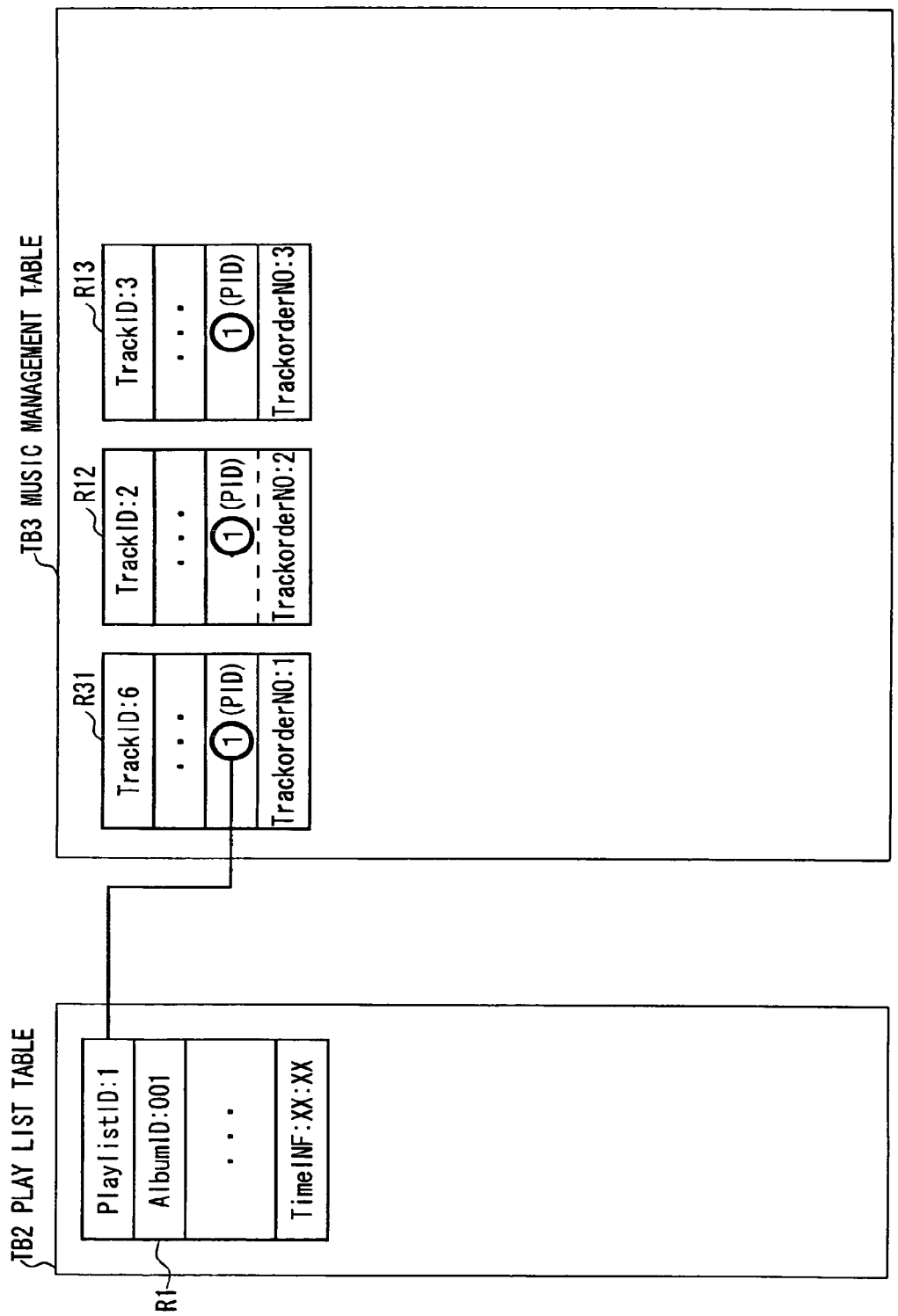
FIG. 33 is a schematic diagram showing the state of a table (7).

As shown FIG. 29, when two music data records R21 and R22 are associated with the second play list record R2, and if a process of deleting the music data record R21 (which is equivalent to the music data of TrackID: 4) is performed, then only the music data record R22 remains associated with the second play list record R2 as shown in FIG. 32. After that, if a process of deleting the music data record R22 (which is the only record associated with the second play list record R2) is performed, the second play list record R2 is deleted as shown in FIG. 33.

Figure 34:
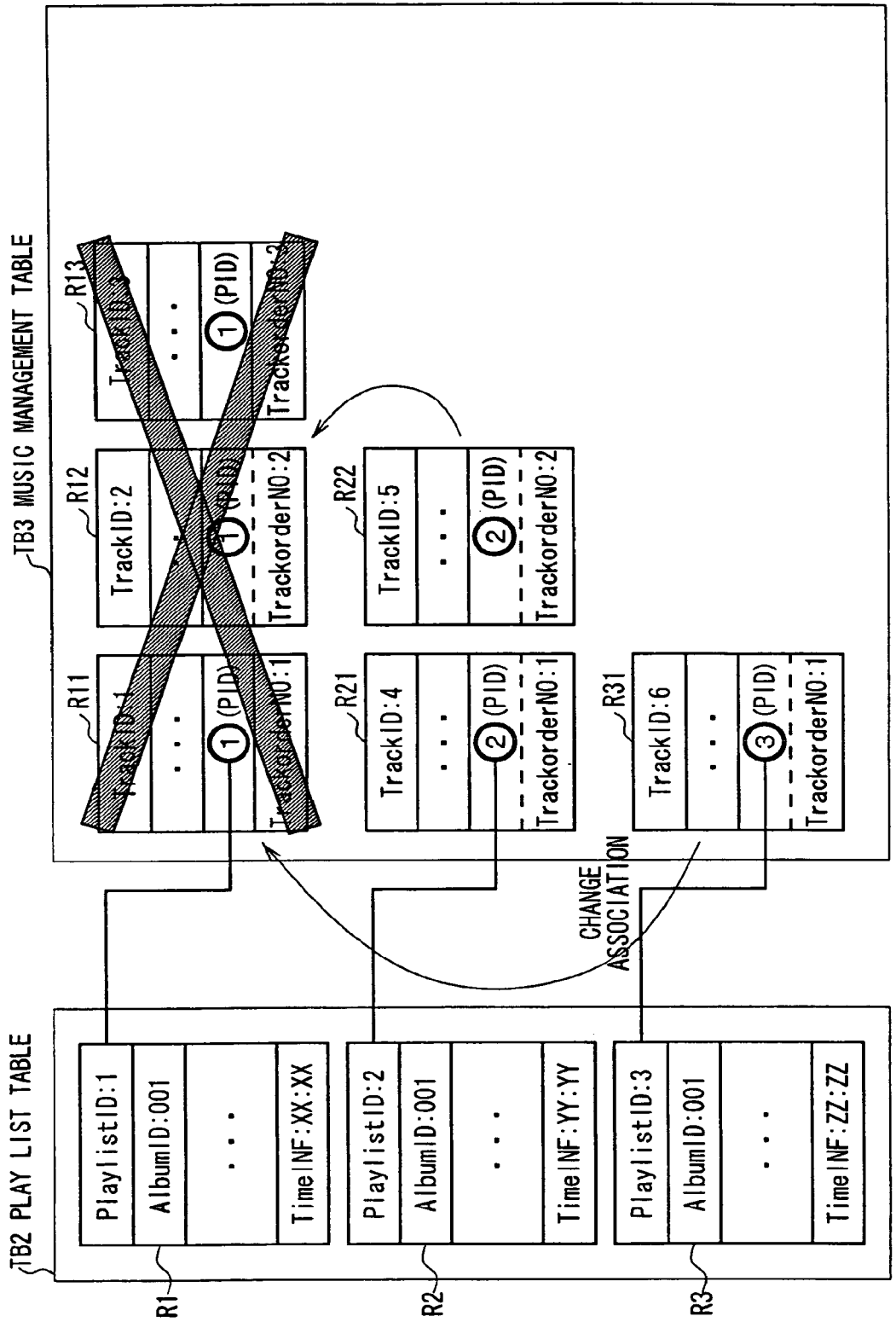
FIG. 34 is a schematic diagram showing the state of a table (8).

By the way, when the user performs, through the operation input section 200, a deletion operation to delete the first album folder FA1 while the display 206 is displaying the title display screen shown in FIG. 26, the CPU 203 of the client terminal 2 deletes the music data of "Spring", "Summer" and "Autumn", which are associated with the first album folder FA1, from the hard disk drive 211. At the same time, the CPU 203 of the client terminal 2 performs the procedure RT2 (the above "Automatic Classifying Process during Deletion") for the corresponding music data records R11, R12 and R13 (FIG. 34).

Figure 35:
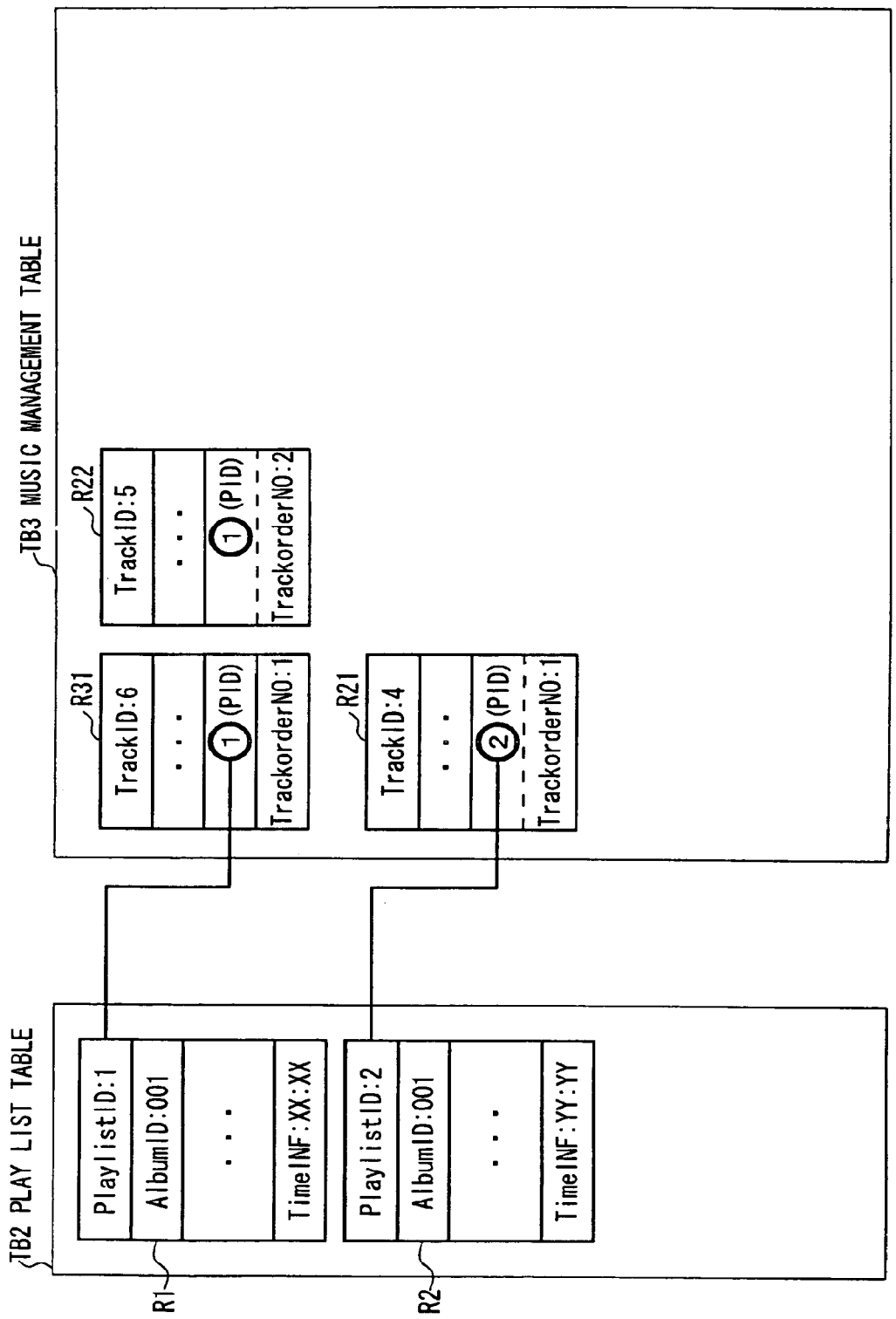
FIG. 35 is a schematic diagram showing the state of a table (9).

As a result, after all the music data records R11, R12 and R13, which were associated with the first play list record R1, are deleted, the music data record R31, which was associated with the third play list record R3, and the music data record R22, which was associated with the second play list record R2, become associated with the first play list record R1 to adjust the configuration as shown in FIG. 35. In this manner, the client terminal 2 according to the present embodiment does not have to perform the process of association many times, and therefore the client terminal 2 can classify the music data records in an effective manner.

(2-5) Title List Screen Display Process

A title list screen display process will be described in detail. Actually, in the client terminal 2, the database notifies the hard disk content controller 247 (FIG. 15) of the updated portion (i.e. updated record) of the database, each time the play list table TB2 and music management table TB3 of the database are updated.

The hard disk content controller 247 has an internal cache to store record state information indicative of the state of the records of the play list table TB2 and music management table TB3. Each time the hard disk content controller 247 is notified of the updated portion, the hard disk content controller 247 update the record state information. The XML browser module 246 then reads out the record state information from the cache, and displays, based on the record state information, the above-noted title list screen on the display 206.

An example of the record state information INF1 stored in the cache will be described with reference to FIG. 36A. The record state information INF1 shown in FIG. 36A shows the state of the play list table TB2 and music management table TB3 shown in FIG. 28.

A first vertical row of the record state information INF1 includes the play list record identification information (PlaylistID: 1, 2 and 3) of the play list records R1, R2 and R3 on the play list table TB2. A first horizontal row of the record state information INF1 includes the recording order information (TrackorderID): 1, 2, and 3 . . . in that fixed order. For ease of explanation, only three pieces of the recording order information (TrackorderID: 1, 2 and 3) are shown in FIG. 36A, however, there may be more pieces of the recording order information.

In accordance with the play list record identification information shown in the first vertical row of the record state information INF1 and the recording order information shown in the first horizontal row, the music data record identification information (TrackID: 1 to 6) of the music data records R11, . . . R21, . . . , and R31 on the music management table TB3 are placed.

Figure 36:
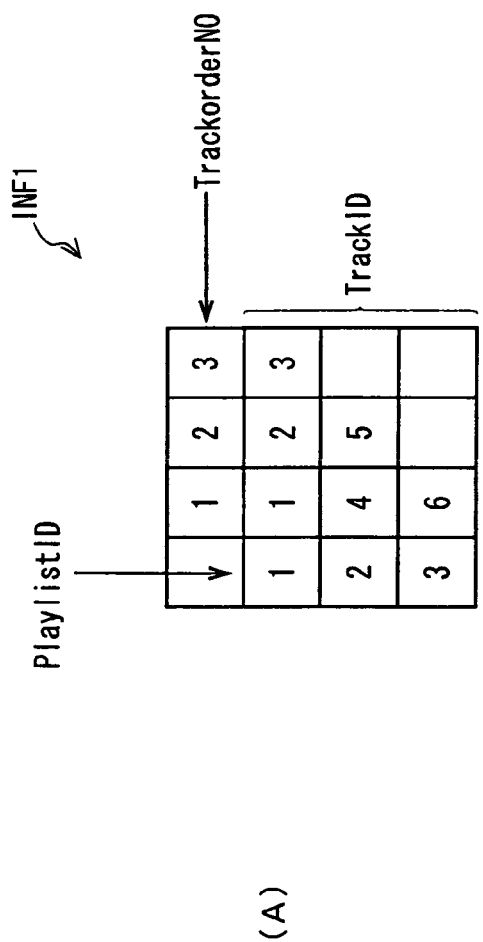
FIG. 36 is a schematic diagram illustrating record state information.

FIG. 36B shows the definition of variables in the present embodiment. The variables of "IDelId" and "IUpdId" are supplied from the database to the hard disk content controller 247 when the play list table TB2 and the music management table TB3 are updated. The variable of "IDelId" is used to notify, when a play list record is deleted at the play list table TB2 in the database, the hard disk content controller 247 of the deleted play list record. The variable of "IUpdId" is used to notify, when the association of a play-list record changed, the hard disk content controller 247 of this play list record.

FIG. 28 shows, for example, the state of the play list table TB2 and the music management table TB3, and FIG. 36A shows the state of the record state information INF1 in the cache at this time. In this case, if the music data record R11 of the music management table TB3 shown in FIG. 28 is deleted, then the music management table TB3 deletes the third play list record R3 as shown in FIG. 29.

At this time, the database notifies, by using the variable of "IDelId" (FIG. 37A), the hard disk content controller 247 of a fact that the third play list record R3 has been deleted. In addition, the database notifies, by using the variable of "IUpdId" (FIG. 37A), the hard disk content controller 247 of a fact that the association of the first play list record R1 has been changed.

In response to the notification, the hard disk content controller 247 deletes the "PlaylistID: 3" and the corresponding "TrackID: 6" from the record state information INF1 shown in FIG. 36A.

At the same time, the hard disk content controller 247 transmits a request signal (equivalent to a SQL statement) to the database to direct the database to notify of the current state of the first play list record R1 about its association. In response to the request signal, the database checks the association of the first play list record R1, and then notifies the hard disk content controller 247 of the result of the check. Based on the result, the hard disk content controller 247 changes "TrackID: 1, 2 and 3 (FIG. 36A)", which were placed in the horizontal row of "PlaylistID: 1 (the play list record identification information)" in the record state information INF1, to "TrackID: 6, 2 and 3" as shown in FIG. 37A.

Figure 30:
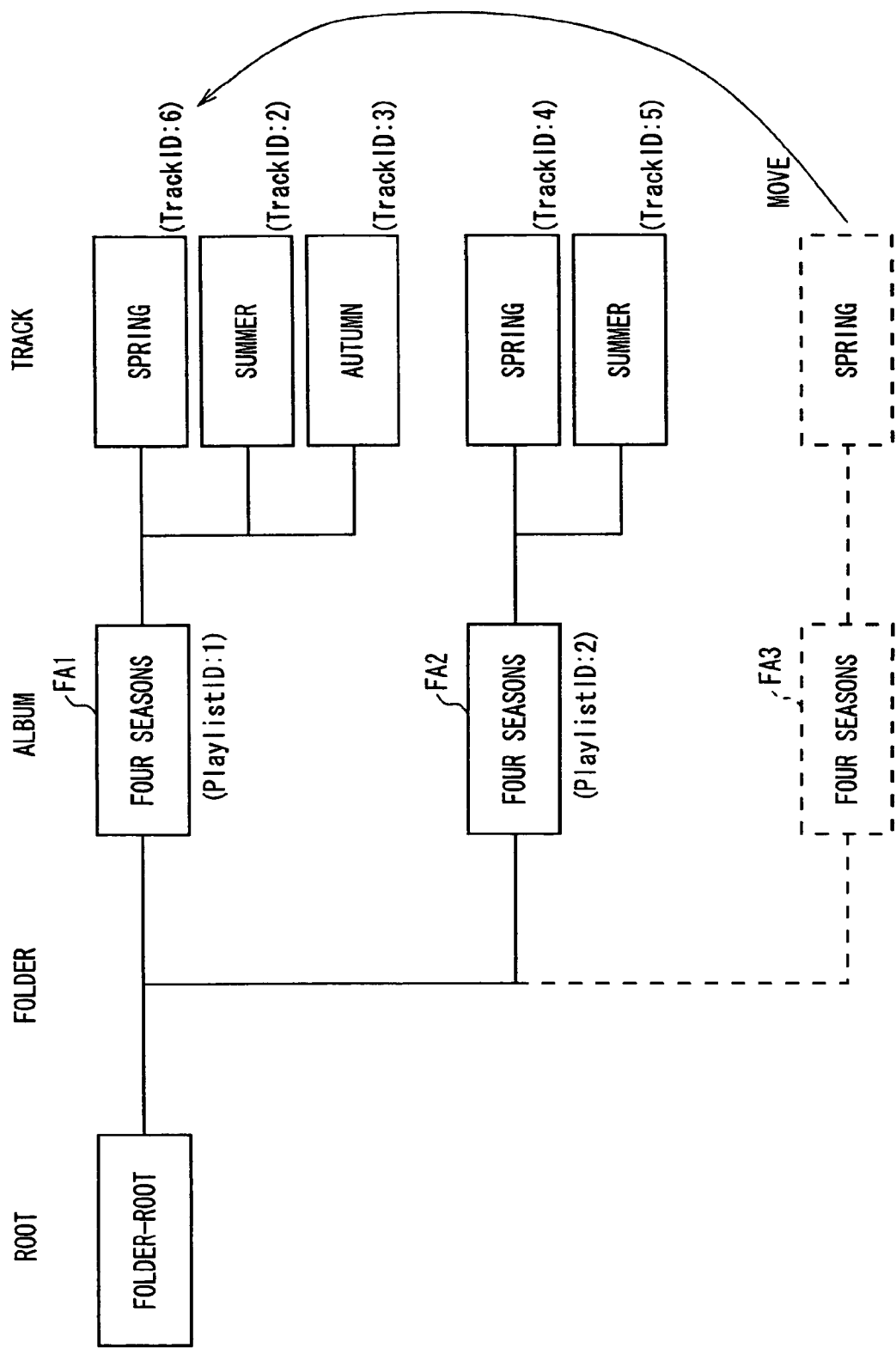
FIG. 30 is a schematic diagram illustrating a title list screen (7).
Figure 37:
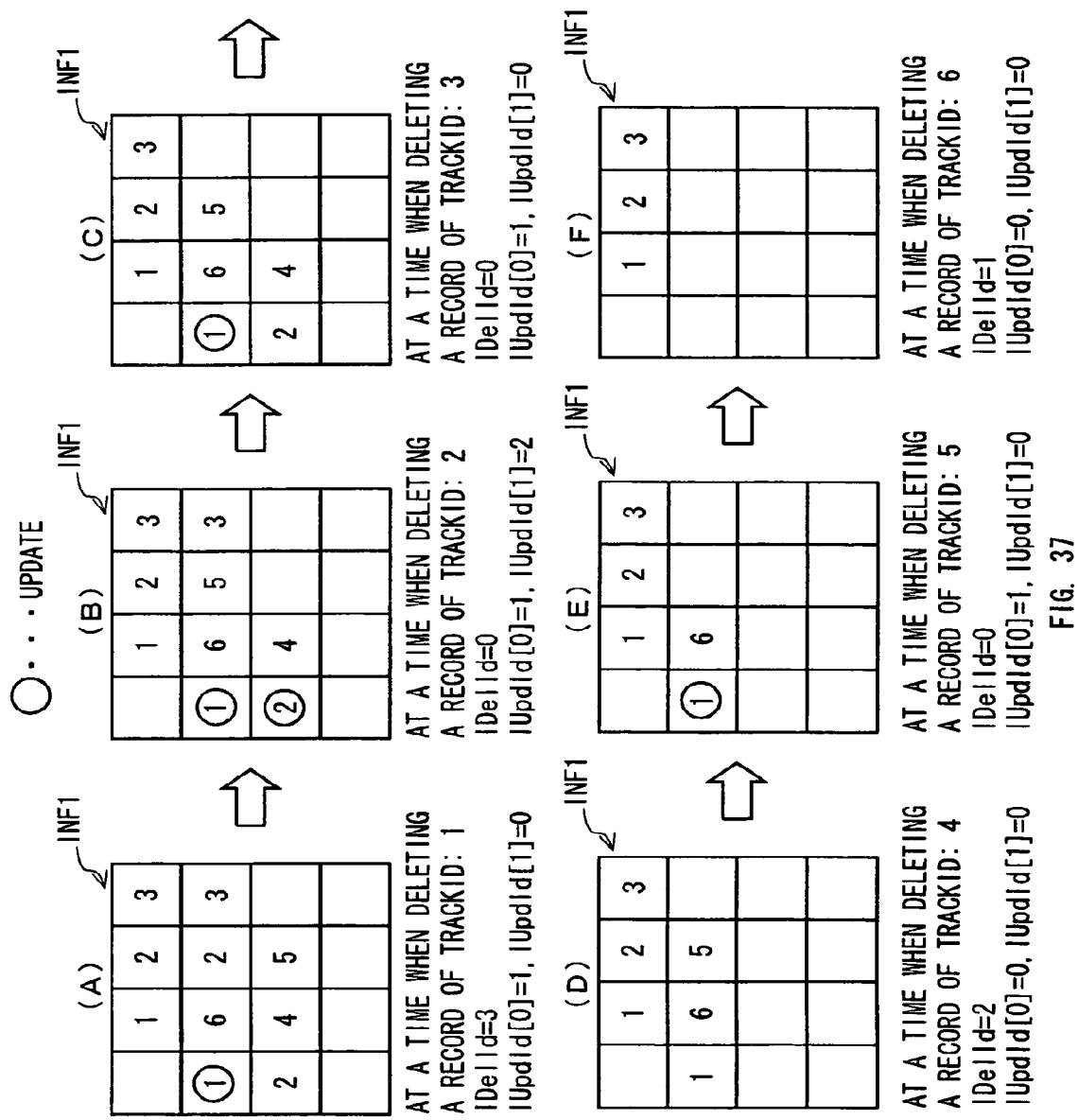
FIG. 37 is a schematic diagram illustrating the transition of the record state information.

As a result, the record state information INF1 in the cache is updated from those shown in FIG. 36A to those shown in FIG. 37A. At this time, the XML browser module 246 changes, based on the record state information INF1, the contents of the title list screen on the display 206 from those shown in FIG. 26 to those shown in FIG. 30.

In this manner, the XML browser module 246 can recognize the number of the play list records R1, . . . and music data records R11, . . . in the tables TB1 and TB2 and the association of the play list records R1, . . . without directly checking the tables TB1 and TB2 in the database, because the record state information INF1 in the cache of the hard disk content controller 247 offers this information. Thus, the client terminal 2 can update the contents of the title list screen displayed in an effective manner.

In addition, when the hard disk content controller 247 updates the record state information INF1 in the cache, the hard disk content controller 247 does not direct the database to notify the hard disk content controller 247 of the association of all the play list records R1, . . . in the play list table TB2, but directs the database to notify the hard disk content controller 247 of only the association of the first play list record R1 whose association has changed this time. Therefore, the database checks only the association of the first play list record R1. This improves the processing efficiency of the client terminal 2.

By the way, after that, when the music data record R12 of "TrackID: 2" is removed from the music management table TB3 in the database, the hard disk content controller 247 is notified, by the variable of "IUpdId (FIG. 37B)" supplied from the database, of a fact that the association of the first play list record R1 and the second play list record R2 have been changed. In response to that, the hard disk content controller 247 performs the above process to change the record state information INF1 in the cache from that of FIG. 37A to FIG. 37B.

After that, when the music data record R13 of "TrackID: 3" is removed from the music management table TB3 in the database, the hard disk content controller 247 is notified, by the variable of "IUpdId (FIG. 37C)" supplied from the database, of a fact that the association of the first play list record R1 has been changed. In response to that, the hard disk content controller 247 performs the above process to change the record state information INF1 in the cache from that of FIG. 37B to FIG. 37C.

After that, when the music data record R21 of "TrackID: 4" is removed from the music management table TB3 in the database, the hard disk content controller 247 is notified, by the variable of "IDelId (FIG. 37D)" supplied from the database, of a fact that the second play list record R2 has been removed. In response to that, the hard disk content controller 247 performs the above process to change the record state information INF1 in the cache from that of FIG. 37C to FIG. 37D.

After that, when the music data record R22 of "TrackID: 5" is removed from the music management table TB3 in the database, the hard disk content controller 247 is notified, by the variable of "IUpdId (FIG. 37E)" supplied from the database, of a fact that the association of the first play list record R1 has been changed. In response to that, the hard disk content controller 247 performs the above process to change the record state information INF1 in the cache from that of FIG. 37D to FIG. 37E.

After that, when the music data record R31 of "TrackID: 6" is removed from the music management table TB3 in the database, the hard disk content controller 247 is notified, by the variable of "IDelId (FIG. 37F)" supplied from the database, of a fact that the first play list record R1 has been removed. In response to that, the hard disk content controller 247 performs the above process to change the record state information INF1 in the cache from that of FIG. 37E to FIG. 37F.

(2-6) Operation and Effect

The client terminal 2 with the above configuration displays the titles of downloaded music data such that these titles are classified by albums based on the album identification information associated with each music data and arranged in an order indicated by the recording order information which is associated with each music data.

Therefore, the use does not have to classify the plurality of music data one by one himself/herself. Thus, the client terminal 2 can classify the downloaded music data in an effective way to display them.

In that manner, by using the client terminal 2 with the above configuration, the use does not have to classify the plurality of music data one by one himself/herself. Thus, the client terminal 2 can classify the downloaded music data in an effective way to display them.

Figure 38:
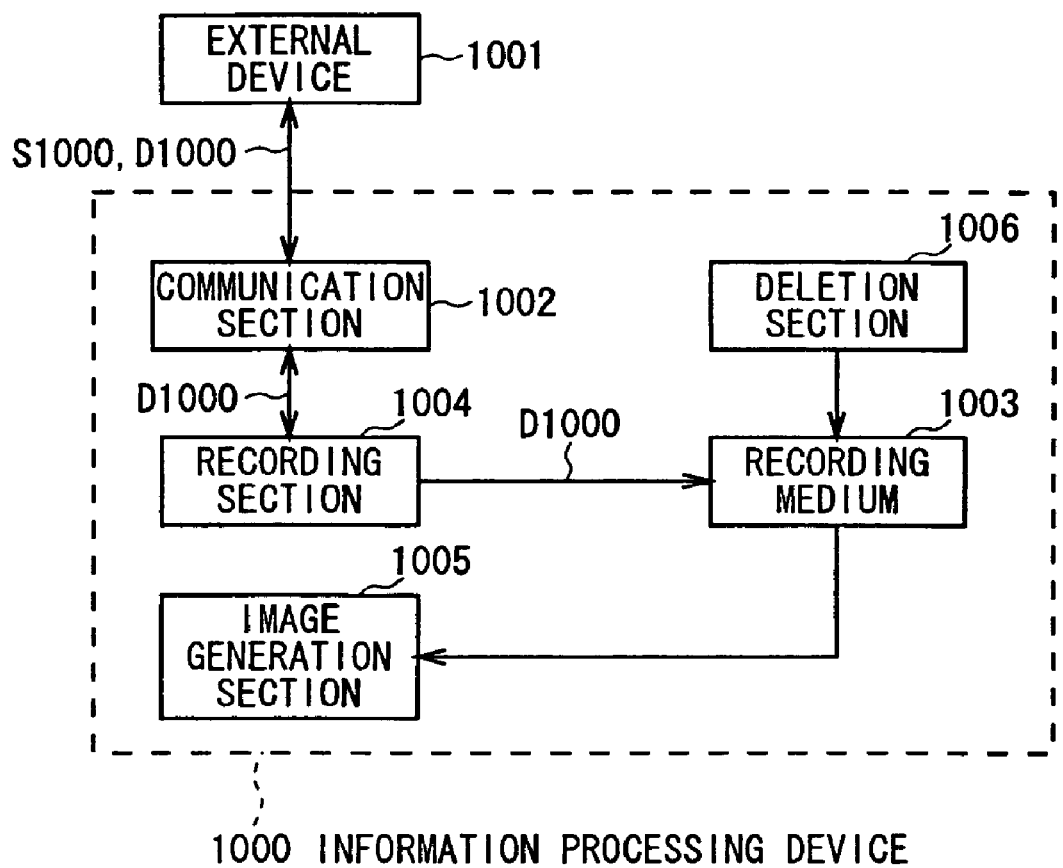
FIG. 38 is a schematic diagram showing the configuration of an information processing device.

The summary of the present embodiment will be described. FIG. 38 shows an example of the configuration of an information processing device 1000 which is equivalent to the client terminal 2.

The information processing device 1000 includes a communication section 1002 that transmits a download request signal S1000 to request an external device 1001 (the music data delivery server SV1) to download specific content data D1000 and receives the content data D1000 corresponding to the download request signal S1000.

The information processing device 1000 includes a recording section 1004 that records the content data main body and fringe information of the content data D1000 received by the communication section 1002 on a recording medium 1003 such that the content data main body and the fringe information are associated with one another, the content data D1000 having the content data main body (equivalent to the music data for example) and the fringe information (equivalent to the attribute information of the music data for example) containing at least content identification information (equivalent to the music data identification information for example), content title information (equivalent to the music data title information for example), content data set identification information storage area (equivalent to an area where the album identification information is stored for example), content data set title information storage area (equivalent to an area where the album title information is stored for example) and recording order information storage area (equivalent to an area where the recording order information is stored for example).

In addition, the information processing device 1000 includes an image generation section 1005 that generates and outputs an image where content data set title information stored in the content data set title information storage area corresponding to the content data recorded by the recording section 1004 are displayed side by side, and the content title information of the content data whose content data set title information is stored in the content data set title information storage area are displayed below the content data set title information in an order indicated by recording order information stored in the recording order information storage area.

The recording section 1004 of the information processing device 1000 generates, based on content data set identification information corresponding to the content data, content data set play list management information (equivalent to the play list record for example) and records the content data set play list management information on the recording medium 1003, the content data set play list management information containing content data set play list identification information (equivalent to play list record identification information "PlaylistID" for example), content data set identification information (equivalent to the album identification information "AlbumID" for example) and content data set play list created date and time information (equivalent to the created date and time information "TimeINF" for example), and the content data set play list identification information is issued to content data management information (equivalent to the music data record for example) managed by the content data set play list management information, and acquires the content data set play list management information containing the content data set identification information of the received content data, and then sorts the content data set play list management information based on the content data set play list created date and time information.

The recording section 1004 of the information processing device 1000 subsequently extracts the oldest content data set play list management information out of the content data set play list management information, and, when the content data management information corresponding to the recording order information of the received content data exists within the content data management information to which the content data set play list identification information of the extracted content data set play list management information is issued, extracts the second oldest content data set play list management information.

The recording section 1004 of the information processing device 1000 subsequently extracts the content data set play list management information in order of time, and, when the content data management information corresponding to the recording order information of the received content data does not exist within the content data management information to which the content data set play list identification information of the extracted content data set play list management information is issued, issues the content data set play list identification information of the content data set play list management information to the content data management information, and then records, along with the content data main body, the content data management information on the recording medium 1003.

In addition, the recording section 1004 of the information processing device 1000 generates new content data set play list management information when the content data management information corresponding to the recording order information of the received content data exists within the content data management information to which the content data set play list identification information of all the content data set play list management information to be recorded is issued, and issues the content data set play list identification information, which was issued to the content data set play list management information, to the received content data management information, and then records, along with the content data main body, the content data management information on the recording medium 1003.

Furthermore, the information processing device 1000 includes a deletion section 1006 that deletes the content data recorded on the recording medium 1003.

The deletion section 1006 of the information processing device 1000 deletes the content data selected, and extracts the recently created specific content data having the same content data set identification information and recording order information as the content data.

The deletion section 1006 of the information processing device 1000 subsequently acquires the content data set play list management information containing the content data set identification information of the specific content data, and sorts the content data set play list management information based on the content data set play list created date and time information, and then extracts the oldest content data set play list management information out of the content data set play list management information.

The deletion section 1006 of the information processing device 1000 subsequently extracts the second oldest content data set play list management information when the content data management information corresponding to the recording order information of the specific content data exists within the content data management information to which the content data set play list identification information of the extracted content data set play list management information is issued.

Furthermore, the deletion section 1006 of the information processing device 1000 extracts the content data set play list management information in order of time, and, when the content data management information corresponding to the recording order information of the specific content data does not exist within the content data management information to which the content data set play list identification information of the extracted content data set play list management information is issued, changes the content data set play list identification information of the specific content data to the content data set play list identification information of the content data set play list management information.

Actually, the recording section 1004 of the information processing device 1000 generates album play list management information based on album identification information equivalent to the content data set identification information corresponding to the content data, and then records the album play list management information on the recording medium 1003. The album play list management information contains album play list identification information, album identification information and album play list created date and time information, and the album play list identification information is issued to the content data management information managed by the album play list management information.

The image generation section 1005 of the information processing device 1000 acquires from the recording section 1004 and the deletion section 1006 the album play list management information and the content data management information managed by the album play list management information, and generates an image based on the acquired album play list management information and content data management information, and then temporarily records the image on the recording medium 1003. In this case, the recording section 1004 and the deletion section 1006 notifies the image generation section 1005 of the album play list identification information of deleted or updated album play list, and the image generation section 1005 generates the image again based on the notification and temporarily records the image on the recording medium 1003.

In this case, the content data set is equivalent to a plurality of content data recorded as DVD-Video or Photo Album. With the fringe information containing genre information, the image generation section 1005 may generate and output an image where the genre information are displayed side by side in response to an operation and the content title information of the content data to which the genre information is issued are displayed below the genre information side by side.

For example, in the present embodiment, the information processing device 1000 shown in FIG. 38 is equivalent to the client terminal 2 shown in FIG. 2. The communication section 1002 shown in FIG. 38 is for example equivalent to the communication control section 32 and the network interface 33 shown in FIG. 2. The recording medium 1003 shown in FIG. 38 is for example equivalent to the storage medium 29 shown in FIG. 2. The recording section 1004 shown in FIG. 38 is for example equivalent to the control section 23 shown in FIG. 2. The image generation section 1005 shown in FIG. 38 is for example equivalent to the control section 23 shown in FIG. 2. The deletion section 1006 shown in FIG. 38 is for example equivalent to the control section 23 shown in FIG. 2.

(2-7) Other Embodiments

In the above-noted embodiments, the music data is applied as content data. However, the present invention is not limited to this. Other kinds of data, such as video and programs, can be applied as content data.

In addition, in the above-noted embodiments, a group of music data (i.e. the album music data set), which are the same as those stored in an album CD, is applied as a content data set. However, the present invention is not limited to this. Other kinds of data, which are put together into a group, can be applied as a content data set. For example, besides an album CD, DVD (Digital Versatile Disc)-Video, Photo Album and the like can be applied as a content data set.

In addition, in the above-noted embodiments, the CPU 203 of the client terminal 2 performs the procedure R1 and R2 of the automatic classifying process in accordance with a program (a content title display program) stored in hard disk drive 211 (i.e. in accordance with software). However the present invention is not limited to this. The client terminal 2 may be equipped with hardware that allows the client terminal 2 to perform the procedure R1 and R2 of the automatic classifying process.

Furthermore, in the above-noted embodiments, when displaying content data (music data) to a user, the display 206 displays the titles of the content data. However, the present invention is not limited to this. If the content data is a still image, the display 206 may display the still image to let a user understand what the content data is about.

Furthermore, in the above-noted embodiments, the client terminal 2 shown in FIG. 14 is applied to as an information processing apparatus. However, the present invention is not limited to this. Various devices, such as a personal computer, may be applied to as an information processing apparatus to display content data.

Furthermore, in the above-noted embodiments, the content data received by communication means (214, 215) include a content data main body and fringe information (attribute information) containing at least content identification information (ContentID), content title information, a content data set identification information storage area (equivalent to the section of "AlbumINFO"), a content data set title information storage area (equivalent to the section of "AlbumINFO")) and a recording order information storage are (equivalent to the section of "AlbumINFO"). The CPU 203 is applied to as recording means that records the fringe information and the content data main body on a recording medium (211) such that they are associated with one another, and as image generation means that generates and outputs an image (the title list image), and as deletion means that deletes content data. However, the present invention is not limited to this. Various configurations can be applied to this.

INDUSTRIAL APPLICABILITY

The present invention can be utilized for devices such as an information processing device capable of downloading music data through a network such as the Internet from a music data delivery server with a plurality of music data.

The invention claimed is:

1. An information processing apparatus comprising:
a communication device for transmitting a download request signal to request an external device to download specific content data, and receiving content data corresponding to said download request signal;
a recording device for recording a content data main body and fringe information of said content data received by said communication device on a recording medium such that said content data main body and said fringe information are associated with one another, said content data having said content data main body and said fringe information containing at least content identification information, content title information, a content data set identification information storage area, a content data set title information storage area and a recording order information storage area; and an image generation device for generating and outputting an image where content data set title information stored in said content data set title information storage area corresponding to said content data recorded by said recording device are displayed side by side, and said content title information of said content data whose content data set title information is stored in said content data set title information storage area are displayed below said content data set title information in an order indicated by recording order information stored in said recording order information storage area, wherein, said recording device generates, based on content data set identification information corresponding to said content data, content data set play list management information and records said content data set play list management information on said recording medium, said content data set play list management information containing content data set play list identification information, content data set identification information and content data set play list created date and time information, and said content data set play list identification information is issued to content data management information managed by said content data set play list management information, said recording device acquires said content data set play list management information containing said content data set identification information of said received content data, and then sorts said content data set play list management information based on said content data set play list created date and time information, said recording device extracts oldest content data set play list management information out of said content data set play list management information, when said content data management information corresponding to said recording order information of said received content data exists within said content data management information to which said content data set play list identification information of said extracted content data set play list management information is issued, said recording device extracts second oldest content data set play list management information, said recording device extracts said content data set play list management information in order of time, and, when said content data management information corresponding to said recording order information of said received content data does not exist within said content data management information to which said content data set play list identification information of said extracted content data set play list management information is issued, issues the content data set play list identification information of said content data set play list management information to said content data management information, and then records, along with said content data main body, said content data management information on said recording medium, and said recording device generates new content data set play list management information when said content data management information corresponding to said recording order information of said received content data exists within said content data management information to which said content data set play list identification information of all said content data set play list management information to be recorded is issued, and issues said content data set play list identification information, which was issued to said content data set play list management information, to said received content data management information, and then records, along with said content data main body, said content data management information on said recording medium.

2. The information processing apparatus according to claim 1, further comprising:

a deletion device for deleting said content data recorded on said recording medium, wherein, said deletion device deletes said content data selected, and extracts recently created specific content data having a same content data set identification information and recording order information as said content data, said deletion device acquires said content data set play list management information containing said content data set identification information of said specific content data, and sorts said content data set play list management information based on said content data set play list created date and time information, said deletion device extracts said oldest content data set play list management information out of said content data set play list management information, said deletion device extracts said second oldest content data set play list management information when the content data management information corresponding to said recording order information of said specific content data exists within said content data management information to which said content data set play list identification information of said extracted content data set play list management information is issued, and said deletion device extracts said content data set play list management information in order of time, and, when said content data management information corresponding to said recording order information of said specific content data does not exist within said content data management information to which said content data set play list identification information of said extracted content data set play list management information is issued, changes said content data set play list identification information of said specific content data to said content data set play list identification information of said content data set play list management information.

3. The information processing apparatus according to claim 1, wherein, said recording device generates album play list management information based on album identification information equivalent to said content data set identification information corresponding to said content data, and then records said album play list management information on said recording medium, said album play list management information containing album play list identification information, album identification information and album play list created date and time information, and said album play list identification information is issued to content data management information managed by said album play list management information.

4. The information processing apparatus according to claim 3, further comprising:

a deletion device for deleting said content data recorded on said recording medium, wherein, said image generation device acquires from said recording device and said deletion device said album play list management information and content data management information managed by said album play list management information, and generates an image based on said acquired album play list management information and content data management information, and then temporarily records said image on said recording medium.

5. The information processing apparatus according to claim 4, wherein, said recording device and said deletion device notify said image generation device of said album play list identification information of deleted or updated album play list, and said image generation device generates said image again based on said notification and temporarily records said image on said recording medium.

6. The information processing apparatus according to claim 1, wherein, said content data set is equivalent to DVD-Video or Photo Album.

7. The information processing apparatus according to claim 1, wherein, said fringe information contains genre information, and said image generation device generates and outputs an image where said genre information are displayed side by side in response to an operation and said content title information of said content data to which said genre information is issued are displayed below said genre information side by side.

8. A content title display method comprising:

transmitting a download request signal to request an external device to download specific content data;

receiving content data corresponding to said download request signal;

recording a content data main body and fringe information of said content data received by said receiving on a recording medium such that said content data main body and said fringe information are associated with one another, said content data having said content data main body and said fringe information containing at least content identification information, content title information, a content data set identification information storage area, a content data set title information storage area and a recording order information storage area; and generating and outputting an image where content data set title information stored in said content data set title information storage area corresponding to said content data recorded on said recording medium are displayed side by side, and said content title information of said content data whose content data set title information is stored in said content data set title information storage area are displayed below said content data set title information in an order indicated by recording order information stored in said recording order information storage area, wherein, said recording generates, based on content data set identification information corresponding to said content data, content data set play list management information and records said content data set play list management information on said recording medium, said content data set play list management information containing content data set play list identification information, content data set identification information and content data set play list created date and time information, and said content data set play list identification information is issued to content data management information managed by said content data set play list management information, said recording acquires said content data set play list management information containing said content data set identification information of said received content data, and then sorts said content data set play list management information based on said content data set play list created date and time information, said recording extracts oldest content data set play list management information out of said content data set play list management information, when said content data management information corresponding to said recording order information of said received content data exists within said content data management information to which said content data set play list identification information of said extracted content data set play list management information is issued, said recording extracts second oldest content data set play list management information, said recording extracts said content data set play list management information in order of time, and, when said content data management information corresponding to said recording order information of said received content data does not exist within said content data management information to which said content data set play list identification information of said extracted content data set play list management information is issued, issues the content data set play list identification information of said content data set play list management information to said content data management information, and then records, along with said content data main body, said content data management information on said recording medium, and said recording generates new content data set play list management information when said content data management information corresponding to said recording order information of said received content data exists within said content data management information to which said content data set play list identification information of all said content data set play list management information to be recorded is issued, and issues said content data set play list identification information, which was issued to said content data set play list management information, to said received content data management information, and then records, along with said content data main body, said content data management information on said recording medium.

9. A content title display program stored on a non-transitory computer readable storage medium for causing a computer to execute:

transmitting a download request signal to request an external device to download specific content data;

receiving content data corresponding to said download request signal;

recording a content data main body and fringe information of said content data received by said receiving on a recording medium such that said content data main body and said fringe information are associated with one another, said content data having said content data main body and said fringe information containing at least content identification information, content title information, a content data set identification information storage area, a content data set title information storage area and a recording order information storage area; and generating and outputting an image where content data set title information stored in said content data set title information storage area corresponding to said content data recorded on said recording medium are displayed side by side, and said content title information of said content data whose content data set title information is stored in said content data set title information storage area are displayed below said content data set title information in an order indicated by recording order information stored in said recording order information storage area, wherein, said recording generates, based on content data set identification information corresponding to said content data, content data set play list management information and records said content data set play list management information on said recording medium, said content data set play list management information containing content data set play list identification information, content data set identification information and content data set play list created date and time information, and said content data set play list identification information is issued to content data management information managed by said content data set play list management information, said recording acquires said content data set play list management information containing said content data set identification information of said received content data, and then sorts said content data set play list management information based on said content data set play list created date and time information;

said recording extracts oldest content data set play list management information out of said content data set play list management information, when said content data management information corresponding to said recording order information of said received content data exists within said content data management information to which said content data set play list identification information of said extracted content data set play list management information is issued, said recording extracts said second oldest content data set play list management information, said recording extracts said content data set play list management information in order of time, and, when said content data management information corresponding to said recording order information of said received content data does not exist within said content data management information to which said content data set play list identification information of said extracted content data set play list management information is issued, issues the content data set play list identification information of said content data set play list management information to said content data management information, and then records, along with said content data main body, said content data management information on said recording medium and said recording generates new content data set play list management information when said content data management information corresponding to said recording order information of said received content data exists within said content data management information to which said content data set play list identification information of all said content data set play list management information to be recorded is issued, and issues said content data set play list identification information, which was issued to said content data set play list management information, to said received content data management information, and then records, along with said content data main body, said content data management information on said recording medium.

* * * * *